United States Patent
Leo et al.

(10) Patent No.: US 12,497,447 B2
(45) Date of Patent: Dec. 16, 2025

(54) ANTI-GDF15 ANTIBODY AND A DOSAGE REGIMEN FOR THE TREATMENT OF CANCER

(71) Applicants: CatalYm GmbH, Planegg-Martinsried (DE); JULIUS-MAXIMILIANS-UNIVERSITÄT WÜRZBURG, Würzburg (DE)

(72) Inventors: Eugen Leo, Munich (DE); Markus Haake, Estenfeld (DE); Jörg Wischhusen, Würzburg (DE); Virginie Le Brun, Basel (CH); Susanne Jörg, Basel (CH); Manfred Rüdiger, Planegg (DE)

(73) Assignees: CatalYm GmbH, Planegg-Martinsried (DE); JULIUS-MAXIMILIANS-UNIVERSITÄT WÜRZBURG, Würzburg (DE)

( * ) Notice: Subject to any disclaimer, the term of this patent is extended or adjusted under 35 U.S.C. 154(b) by 0 days.

(21) Appl. No.: 19/208,792

(22) Filed: May 15, 2025

(65) Prior Publication Data
US 2025/0282858 A1 Sep. 11, 2025

Related U.S. Application Data

(63) Continuation of application No. 18/314,940, filed on May 10, 2023, now abandoned, which is a continuation of application No. PCT/EP2021/081236, filed on Nov. 10, 2021.

(30) Foreign Application Priority Data

| Nov. 10, 2020 | (EP) | 20206801 |
| May 20, 2021 | (EP) | 21175107 |
| Sep. 15, 2021 | (EP) | 21196910 |

(51) Int. Cl.
| C07K 16/22 | (2006.01) |
| A61K 9/16 | (2006.01) |
| A61K 9/19 | (2006.01) |
| A61K 39/395 | (2006.01) |
| C07K 16/28 | (2006.01) |

(52) U.S. Cl.
CPC ............ *C07K 16/22* (2013.01); *A61K 9/1617* (2013.01); *A61K 9/1623* (2013.01); *A61K 9/19* (2013.01); *C07K 16/2818* (2013.01); *C07K 16/2827* (2013.01); *C07K 16/2878* (2013.01); *C07K 2317/24* (2013.01)

(58) Field of Classification Search
None
See application file for complete search history.

(56) References Cited

U.S. PATENT DOCUMENTS

| 5,595,756 | A | 1/1997 | Bally et al. |
| 8,003,099 | B2 | 8/2011 | Auer et al. |
| 9,334,331 | B2 | 5/2016 | Igawa et al. |
| 10,421,807 | B2 | 9/2019 | Gonzales et al. |
| 10,604,565 | B2 | 3/2020 | Wischhusen et al. |
| 10,781,251 | B2 | 9/2020 | Wischhusen et al. |
| 11,262,360 | B2 | 3/2022 | Wischhusen et al. |
| 11,464,856 | B2 | 10/2022 | Wischhusen et al. |
| 11,634,482 | B2 | 4/2023 | Wischhusen et al. |
| 11,760,795 | B2 | 9/2023 | Wischhusen et al. |
| 11,891,436 | B2 | 2/2024 | Wischhusen et al. |
| 2001/0010908 | A1 | 8/2001 | Billing-Medel et al. |
| 2002/0052480 | A1 | 5/2002 | Park et al. |
| 2006/0148709 | A1 | 7/2006 | Unsicker et al. |
| 2007/0128636 | A1 | 6/2007 | Baker et al. |
| 2007/0180543 | A1 | 8/2007 | Eling et al. |
| 2009/0004181 | A1 | 1/2009 | Breit |
| 2009/0324604 | A1 | 12/2009 | Liu et al. |
| 2010/0278843 | A1 | 11/2010 | Breit et al. |
| 2011/0262444 | A1 | 10/2011 | Kim |
| 2013/0071953 | A1 | 3/2013 | Hess et al. |
| 2014/0193427 | A1 | 7/2014 | Lerner et al. |
| 2014/0271546 | A1 | 9/2014 | Warf et al. |
| 2014/0378665 | A1 | 12/2014 | Xiong et al. |
| 2015/0239968 | A1 | 8/2015 | Wischhusen et al. |
| 2017/0204174 | A1 | 7/2017 | Wischhusen et al. |
| 2019/0004047 | A1 | 1/2019 | Wischhusen et al. |
| 2020/0055930 | A1 | 2/2020 | Beaumont et al. |

(Continued)

FOREIGN PATENT DOCUMENTS

| CA | 2980101 A1 | 10/2016 |
| EP | 2694973 A1 | 2/2014 |

(Continued)

OTHER PUBLICATIONS

U.S. Appl. No. 19/074,614, filed Mar. 10, 2025, Klar, Kathrin.*

(Continued)

*Primary Examiner* — Ilia I Ouspenski
(74) *Attorney, Agent, or Firm* — Dechert LLP

(57) ABSTRACT

The present invention relates to an anti-GDF15 antibody and to a dosage regimen for the treatment of cancer in a human patient using the anti-GDF15 antibody. The present inventors identified a mechanism by which GDF-15 blocks adhesion and transgression of predominantly T-lymphocytes into tissues. Hence, a novel treatment approach has been established by the present invention that facilitates effector T cell entry into tumor tissue upon blockage of GDF-15 using the antibody of the present invention thereby allowing the treatment of cancer in human patients.

17 Claims, 22 Drawing Sheets

Specification includes a Sequence Listing.

(56) References Cited

U.S. PATENT DOCUMENTS

| | | |
|---|---|---|
| 2020/0386758 A1 | 12/2020 | Wischhusen et al. |
| 2022/0242942 A1 | 8/2022 | Wischhusen et al. |
| 2023/0093412 A1 | 3/2023 | Wischhusen et al. |
| 2023/0382987 A1 | 11/2023 | Wischhusen et al. |
| 2023/0408521 A1 | 12/2023 | Wischhusen et al. |
| 2024/0043517 A1 | 2/2024 | Leo et al. |
| 2024/0239882 A1 | 7/2024 | Wischhusen et al. |

FOREIGN PATENT DOCUMENTS

| | | |
|---|---|---|
| EP | 2681308 B1 | 3/2015 |
| EP | 2899544 A1 | 7/2015 |
| JP | 2012505659 A | 3/2012 |
| JP | 2012515335 A | 7/2012 |
| WO | WO-2005099746 A1 | 10/2005 |
| WO | WO-2009021293 A1 | 2/2009 |
| WO | WO-2009046495 A1 | 4/2009 |
| WO | WO-2009150256 A1 | 12/2009 |
| WO | WO-2011049645 A1 | 4/2011 |
| WO | WO-2011050407 A1 | 5/2011 |
| WO | WO-2011127219 A1 | 10/2011 |
| WO | WO-2012131052 A1 | 10/2012 |
| WO | WO-2012162561 A2 | 11/2012 |
| WO | WO-2013012648 A1 | 1/2013 |
| WO | WO-2013023557 A1 | 2/2013 |
| WO | WO-2014049087 A1 | 4/2014 |
| WO | WO-2014100689 A1 | 6/2014 |
| WO | WO-2015108907 A2 | 7/2015 |
| WO | WO-2015125159 A1 | 8/2015 |
| WO | WO-2015144855 A1 | 10/2015 |
| WO | WO-2016049470 A1 | 3/2016 |
| WO | WO-2017055612 A1 | 4/2017 |
| WO | WO-2017055613 A2 | 4/2017 |
| WO | WO-2017055614 A1 | 4/2017 |
| WO | WO-2017087870 A1 | 5/2017 |
| WO | WO-2017189724 A1 | 11/2017 |
| WO | WO-2020039321 A2 | 2/2020 |
| WO | WO-2021167883 A1 | 8/2021 |
| WO | WO-2021197171 A1 | 10/2021 |
| WO | WO-2022101263 A1 | 5/2022 |

OTHER PUBLICATIONS

U.S. Appl. No. 19/222,304, filed May 29, 2025, Leo, Eugen.*
AACR 2022, Final results of the phase I, first-in-human, dose-escalation clinical trial of the GDF-15 neutralizing antibody CTL-002 in subjects with advanced stage, anti-PD1/-L1 relapsed/refractory solid tumors (the "GDFATHER"-trial).
AACR 2022, Phase I results of the first-in-human clinical trial of the GDF-15 neutralizing antibody CTL-002 in subjects with relapsed/refractory solid tumors.
AACR-NCI-EORTC, A phase I, first-in-human clinical trial of the GDF-15 neutralizing antibody CTL-002 in subjects with advanced stage solid tumors (Acronym: GDFATHER), Presentation.
Abulizi P, et al., "Growth Differentiation Factor-15 Deficiency Augments Inflammatory Response and Exacerbates Septic Heart and Renal Injury Induced by Lipopolysaccharide," Sci Rep. 2017; 7(1):1037. doi: 10.1038/s41598-017-00902-5.
ASCO2022, Phase 2a development of the GDF-15 neutralizing antibody CTL-002 targeting anti-PD1/-PD-L1 relapsed/refractory tumors: Overview and initial safety results (Acronym: GDFATHER-2 Trial).
ASCO2023, Initial results from the phase 2A trial of visugromab (CTL-002) + nivolumab in advanced/ metastatic anti-PD1/-L1 relapsed/refractory solid tumors (The GDFATHER-Trial).
ASCO 2021 "A phase I, first-in-human clinical trial of the GDF-15 neutralizing antibody CTL-002 in subjects with advanced-stage solid tumors (Acronym: GDFATHER)," ASCO Annual Meeting—Poster.
Bermejo et al., Initial results from the phase 2A trial of visugromab (CTL-002) + nivolumab in advanced/metastatic anti-PD1/-L1 relapsed/refractory solid tumors (The GDFATHER-Trial), 2023 J Clin Oncol. 41(16) 2501.

Böttner et al., "Characterization of the Rat, Mouse, and Human Genes of Growth/Differentiation Factor-15/Macrophage Inhibiting Cytokine-1 (GDF-15/MIC-1)," Gene 1999: 237 (1): 105-11.
Chung et al., "GDF15 deficiency exacerbates chronic alcohol- and carbon tetrachloride-induced liver injury," Sci Rep. 2017; 7(1) doi: 10.1038/s41598-017-17574-w2009.
Eisenhauer et al., "New response evaluation criteria in solid tumours: revised RECIST guideline (version 1.1)," Eur J Cancer. Jan. 2009;45(2):228-47.
Emmerson et al., "The Metabolic Effects of GDF15 Are Mediated by the Orphan Receptor GFRAL." Nature Medicine 2017: 23 (10): 1215-19. https://doi.org/10.1038/nm.4393.
Esmo 2022, Final results of the first-in-human clinical trial of the GDF-15 neutralizing antibody CTL-002 in combination with nivolumab in subjects with solid tumors relapsed/refractory to prior anti-PD1/PD-L1 treatment.
Hodi et al., "Immune-Modified Response Evaluation Criteria In Solid Tumors (imRECIST): Refining Guidelines to Assess the Clinical Benefit of Cancer Immunotherapy," J Clin Oncol. 2018: 36(9):850-8582018.
International Search Report and Written Opinion for PCT/EP2019/081236 mailed May 19, 2022.
Johnen et al., "Tumor-induced anorexia and weight loss are mediated by the TGF-? superfamily cytokine MIC-1," Nat Med. 2007; 13(11):1333-1340. doi: 10.1038/nm16772007.
Kempf, et al., "GDF-15 Is an Inhibitor of Leukocyte Integrin Activation Required for Survival after Myocardial Infarction in Mice," Nat Med. 2011: 17 (5): 581-8 https://doi.org/10.1038/nm.23542011.
Melero et al., ""Abstract P06-01: A phase I, first-in-human clinical trial of the GDF-15 neutralizing antibody CTL-002 in subjects with advanced stage solid tumors (Acronym: GDFATHER),"" Mol Cancer Ther. 2021 20 (12_Supplement): P06-01. https://doi.org/10.1158/1535-7163.TARG-21-P06-01.
Selby et al., "Preclinical Development of Ipilimumab and Nivolumab Combination Immunotherapy: Mouse Tumor Models, In Vitro Functional Studies, and Cynomolgus Macaque Toxicology," PLoS One. 2016: 11 (9): e0161779. https://doi.org/10.1371/journal.pone.0161779.
Silva et al., "The S228P Mutation Prevents in Vivo and in Vitro IgG4 Fab-arm Exchange as Demonstrated using a Combination of Novel Quantitative Immunoassays and Physiological Matrix Preparation," J Biol Chem. Feb. 27, 2015;290(9):5462-9. doi: 10.1074/jbc.M114.600973. Epub Jan. 7, 2015.
Sitc 2021, A Phase I, First-In-Human Clinical Trial Of The Gdf-15 Neutralizing Antibody Ctl-002 In Subjects With Advanced Stage Solid Tumors (Acronym: GDFATHER).
Tong et al., "Serum concentrations of macrophage inhibitory cytokine 1 (MIC 1) as a predictor of miscarriage," Lancet 2004; 363(9403): 129-130. doi: 10.1016/S0140-6736(03)15265-8.
Tsai, et al., "The MIC-1/GDF15-GFRAL Pathway in Energy Homeostasis: Implications for Obesity, Cachexia, and Other Associated Diseases," Cell Metab 2018: 28 (3): 353-68. https://doi.org/10.1016/j.cmet.2018.07.018.
Van den Boorn, et al., "Turning Tumors into Vaccines: Co-Opting the Innate Immune System," Immunity 2013: 39 (1): 27-37. https://doi.org/10.1016/j.immuni.2013.07.0112013.
Vaupel et al., "Tumor Microenvironmental Physiology and Its Implications for Radiation Oncology," Seminars in Radiation Oncology, 2004: 14 (3): 198-206. https://doi.org/10.1016/j.semradonc.2004.04.008.
Wang et al., "Antibody structure, instability, and formulation", J Pharma Sci. 2007 96(1) 1-26: Jan. 2007 (Jan. 1, 2007), pp. 1-26, doi: 10.1002/jps.20727.
Wang et al., "GDF15 induces immunosuppression via CD48 on regulatory T cells in hepatocellular carcinoma," J Immunother Cancer. 2021 9(9): e002787. doi: 10.1136/jitc-2021-002787.
Wang et al., "Humanized mice in studying efficacy and mechanisms of PD-1-targeted cancer immunotherapy," FASEB J. 2018; 32(3): 1537-1539.

(56) References Cited

OTHER PUBLICATIONS

Welsh et al., "Large-Scale Delineation of Secreted Protein Biomarkers Overexpressed in Cancer Tissue and Serum," Proc Natl Acad Sci USA 2003: 100 (6): 3410-15 https://doi.org/10.1073/PNAS.05302781002003.

Wischhusen et al., "Growth/Differentiation Factor-15 (GDF-15): From Biomarker to Novel Targetable Immune Checkpoint," Front Immunol. vol. 11, May 19, 2020.

Wollert et al., "An Automated Assay for Growth Differentiation Factor 15.," J Appl Lab Med. 2018; 1(5):510-521. doi:10.1373/jalm.2016.022376.

Yu et al., "How to select IgG subclasses in developing anti-tumor therapeutic antibodies," J Hematol Oncol., 13(1): 45. doi: 10.1186/s13045-020-00876-4.

"A Study of Galunisertib (LY2157299) in Combination With Nivolumab in Advanced Refractory Solid Tumors and in Recurrent or Refractory NSCLC, or Hepatocellular Carcinoma", ClinicalTrials.gov ID: NCT02423343, Sep. 9, 2021, 18 pages.

"Cancer Types", National Cancer Institute, Retrieved from: https://www.cancer.gov/types, Feb. 22, 2022, pp. 1-6.

"Dishing out cancer treatment", Nature Biotechnology, Feb. 2013, 31(2):85.

"LDH Isoenzymes Overview", NY Times Health, 2008, 2 pages.

"Uniprot—Q99988 (GDF15_HUMAN)", Retrieved from: https://www.uniprot.org/uniprot/Q99988, Nov. 12, 2019, 14 pages.

Abd El-Aziz et al., "Cleavage of growth differentiation factor 15 (GDF15) by membrane type 1—matrix metalloproteinase abrogates GDF15-mediated suppression of tumor cell growth", Cancer Science, Sep. 2007, 98(9): 1330-1335.

Adkins et al., "A Novel Preclinical Method to Quantitatively Evaluate Early-Stage Metastatic Events at the Murine Blood-Brain Barrier", Cancer Prevention Research, Jan. 2015, 8(1):68-76.

Ahmadzadeh et al., "Antibody Humanization Methods for Development of Therapeutic Applications", Monoclonal Antibodies in Immunodiagnosis and Immunotherapy, 2014, 33(2):67-73.

Al Qaraghuli et al., "Antibody-protein binding and conformational changes: identifying allosteric signalling pathways to engineer a better effector response", Scientific Reports, 2020, 10(1): 13696, 10 pages.

Altschul et al., "Basic Local Alignment Search Tool", Journal of Molecular Biology, 1990, 215(3):403-410.

Altschul et al., "Gapped BLAST and PSI-BLAST: a new generation of protein database search programs", Nucleic Acids Research, 1997, 25(17):3389-33402.

Ammi et al., "Poly(I:C) as cancer vaccine adjuvant: Knocking on the door of medical breakthroughs", Pharmacology & Therapeutics, 2015, 146:120-131.

Angell et al., "From the immune contexture to the Immunoscore: the role of prognostic and predictive immune markers in cancer", Current Opinion in Immunology, 2013, 25(2):261-267.

Artz et al., "GDF-15 inhibits integrin activation and mouse neutrophil recruitment through the ALK-5/TGFBetaRII heterodimer", Blood, Jul. 28, 2016, 128(4):529-541.

Auerbach et al., "Angiogenesis assays: Problems and pitfalls", Cancer and Metastasis Reviews, 2000, 19(1-2):167-172.

Baek et al., "Cyclooxygenase Inhibitors Regulate the Expression of a TGF-Beta Superfamily Member That Has Proapoptotic and Antitumorigenic Activities", Molecular Pharmacology, 2001, 59(4):901-908.

Baek et al., "Nonsteroidal Anti-Inflammatory Drug-Activated Gene-1 Over Expression in Transgenic Mice Suppresses Intestinal Neoplasia", Gastroenterology, 2006, 131(5):1553-1560.

Baek et al., "Upregulation and secretion of macrophage inhibitory cytokine-1 (MIC-1) in gastric cancers", Clinica Chimica Acta, 2009, 401(1-2):128-133.

Balch et al., "Final Version of 2009 AJCC Melanoma Staging and Classification", Journal of Clinical Oncology, Dec. 20, 2009, 27(36):6199-6206.

Balch et al., "Final Version of the American Joint Committee on Cancer Staging System for Cutaneous Melanoma", Journal of Clinical Oncology, Aug. 15, 2001, 19(16):3635-3648.

Bauskin et al., "Role of Macrophage Inhibitory Cytokine-1 in Tumorigenesis and Diagnosis of Cancer", Cancer Research, May 15, 2006, 66(10):4983-4986.

Bauskin et al., "The Propeptide Mediates Formation of Stromal Stores of PROMIC-1: Role in Determining Prostate Cancer Outcome", Cancer Research, Mar. 15, 2005, 65(6):2330-2336.

Bauskin et al., "The TGF-Beta Superfamily Cytokine MIC-1/GDF15: Secretory Mechanisms Facilitate Creation of Latent Stromal Stores", Journal of Interferon & Cytokine Research, 2010, 30(6):27-35.

Blanco-Calvo et al., "Circulating levels of GDF15, MMP7 and miR-200c as a poor prognostic signature in gastric cancer", Future Oncology, 2014, 10(7):1187-1202.

Bluemel et al., "Epitope distance to the target cell membrane and antigen size determine the potency of T cell-mediated lysis by BiTE antibodies specific for a large melanoma surface antigen", Cancer Immunology, Immunotherapy, 2010, 59(8):1197-1209.

Bock et al., "Expression and Clinical Role of Growth Differentiation Factor-15 in Ovarian Carcinoma Effusions", International Journal of Gynecological Cancer, Dec. 2010, 20(9):1448-1455.

Boehm, "Nivolumab in second-line renal cell carcinoma—prolonged survival with immunotherapy", Medscape, Retrieved from: https://deutsch.medscape.com/artikelansicht/4904107, Sep. 28, 2015, 6 pages (3 Pages of Official Copy and 3 Pages of English Translation).

Bootcov et al., "MIC-1, a novel macrophage inhibitory cytokine, is a divergent member of the TGF-Beta superfamily", Proc. Natl. Acad. Sci., Oct. 1997, 94(21):11514-11519.

Boyle et al., "Macrophage Inhibitory Cytokine-1 Is Overexpressed in Malignant Melanoma and Is Associated with Tumorigenicity", Journal of Investigative Dermatology, 2009, 129(2):383-391.

Breen et al., "GDF-15 Neutralization Alleviates Platinum-Based Chemotherapy-Induced Emesis, Anorexia, and Weight Loss in Mice and Nonhuman Primates", Cell Metabolism, Dec. 1, 2020, 32:938-950.

Breen et al., "Investigating the effects of ponsegromab (anti-GDF15 mAb) in combination with anti-cancer treatments in preclinical models", Journal of Cachexia, Sarcoprenia and Muscle, 2023, 14(S1):32.

Bridge et al., "Induction of an interferon response by RNAi vectors in mammalian cells", Nature Genetics, Jul. 2003, 34(3):263-264.

Brown et al., "Macrophage Inhibitory Cytokine 1: A New Prognostic Marker in Prostate Cancer", Clinical Cancer Research, Nov. 1, 2009, 15(21):6658-6664.

Brown et al., "MIC-1 Serum Level and Genotype: Associations with Progress and Prognosis of Colorectal Carcinoma", Clinical Cancer Research, Jul. 2003, 9(7):2642-2650.

Bruzzese et al., "Local and Systemic Protumorigenic Effects of Cancer-Associated Fibroblast-Derived GDF15", Cancer Research, Jul. 1, 2014, 74(13):3408-3418.

Camp et al., "X-Tile: A New Bio-Informatics Tool for Biomarker Assessment and Outcome-Based Cut-Point Optimization", Clinical Cancer Research, Nov. 1, 2004, 10(21): 7252-7259.

Casset et al., "A peptide mimetic of an anti-CD4 monoclonal antibody by rational design", Biochemical and Biophysical Research Communication, 2003, 307(1):198-205.

Chen et al., "Prostate-Derived Factor as a Paracrine and Autocrine Factor for the Proliferation of Androgen Receptor-Positive Human Prostate Cancer Cells", The Prostate, 2007, 67(5):557-571.

Chen et al., "Selection and Analysis of an Optimized Anti-VEGF Antibody: Crystal Structure of an Affinity-matured Fab in Complex with Antigen", Journal of Molecular Biology, 1999, 293(4):865-881.

Cheng et al., "Data mining The Cancer Genome Atlas in the era of precision cancer medicine", Swiss Medical Weekly, 2015, 145:w14183, pp. 1-5.

Chothia et al., "Canonical Structures for the Hypervariable Regions of Immunoglobulins", Journal of Molecular Biology, 1987, 196(4):901-917.

(56) References Cited

OTHER PUBLICATIONS

Chothia et al., "Conformations of immunoglobulin hypervariable regions", Nature, Dec. 21/28, 1989, 342(6252):877-883.
Clackson et al., "Making antibody fragments using phage display libraries", Nature, Aug. 15, 1991, 352(6336):624-628.
Cohen et al., "Therapeutic Combinations of Immune-Modulating Antibodies in Melanoma and Beyond", Seminars in Oncology, Jun. 2015, 42(3):488-494.
Cong et al., "Advertorial: Novel Bioassay to Assess PD-1/PD-L1 Therapeutic Antibodies in Development for Immunotherapy", Genetic Engineering & Biotechnology News, May 15, 2015, 35(10), 3 pages.
Corre et al., "Bioactivity and Prognostic Significance of Growth Differentiation Factor GDF15 Secreted by Bone Marrow Mesenchymal Stem Cells in Multiple Myeloma", Cancer Research, Mar. 15, 2012, 72(6):1395-1406.
Corre et al., "Concise Review: Growth Differentiation Factor 15 in Pathology: A Clinical Role?", Stem Cells Translational Medicine, 2013, 2:946-952.
Crawford et al., "A Phase 1b First-In-Patient Study Assessing the Safety, Tolerability, Pharmacokinetics, and Pharmacodynamics of Ponsegromab in Participants with Cancer and Cachexia", Clinical Cancer Research, Feb. 1, 2024, 30(3):489-497.
Cully, "Combinations with checkpoint inhibitors at wavefront of cancer immunotherapy", Nature Reviews, Drug Discovery, Jun. 2015, 14(6):374-375.
Darvin et al., "Immune checkpoint inhibitors: recent progress and potential biomarkers", Experimental & Molecular Medicine, 2018, 50(12):165, pp. 1-11.
De Pascalis et al., "Grafting of "Abbreviated" Complementarity-Determining Regions Containing Specificity-Determining Residues Essential for Ligand Contact to Engineer a Less Immunogenic Humanized Monoclonal Antibody", The Journal of Immunology, 2002, 169(6):3076-3084.
De Wit et al., "Analysis of differential gene expression in human melanocytic tumour lesions by custom made oligonucleotide arrays", British Journal of Cancer, 2005, 92(12):2249-2261.
Dermer, "Another Anniversary for the War on Cancer", Bio/Technology, Mar. 12, 1994, 12:320.
Dickopf et al., "Format and geometries matter: Structure-based design defines the functionality of bispecific antibodies", Computational and Structural Biotechnology Journal, 2020, 18:1221-1227.
Dotan et al., "Impact of Rituximab (Rituxan) on the Treatment of B-Cell Non-Hodgkin's Lymphoma", Pharmacy and Therapeutics, Mar. 2010, 35(3):148-157.
Edwards et al., "The Remarkable Flexibility of the Human Antibody Repertoire; Isolation of Over One Thousand Different Antibodies to a Single Protein, BLyS", The Journal of Molecular Biology, 2003, 334(1):103-118.
Eling et al., "NSAID Activated Gene (NAG-1), a Modulator of Tumorigenesis", Journal of Biochemistry and Molecular Biology, Nov. 2006, 39(6):649-655.
Eton et al., "Prognostic Factors for Survival of Patients Treated Systematically for Disseminated Melanoma", Journal of Clinical Oncology, Mar. 1998, 16(3):1103-1111.
Experimental Report, May 26, 2021, 2 pages.
Fairlie et al., "Epitope Mapping of the Transforming Growth Factor-Beta Superfamily Protein, Macrophage Inhibitory Cytokine-1 (MIC-1): Identification of at Least Five Distinct Epitope Specificities+", Biochemistry, 2001, 40(1):65-73.
Fairlie et al., "Expression of a TGF-Beta superfamily protein, macrophage inhibitory cytokine-1, in the yeast *Pichia pastoris*", Gene, 2000, 254(1-2):67-76.
Fairlie et al., "MIC-1 is a novel TGF-Beta superfamily cytokine associated with macrophage activation", Journal of Leukocyte Biology, Jan. 1999, 65(1):2-5.
Fearon et al., "Definition and classification of cancer cachexia: an international consensus", The Lancet Oncology, May 2011, 12(5):489-495.
Fearon, "Cancer cachexia: Developing multimodal therapy for a multidimensional problem", European Journal of Cancer, 2008, 44(8):1124-1132.
Fisher et al., "MIC-1/GDF15 in Barrett's oesophagus and oesophageal adenocarcinoma", British Journal of Cancer, 2015, 112(8):1384-1391.
Freshney, "Culture of Animal Cells: A Manual of Basic Technique", Alan R. Liss, Inc., 1983, 4 pages.
Gajewski et al., "Cancer immunotherapy strategies based on overcoming barriers within the tumor microenvironment", Current Opinion Immunology, 2013, 25(2):268-276.
Galon et al., "Type, Density, and Location of Immune Cells Within Human Colorectal Tumors Predict Clinical Outcome", Science, Sep. 29, 2006, 313(5795):1960-1964.
Garber, "Predictive biomarkers for checkpoints, first tests approved", Nature Biotechnology, Dec. 2015, 33(12):1217-1218.
Gentles et al., "The prognostic landscape of genes and infiltrating immune cells across human cancers", Nature Medicine, Aug. 2015, 21(8):938-945.
Gershoni et al., "Epitope Mapping: The First Step in Developing Epitope-Based Vaccines", Drug Develoment, BioDrugs, 2007, 21(3):145-156.
Ghahroudi et al., "Selection and identification of single domain antibody fragments from camel heavy-chain antibodies", FEBS Letters, 1997, 414(3):521-526.
Giudicelli et al., "IMGT/V-QUEST, an integrated software program for immunoglobulin and T cell receptor V-J and V-D-J rearrangement analysis", Nucleic Acids Research, 2004, 32(Web Server issue):W435-W440.
Gkretsi et al., "Silencing of Growth Differentiation Factor-15 Promotes Breast Cancer Cell Invasion by Down-regulating Focal Adhesion Genes", Anticancer Research, 2020, 40(3):1375-1385.
Goel et al., "Plasticity within the Antigen-Combining Site May Manifest as Molecular Mimicry in the Humoral Immune Response", The Journal of Immunology, 2004, 173(12):7358-7367.
Goncalves et al., "Biological and methodological features of the measurement of S100B, a putative marker of brain injury", Clinical Biochemistry, 2008, 41(10-11):755-763.
Gouttefangeas et al., "Chapter 25: Flow Cytometry in Cancer Immunotherapy: Applications, Quality Assurance and Future", Cancer Immunology, 2015, 471-490.
Greenspan et al., "Defining Epitopes: It's not as easy as it seems", Nature Biotechnology, Oct. 1999, 17(10):936-937.
Griner et al., "Growth differentiation factor 15 stimulates rapamycin-sensitive ovarian cancer cell growth and invasion", Biochemical Pharmacology, 2013, 85(1):46-58.
Gura, "Systems for Identifying New Drugs Are Often Faulty", Science, Nov. 7, 1997, 278(5340):1041-1042.
Hadrup et al., "Effector CD4 and CD8 T Cells and Their Role in the Tumor Microenvironment", Cancer Microenvironment, 2013, 6(2):123-133.
Hegyesi et al., "Validation of Growth Differentiation Factor (GDF-15) as a Radiation Response Gene and Radiosensitizing Target in Mammary Adenocarcinoma Model", Retrieved from: http://cdn.intechopen.com/pdfs/24965.pdf, Dec. 2011, 17 pages.
Herbertz et al., "Clinical development of galunisertib (LY2157299 monohydrate), a small molecule inhibitor of transforming growth factor-beta signaling pathway", Drug Design, Development Therapy, 2015, 9:4479-4499.
Herbst et al., "Predictive correlates of response to the anti-PD-L1 antibody MPDL3280A in cancer patients", Nature, Nov. 27, 2014, 515(7528):563-567.
Hoffman et al., "Blinatumomab, a bi-specific anti-CD19/CD3 BITER® antibody for the treatment of acute lymphoblastic leukemia: perspectives and current pediatric applications", Frontiers in Oncology, Mar. 2014, 4(Article 63), pp. 1-5.
HogenEsch et al., "Challenges in pre-clinical testing of anti-cancer drugs in cell culture and in animal models", Journal of Controlled Release, Dec. 10, 2012, 164(2):183-186.
Holliger et al., "Diabodies: Small bivalent and bispecific antibody fragments", Proc. Natl. Acad. Sci., Jul. 1993, 90(14):6444-6448.

(56) References Cited

OTHER PUBLICATIONS

Holm et al., "Functional mapping and single chain construction of the anti-cytokeratin 8 monoclonal antibody TS1", Molecular Immunology, 2007, 44(6):1075-1084.
Holt et al., "Domain antibodies: proteins for therapy", Trends in Biotechnology, Nov. 2003, 21(11):484-490.
Hsu et al., "Non-homeostatic body weight regulation through a brainstem-restricted receptor for GDF15", Nature, Oct. 12, 2017, 550:255-259.
Huang et al., "Molecular Alterations in Prostate Carcinomas that Associate with In vivo Exposure to Chemotherapy: Identification of a Cytoprotective Mechanism Involving Growth Differentiation Factor 15", Clinical Cancer Research, Oct. 1, 2007, 13(19):5825-5833.
Huehls et al., "Bispecific T-cell engagers for cancer immunotherapy", Immunology and Cell biology, 2015, 93(3):290-296.
Huh et al., "Macrophage Inhibitory Cytokine-1 Regulates Melanoma Vascular Development", The American Journal of Pathology, Jun. 2010, 176(6):2948-2957.
Husaini et al., "Macrophage Inhibitory Cytokine-1 (MIC-1/GDF15) Slows Cancer Development but Increases Metastases in TRAMP Prostate Cancer Prone Mice", PLoS One, Aug. 2012, 7(8):e43833, pp. 1-9.
International Preliminary Report on Patentability received for PCT Application No. PCT/EP2013/070127, completed on Dec. 3, 2014, 8 pages.
International Preliminary Report on Patentability received for PCT Application No. PCT/EP2015/056654, mailed on Oct. 6, 2016, 8 pages.
International Preliminary Report on Patentability received for PCT Application No. PCT/EP2016/073519, mailed on Apr. 12, 2018, 8 pages.
International Preliminary Report on Patentability received for PCT Application No. PCT/EP2016/073520, mailed on Apr. 12, 2018, 15 pages.
International Preliminary Report on Patentability received for PCT Application No. PCT/EP2016/073521, mailed on Apr. 12, 2018, 10 pages.
International Preliminary Report on Patentability received for PCT Application No. PCT/EP2021/081236, mailed on May 25, 2023, 11 pages.
International Search Report and Written Opinion received for PCT Application No. PCT/EP2013/070127, mailed on Dec. 3, 2013, 10 pages.
International Search Report and Written Opinion received for PCT Application No. PCT/EP2015/056654, mailed on Jul. 13, 2025, 11 pages.
International Search Report and Written Opinion received for PCT Application No. PCT/EP2016/073519, mailed on Jan. 5, 2017, 13 pages.
International Search Report and Written Opinion received for PCT Application No. PCT/EP2016/073520, mailed on Jun. 6, 2017, 21 pages.
International Search Report and Written Opinion received for PCT Application No. PCT/EP2016/073521, mailed on Jan. 5, 2017, 16 pages.
Jackson et al., "Recognizing and avoiding siRNA off-target effects for target identification and therapeutic application", Nature Reviews, Drug Discovery, Jan. 2010, 9(1):57-67.
Jain, "Barriers to Drug Delivery in Solid Tumors", Scientific American, Jul. 1994, 271(1):58-65.
Janeway et al., "Immunobiology: The Immune System in Health and Disease", 5th Edition, 2001, 4 pages.
Jerby-Arnon et al., "A Cancer Cell Program Promotes T Cell Exclusion and Resistance to Checkpoint Blockade", Cell, Nov. 1, 2018, 175(4):984-997.
Ji et al., "An immune-active tumor microenvironment favors clinical response to ipilimumab", Cancer Immunology, Immunotherapy, 2012, 61(7):1019-1031.
Ji et al., "Twist promotes invasion and cisplatin resistance in pancreatic cancer cells through growth differentiation factor 15", Molecular Medicine Reports, 2015, 12(3):3841-3848.
Jones et al., "Growth differentiation factor-15 encodes a novel micro RNA 3189 that functions as a potent regulator of cell death", Cell Death Differentiation, 2015, 22(10):1641-1653.
Jones et al., "Replacing the complementarity-determining regions in a human antibody with those from a mouse", Nature, May 1986, 321(6069):522-525.
Jones et al., "Supraphysiologic Administration of GDF11 Induces Cachexia in Part by Upregulating GDF15", Cell Reports, Feb. 6, 2018, 22(6):1522-1530.
Joshi et al., "Growth differentiation factor 15 (GDF15)-mediated HER2 phosphorylation reduces trastuzumab sensitivity of HER2-overexpressing breast cancer cells", Biochemical Pharmacology, 2011, 82:1090-1099.
Junker, "Development and characterization of monoclonal antibodies to GDF-15 for potential use in cancer therapy", Doctoral thesis for a doctoral degree at the Graduate School of Life Sciences, Julius-Maximilians-Universitat Wurzburg, Section: Infection and Immunity, 2015, 171 pages.
Kanasty et al., "Action and Reaction: The Biological Response to siRNA and Its Delivery Vehicles", Molecular Therapy, Mar. 2012, 20(3):513-524.
Kanasty et al., "Delivery materials for siRNA therapeutics", Nature Materials, Nov. 2013, 12(11):967-977.
Kang et al., "Tolfenamic Acid Induces Apoptosis and Growth Inhibition in Head and Neck Cancer: Involvement of NAG-1 Expression", PLoS One, Apr. 2012, 7(4):e34988, pp. 1-10.
Kaufman et al., "Oncolytic viruses: a new class of immunotherapy drugs", Nature Reviews, Drug Discovery, Sep. 2015, 14(9):642-662.
Kenworthy et al., "Short-hairpin RNAs delivered by lentiviral vector transduction trigger RIG-I-mediated IFN activation", Nucleic Acids Research, 2009, 37(19):6587-6599.
Khan et al., "Adjustable Locks and Flexible Keys: Plasticity of Epitope-Paratope Interactions in Germline Antibodies", The Journal of Immunology, 2014, 192(11):5398-5405.
Kim et al., "Implication of NAG-1 in synergistic induction of apoptosis by combined treatment of sodium salicylate and PI3K/MEK1/2 inhibitors in A549 human lung adenocarcinoma cells", Biochemical Pharmacology, 2008, 75(9):1751-1760.
Kim et al., "Macrophage inhibitory cytokine-1 activates AKT and ERK-1/2 via the transactivation of ErbB2 in human breast and gastric cancer cells", Carcinogenesis, 2008, 29(4):704-712.
Kim et al., "NSAID-activated gene 1 mediates pro-inflammatory signaling activation and paclitaxel chemoresistance in type I human epithelial ovarian cancer stem-like cells", Oncotarget, 2016, 7(44):72148-72166.
Klar, "Experimental Report: Correlation between serum GDF-15 and CD8 positive T cell density in the tumor of UC patients", Munich, Jan. 22, 2024, 3 pages.
Kluger et al., "Plasma markers for identifying patients with metastatic melanoma", Clinical Cancer Research, Apr. 15, 2011, 17(8):2417-2425.
Knoepfel et al., "Selection of RNAi-based inhibitors for anti-HIV gene therapy", World Journal of Virology, Jun. 12, 2012, 1(3):79-90.
Kohler et al., "Continuous cultures of fused cells secreting antibody of predefined specificity", Nature, Aug. 7, 1975, 256(5517):495-497.
Lake et al., "Comparison of Formalin-Fixed and Snap-Frozen Samples Analyzed by Multiplex Ligation-Dependent Probe Amplification for Prognostic Testing in Uveal Melanoma", Investigative Ophthalmology & Visual Science, May 2012, 53(6):2647-2652.
Lanitis et al., "Targeting the tumor vasculature to enhance T cell activity", Current Opinion in Immunology, 2015, 33:55-63.
Lasithiotakis et al., "The Incidence and Mortality of Cutaneous Melanoma in Southern Germany: Trends by Anatomic Site and Pathologic Characteristics, 1976 to 2003", Cancer, Sep. 15, 2006, 107(6):1331-1339.
Lavaud et al., "Strategies to overcome trastuzumab resistance in HER2-overexpressing breast cancers: focus on new data from clinical trials", BMC Medicine, 2014, 12:132, pp. 1-10.

(56) References Cited

OTHER PUBLICATIONS

Li et al., "Adoptive Transfer of Tumor Reactive B Cells Confers Host T-Cell Immunity and Tumor Regression", Clinical Cancer Research, Aug. 1, 2011, 17(15):4987-4995.
Li et al., "GDF15 knockdown suppresses cervical cancer cell migration in vitro through the TGF-Beta/Smad2/3/Snail1 pathway," FEBS Open Bio. 2020; 10(12):2750-2760.
Li et al., "GDF15 promotes EMT and metastasis in colorectal cancer", Oncotarget, 2015, 7(1):860-872.
Li et al., "Growth differentiation factor 15 is a promising diagnostic and prognostic biomarker in colorectal cancer", Journal of Cellular and Molecular Medicine, 2016, 20(8):1420-1426.
Li et al., "RSEM: accurate transcript quantification from RNA-Seq data with or without a reference genome", BMC Bioinformatics, 2011, 12:323, pp. 1-16.
Liu et al., "Association of Serum Level Growth Differentiation Factor 15 with Liver Cirrhosis and Hepatocellular Carcinoma", PLoS One, May 21, 2015, 10(5):e0127518, pp. 1-13.
Liu et al., "Macrophage Inhibitory Cytokine 1 Reduces Cell Adhesion and Induces Apoptosis in Prostate Cancer Cells", Cancer Research, Aug. 15, 2003, 63(16):5034-5040.
Llopiz et al., "Combined immunization with adjuvant molecules poly(I:C) and anti-CD40 plus a tumor antigen has potent prophylactic and therapeutic antitumor effects", Cancer Immunology, Immunotherapy, 2008, 57(1):19-29.
Lloyd et al., "Modelling the human immune response: performance of a 1011 human antibody repertoire against a broad panel of therapeutically relevant antigens", Protein Engineering, Design & Selection, 2009, 22(3):159-168.
Long et al., "Epacadostat Plus Pembrolizumab Versus Placebo Plus Pembrolizumab in Patients With Unresectable or Metastatic Melanoma (ECHO-301/KEYNOTE-252): A Phase 3, Randomised, Double-Blind Study", Lancet Oncology, 2019, 20(8):1083-1097.
Ma et al., "Mutant GDF15 presents a poor prognostic outcome for patients with oral squamous cell carcinoma", Oncotarget, 2016, 7(2):2113-2122.
Maasho et al., "Cutting Edge: NKG2D Is a Costimulatory Receptor for Human Naive CD8+ T Cells", The Journal of Immunology, 2005, 174(8):4480-4484.
MacCallum et al., "Antibody-antigen Interactions: Contact Analysis and Binding Site Topography", Journal of Molecular Biology, 1996, 262(5):732-745.
Mader et al., "Humanization strategies for an anti-idiotypic antibody mimicking HIV-1 gp41", Protein Engineering, Design & Selection, 2010, 23(12):947-954.
Manola et al., "Prognostic Factors in Metastatic Melanoma: A Pooled Analysis of Eastern Cooperative Oncology Group Trials", Journal of Clinical Oncology, Nov. 15, 2000, 18(22):3782-3793.
Marks et al., "By-passing Immunization: Human antibodies from V-gene Libraries Displayed on Phage", Journal of Molecular Biology, 1991, 222(3):581-597.
Martinez et al., "Drug-Induced Expression of Nonsteroidal Anti-Inflammatory Drug-Activated Gene/Macrophage Inhibitory Cytokine-1/Prostate-Derived Factor, a Putative Tumor Suppressor, Inhibits Tumor Growth", The Journal of Pharmacology and Experimental Therapeutics, 2006, 318(2):899-906.
Mauerer et al., "Identification of new genes associated with melanoma", Experimental Dermatology, 2011, 20(6):502-507.
Mehta et al., "A Prospective Study of Macrophage Inhibitory Cytokine-1 (MIC-1/GDF15) and Risk of Colorectal Cancer", Journal of the National Cancer Institute, Apr. 9, 2014, 106(4):dju016, pp. 1-8.
Mehta et al., "Association Between Plasma Levels of Macrophage Inhibitory Cytokine-1 Before Diagnosis of Colorectal Cancer and Mortality", Gastroenterology, Sep. 2015, 149(3):614-622.
Meier et al., "Knockdown of platinum-induced growth differentiation factor 15 abrogates p27-mediated tumor growth delay in the chemoresistant ovarian cancer model A2780cis", Cancer Medicine, 2015, 4(2):253-267.
Melero et al., "Neutralizing GDF-15 can overcome anti-PD-1 and anti-PD-L1 resistance in solid tumours", Nature, Jan. 30, 2025, 637:1218-1248.
Melero et al., "Supplementary Information: Neutralizing GDF-15 can overcome anti-PD-1 and anti-PD-L1 resistance in solid tumours", Nature portfolio, 2025, 17 pages.
Messenheimer et al., "Timing of PD-1 Blockade Is Critical to Effective Combination Immunotherapy with Anti-OX40", Clinical Cancer Research, Oct. 15, 2017, 23(20):6165-6177.
Miller et al., "The Journey from Discoveries in Fundamental Immunology to Cancer Immunotherapy", Cancer Cell, Apr. 13, 2015, 27(4):439-449.
Mimeault et al., "Divergent Molecular Mechanisms Underlying the Pleiotropic Functions of Macrophage Inhibitory Cytokine-1 in Cancer", Journal of Cellular Physiology, 2010, 224(3):626-635.
Mimeault et al., "Marked improvement of cytotoxic effects induced by docetaxel on highly metastatic and androgen-independent prostate cancer cells by downregulating macrophage inhibitory cytokine-1", British Journal of Cancer, 2013, 108(5):1079-1091.
Min et al., "NAG-1/GDF15 accumulates in the nucleus and modulates transcriptional regulation of the Smad pathway", Oncogene, 2016, 35(3):377-388.
Mocellin et al., "The prognostic value of serum S100B in patients with cutaneous melanoma: A meta-analysis", International Journal of Cancer, 2008, 123(10):2370-2376.
Morral et al., "shRNA-Induced Interferon-Stimulated Gene Analysis", Chapter 10, Cytokine Protocols, Methods in Molecular Biology, 2012, 820:163-177.
Motz et al., "Tumor endothelium FasL establishes a selective immune barrier promoting tolerance in tumors", Nature Medicine, Jun. 2014, 20(6):607-615.
Motzer et al., "Nivolumab versus Everolimus in Advanced Renal-Cell Carcinoma", The New England Journal of Medicine, Nov. 5, 2015, 373(19):1803-1813.
Murphy et al., "Update on emerging drugs for cancer cachexia", Expert Opinion on Emerging Drugs, 2009, 14(4):619-632.
Neuzillet et al., "Targeting the TGFBeta pathway for cancer therapy", Pharmacology & Therapeutics, 2015, 147:22-31.
Nogueira et al., "Adjuvant Treatment of Melanoma", ISRN Dermatology, 2013, 2013(Article ID 545631), pp. 1-17.
Noy et al., "Tumor-Associated Macrophages: From Mechanisms to Therapy", Immunity, Jul. 17, 2014, 41(1):49-61.
Paillon et al., "PD-1 inhibits T cell actin remodeling at the immunological synapse independently of its signaling motifs", Science Signaling, Nov. 26, 2023, 16(813):eadh2456, pp. 1-16.
Park et al., "Expression of nonsteroidal anti-inflammatory drug-activated gene-1 (NAG-1) inversely correlates with tumor progression in gastric adenomas and carcinomas", Journal of Cancer Research and Clinical Oncology, 2008, 134(9):1029-1035.
Patel et al., "GDF15 Provides an Endocrine Signal of Nutritional Stress in Mice and Humans", Cell Metabolism, Mar. 5, 2019, 29(3):707-718.
Paul, "Fundamental Immunology", Third Edition, 1993, 6 pages.
Pebernard et al., "Determinants of interferon-stimulated gene induction by RNAi vectors", Differentiation, 2004, 72(2-3):103-111.
Peng et al., "Growth and differentiation factor 15 regulates PD-L1 expression in glioblastoma", Cancer Management Research, 2019, 11:2653-2661.
Pflugfelder et al., "Malignant Melanoma S3-Guideline"Diagnosis, Therapy and Follow-up of Melanoma"", Journal Der Deutschen Dermatologischen Gesellschaft, Feb. 2013, 11(suppl 6):1-116.
Poosarla et al., "Computational De Novo Design of Antibodies Binding to a Peptide With High Affinity", Biotechnology and Bioengineering, Jun. 2017, 114(6):1331-1342.
Qian et al., "Prostate Cancer-Associated Gene Expressions Alterations Determined from Needle Biopsies", Clinical Cancer Research, May 1, 2009, 15(9):3135-3142.
Rabia et al., "Understanding and overcoming trade-offs between antibody affinity, specificity, stability and solubility", Biochemical Engineering Journal, 2018, 137:365-374.
Reardon et al., "An Update on Vaccine Therapy and Other Immunotherapeutic Approaches for Glioblastoma", Expert Review of Vaccines, Jun. 2013, 12(6):597-615.

(56) References Cited

OTHER PUBLICATIONS

Ribas et al., "MASTERKEY-265: A phase 3, randomized, placebo-controlled study of talimogene laherparepvec plus pembrolizumab for unresectable stage IIIB-IVM1c melanoma", ESMO Annals of Oncology, 2021, 32(Suppl. 5), 11 pages.

Ribas et al., "Pembrolizumab versus investigator-choice chemotherapy for ipilimumab-refractory melanoma (KEYNOTE-002): a randomised, controlled, phase 2 trial", Lancet Oncology, Aug. 2015, 16(8):908-918.

Riechmann et al., "Reshaping human antibodies for therapy", Nature, Mar. 24, 1988, 332(6162):323-327.

Riker et al., "The gene expression profiles of primary and metastatic melanoma yields a transition point of tumor progression and metastasis", BMC Medical Genomics, 2008, 1:13, pp. 1-16.

Rizvi et al., "Mutational landscape determines sensitivity to PD-1 blockade in non-small cell lung cancer", Science, Apr. 3, 2015, 348(6230):124-128.

Robert et al., "Pembrolizumab versus Ipilimumab in Advanced Melanoma", The New England Journal of Medicine, Jun. 25, 2015, 372(26):2521-2532.

Roda-Navarro et al., "Understanding the Spatial Topology of Artificial Immunological Synapses Assembled in T Cell-Redirecting Strategies: A Major Issue in Cancer Immunotherapy", Frontiers in Cell and Developmental Biology, Jan. 2020, 7(Article 370), pp. 1-5.

Rosalia et al., "Use of enhanced interleukin-2 formulations for improved immunotherapy against cancer", Current Opinion in Chemical Biology, 2014, 23:39-46.

Roth et al., "GDF-15 Contributes to Proliferation and Immune Escape of Malignant Gliomas", Clinical Cancer Research, Aug. 1, 2010, 16(15):3851-3859.

Rothschild et al., "SAKK 16/14: Anti-PD-L1 antibody durvalumab (MEDI4736) in addition to neoadjuvant chemotherapy in patients with stage IIIa (N2) non-small cell lung cancer (NSCLC), A multicenter single-arm phase II trial", Journal of Thoracic Oncology, 2016, 11(4S):S106-S112.

Rudikoff et al., "Single amino acid substitution altering antigen-binding specificity", Proc. Natl. Acad. Sci., Mar. 1982, 79(6):1979-1983.

Rudin et al., "Abstract LBA8507: SKYSCRAPER-02: Primary results of a phase III, randomized, double-blind, placebo-controlled study of atezolizumab (atezo) + carboplatin + etoposide (CE) with or without tiragolumab (tira) in patients (pts) with untreated extensive-stage small cell lung cancer (ES-SCLC)", American Society of Clinical Oncology, 2022, 40(17 Suppl.), 1 page.

Sadasivan et al., "Abstract 4211: The role of GDF15 (growth/differentiation factor 15) during prostate carcinogenesis", Cancer Research, Jul. 2018, 78(13 Suppl.), pp. 1-5.

Saerens et al., "Single-domain antibodies as building blocks for novel therapeutics", Current Opinion in Pharmacology, 2008, 8(5):600-608.

Sanlorenzo et al., "Melanoma immunotherapy", Cancer Biology &Therapy, 2014, 15(6):665-674.

Schiegnitz et al., "GDF 15 as an anti-apoptotic, diagnostic and prognostic marker in oral squamous cell carcinoma", Oral Oncology, 2012, 48(7):608-614.

Schiegnitz et al., "Growth differentiation factor 15 as a radiation-induced marker in oral carcinoma increasing radiation resistance", Journal of Oral Pathology and Medicine, 2016, 45(1):63-69.

Sebastian, "Review of catumaxomab in the treatment of malignant ascites", Cancer Management and Research, 2010, 2:283-286.

Second Experimental Report, Feb. 10, 2021, 3 pages.

Sela-Culang et al., "The structural basis of antibody-antigen recognition", Frontiers in Immunology, Oct. 8, 2013, 4(Article 302), pp. 1-13.

Selander et al., "Serum Macrophage Inhibitory Cytokine-1 Concentrations Correlate with the Presence of Prostate Cancer", Cancer Epidemiology, Biomarkers & Prevention, Mar. 2007, 16(3):532-537.

Senapati et al., "Overexpression of macrophage inhibitory cytokine-1 induces metastasis of human prostate cancer cells through the FAK-RhoA signaling pathway", Oncogene, 2010, 29(9):1293-1302.

Senovilla et al., "Prognostic and predictive value of the immune infiltrate in cancer", Trial Watch, OncoImmunology, 2012, 1(8):1323-1343.

Shnaper et al., "Elevated levels of MIC-1/GDF15 in the cerebrospinal fluid of patients are associated with glioblastoma and worse outcome", International Journal of Cancer, 2009, 125(11):2624-2630.

Siegel, "Recombinant monoclonal antibody technology", Transfusion Clinique et Biologique, 2002, 9(1):15-22.

Sindhu et al., "Illuminating the Gateway of Gene Silencing: Perspective of RNA Interference Technology in Clinical Therapeutics", Molecular Biotechnology, 2012, 51(3):289-302.

Sirott et al., "Prognostic Factors in Patients with Metastatic Malignant Melanoma: A Multivariate Analysis", Cancer, Nov. 15, 1993, 72(10):3091-3098.

Sporn et al., "Chemoprevention of cancer", Carcinogenesis, 2000, 21(3):525-530.

Spranger et al., "Tumor-intrinsic oncogene pathways mediating immune avoidance", Oncoimmunology, 2016, 5(3):e1086862, pp. e1086862-1-e1086862-7.

Staff et al., "Elevated Plasma Growth Differentiation Factor-15 Correlates with Lymph Node Metastases and Poor Survival in Endometrial Cancer", Clinical Cancer Research, Jul. 15, 2011, 17(14):4825-4833.

Staff et al., "Growth differentiation factor-15 as a prognostic biomarker in ovarian cancer", Gynecologic Oncology, 2010, 118(3):237-243.

Stefanescu et al., "Mass spectometric approaches for elucidation of antigen-antibody recognition structures in molecular immunology", European Journal of Mass Spectrometry, 2008, 13(1):69-75.

Suchard et al., "A Monovalent Anti-Human CD28 Domain Antibody Antagonist: Preclinical Efficacy and Safety", The Journal of Immunology, 2013, 191(9):4599-4610.

Suckau et al., "Molecular epitope identification by limited proteolysis of an immobilized antigen-antibody complex and mass spectrometric peptide mapping", Proc. Natl. Acad. Sci., Dec. 1990, 87(24):9848-9852.

Suesskind et al., "GDF-15: a novel serum marker for metastases in uveal melanoma patients", Graefe's Archive for Clinical and Experimental Ophthalmology, 2012, 250(6):887-895.

Talantov et al., "Novel Genes Associated with Malignant Melanoma but not Benign Melanocytic Lesions", Clinical Cancer Research, Oct. 15, 2005, 11(20):7234-7242.

Tanno et al., "Growth differentiating factor 15 enhances the tumor-initiating and self-renewal potential of multiple myeloma cells", Blood, Jan. 30, 2014, 123(5):725-733.

Tanno et al., "Growth differentiation factor 15 in erythroid health and disease", Current Opinion in Hematology, May 2010, 17(3):184-190.

Tanno et al., "The TGF-Beta Family Member Growth Differentiation Factor 15 (GDF 15) Regulates the Self-Renewal of Multiple Myeloma Cancer Stem Cells", Blood, 118(21):2954, 3 pages.

Taube et al., "Association of PD-1, PD-1 ligands, and other features of the tumor immune microenvironment with response to anti-PD-1 therapy", Clinical Cancer Research, Oct. 1, 2014, 20(19):5064-5074.

Terabe et al., "Synergistic Enhancement of CD8+ T Cell-Mediated Tumor Vaccine Efficacy by an Anti-Transforming Growth Factor-Beta Monoclonal Antibody", Clinical Cancer Research, Nov. 1, 2009, 15(21):6560-6569.

Thompson et al., "Human Anti-CD40 Antibody and Poly IC:LC Adjuvant Combination Induces Potent T Cell Responses in the Lung of Nonhuman Primates", The Journal of Immunology, 2015, 195(3):1015-1024.

Tisdale, "Mechanisms of Cancer Cachexia", Physiological Reviews, 2009, 89(2):381-410.

Topalian et al., "Immune Checkpoint Blockade: A Common Denominator Approach to Cancer Therapy", Cancer Cell, Apr. 13, 2015, 27(4):450-461.

(56) References Cited

OTHER PUBLICATIONS

Topalian et al., "Survival, Durable Tumor Remission, and Long-Term Safety in Patients With Advanced Melanoma Receiving Nivolumab", Journal of Clinical Oncology, Apr. 1, 2014, 32(10):1020-1030.
Tosolini et al., "Large-scale microarray profiling reveals four stages of immune escape in non-Hodgkin lymphomas", Oncoimmunology, 2016, 5(7):e1188246, pp. e1188246-1-e1188246-10.
Tsai et al., "Clinical characteristics predictive of response to pembrolizumab in advanced melanoma", Journal of Clinical Oncology, 2015, 33(15 suppl; abstract 9031), 2 pages.
Tsui et al., "Growth differentiation factor-15 upregulates interleukin-6 to promote tumorigenesis of prostate carcinoma PC-3 cells", Journal of Molecular Endocrinology, 2012, 49(2):153-163.
Tsui et al., "Growth differentiation factor-15: a p53- and demethylation-upregulating gene represses cell proliferation, invasion, and tumorigenesis in bladder carcinoma cells", Scientific Reports, 2015, 5:12870, pp. 1-14.
Tumeh et al., "PD-1 blockade induces responses by inhibiting adaptive immune resistance", Nature, Nov. 27, 2014, 515(7528):568-571.
U.S. Appl. No. 19/237,241, Wischhusen, filed Jun. 13, 2025.
Unal et al., "The divergent roles of growth differentiation factor-15 (GDF-15) in benign and malignant skin pathologies", Archives of Dermatological Research, 2015, 307(7):551-557.
Vajdos et al., "Comprehensive Functional Maps of the Antigen-binding Site of an Anti-ErbB2 Antibody Obtained with Shotgun Scanning Mutagenesis", Journal of Molecular Biology, 2002, 320(2):415-428.
Van der Burg et al., "Immunoguiding, the Final Frontier in the Immunotherapy of Cancer", Cancer Immunotherapy Meets Oncology, 2014, pp. 37-51.
Vicent et al., "Bone Metastases in Lung Cancer: Potential Novel Approaches to Therapy", American Journal of Respiratory and Critical Care Medicine, Oct. 1, 2015, 192(7):799-809.
Vonderheide et al., "Agonistic CD40 Antibodies and Cancer Therapy", Clinical Cancer Research, Mar. 1, 2013, 19(5):1035-1043.
Wakefield et al., "Beyond TGFBeta: roles of other TGFBeta superfamily members in cancer", Nature Reviews, Cancer, May 2013, 13(5):328-341.
Wallentin et al., "GDF-15 for Prognostication of Cardiovascular and Cancer Morbidity and Mortality in Men", PLoS One, Dec. 2013, 8(12):e78797, pp. 1-13.
Wallin et al., "Growth differentiation factor 15: a prognostic marker for recurrence in colorectal cancer", British Journal of Cancer, 2011, 104(10):1619-1627.
Walsh et al., "NKG2D Receptor Signaling Enhances Cytolytic Activity by Virus-Specific CD8+ T Cells: Evidence for a Protective Role in Virus-Induced Encephalitis", Journal of Virology, Mar. 2008, 82(6):3031-3044.
Wang et al., "Macrophage inhibitory factor 1 acts as a potential biomarker in patients with esophageal squamous cell carcinoma and is a target for antibody-based therapy", Cancer Science, Feb. 2014, 105(2):176-185.
Wang et al., "The diverse roles of nonsteroidal anti-inflammatory drug activated gene (NAG-1/GDF15) in cancer", Biochemical Pharmacology, 2013, 85(5):597-606.
Wang et al., "The H6D genetic variation of GDF15 is associated with genesis, progress, and prognosis in colorectal cancer", Pathology—Research and Practice, 2015, 211(11): 845-850.
Wang et al., "The prognostic value of PD-L1 expression for non-small cell lung cancer patients: A meta-analysis", European Journal of Surgical Oncology, 2015, 41(4):450-456.
Wang et al., "Universal PCR amplification of mouse immunoglobulin gene variable regions: the design of degenerate primers and an assessment of the effect of DNA polymerase 3' to 5' exonuclease activity", Journal of Immunological Methods, 2000, 233(1-2):167-177.
Weide et al., "High GDF-15 Serum Levels Independently Correlate with Poorer Overall Survival of Patients with Tumor-Free Stage III and Unresectable Stage IV Melanoma", Journal of Investigative Dermatology, 2016, 136(12):2444-2452.
Weide et al., "Serum markers lactate dehydrogenase and S100B predict independently disease outcome in melanoma patients with distant metastasis", British Journal of Cancer, 2012, 107(3):422-428.
Weide et al., "Serum S100B, Lactate Dehydrogenase and Brain Metastasis Are Prognostic Factors in Patients with Distant Melanoma Metastasis and Systemic Therapy", PLoS One, Nov. 2013, 8(11):e81624, pp. 1-7.
Westhrin et al., "Growth differentiation factor 15 (GDF15) promotes osteoclast differentiation and inhibits osteoblast differentiation and high serum GDF15 levels are associated with multiple myeloma bone disease", Haematologica, 2015, 100(12):e511-e514.
Wevers et al., "S-100B: A Stronger Prognostic Biomarker than LDH in Stage IIIB-C Melanoma", Annals of Surgical Oncology, 2013, 20(8):2772-2779.
Wischhusen et al., "Experimental Report: Combination treatment with anti-PD-1 + anti GDF-15 in a mouse model based on GD-15-transfected MC38 colon cancer cells", 2020, 4 pages.
Wu et al., "Humanization of a Murine Monoclonal Antibody by Simultaneous Optimization of Framework and CDR Residues", Journal of Molecular Biology, 1999, 294(1):151-162.
Xu et al., "Growth differentiation factor 15 induces growth and metastasis of human liver cancer stem-like cells via AKT/GSK-3Beta/Beta-catenin signaling", Oncotarget, 2017, 8(10):16972-16987.
Yadav et al., "Predicting immunogenic tumour mutations by combining mass spectrometry and exome sequencing", Nature, Nov. 27, 2014, 515(7528):572-576.
Yang et al., "Elevated level of serum growth differentiation factor 15 is associated with oral leukoplakia and oral squamous cell carcinoma", Journal of Oral Pathology and Medicine, 2014, 43(1):28-34.
Yang et al., "GDF 15 is a potential predictive biomarker for TPF induction chemotherapy and promotes tumorigenesis and progression in oral squamous cell carcinoma", Annals of Oncology, Jun. 2014, 25(6):1215-1222.
Yang et al., "GFRAL is the receptor for GDF15 and is required for the anti-obesity effects of the ligand", Nature Medicine, 2017, 23:1158-1166.
Yoon et al., "Activin receptor-like kinase5 inhibition suppresses mouse melanoma by ubiquitin degradation of Smad4, thereby derepressing eomesodermin in cytotoxic T lymphocytes", EMBO Molecular Medicine, 2013, 5(11):1720-1739.
Yoshida et al., "Pharmacological profile and clinical efficacy of human anti-human PD-1 antibody nivolumab (OPDIVO®) as a new immune checkpoint inhibitor", Nihon Yakurigaku Zasshi, 2015, 146(2):106-114.
Yu et al., "Tumor-infiltrating T lymphocytes: friends or foes?", Laboratory Investigation, 2006, 86(3):231-245.
Zamarin et al., "Immune checkpoint modulation: Rational design of combination strategies", Pharmacology & Therapeutics, 2015, 150:23-32.
Zamarin et al., "Potentiation of immunomodulatory antibody therapy with oncolytic viruses for treatment of cancer", Molecular Therapy—Oncolytics, 2014, 1:14004, pp. 1-10.
Zhan et al., "Preparation and identification of monoclonal antibody against human growth differentiation factor 15", Chinese Journal of Cellular and Molecular Immunology, May 2011, 27(5):539-541 (English Abstract Submitted).
Zhang et al., "Expression of growth differentiation factor 15 is positively correlated with histopathological malignant grade and in vitro cell proliferation in oral squamous cell carcinoma", Oral Oncology, 2009, 45(7):627-632.
Zhang et al., "Prognostic value of pretreatment serum lactate dehydrogenase level in patients with solid tumors: a systematic review and meta-analysis", Scientific Reports, 2015, 5:9800, pp. 1-12.
Zhao et al., "Identification of Candidate Biomarkers of Therapeutic Response to Docetaxel by Proteomic Profiling", Cancer Research, Oct. 1, 2009, 69(19):7696-7703.

(56) References Cited

OTHER PUBLICATIONS

Zhou et al., "Growth Differentiation Factor-15 Suppresses Maturation and Function of Dendritic Cells and Inhibits Tumor-Specific Immune Response", PLoS One, Nov. 2013, 8(11):e78618, pp. 1-13.

Zimmers et al., "Effect of in vivo loss of GDF-15 on hepatocellular carcinogenesis", Journal of Cancer Research and Clinical Oncology, 2008, 134(7):753-759.

Zimmers et al., "Loss of GDF-15 abolishes Sulindac chemoprevention in the ApcMin/+ mouse model of intestinal cancer", Journal of Cancer Research and Clinical Oncology, 2010, 136(4):571-576.

Zips et al., "New Anticancer Agents: In Vitro and In Vivo Evaluation", In Vivo, 2005, 19(1):1-7.

EU Clinical Trials Register EudraCT No. 2020-002103-19 https://www.clinicaltrialsregister.eu/ctr-search/trial/2020-002103-19/DE?utm_source=chatgpt.com.

Press Release—CatalYm "CatalYm Starts First-in-Human Phase I Clinical Trial with GDF-15 Neutralizing Antibody CTL-002 to Treat Patients with Checkpoint-Inhibitor Refractory Cancer" https://www.catalym.com/catalym-starts-first-in-human-phase-i-clinical-trial-with-gdf-15-neutralizing-antibody-ctl-002-to-treat-patients-with-checkpoint-inhibitor-refractory-cancer/.

Press Release—CatalYm "CatalYm to Present Initial Data of First-in-Human Trial of GDF-15 neutralizing antibody CTL-002 at the 2021 ASCO Annual Meeting" https://www.catalym.com/catalym-to-present-initial-data-of-first-in-human-trial-of-gdf-15-neutralizing-antibody-ctl-002-at-the-2021-asco-annual-meeting/.

AACR-NCI-EORTC, A phase I, first-in-human clinical trial of the GDF-15 neutralizing antibody CTL-002 in subjects with advanced stage solid tumors (Acronym: GDFATHER), Abstract, Mol Cancer Ther (2021) 20 (12_Supplement): P06-01. https://doi.org/10.1158/1535-7163.TARG-21-P06-01, published, Sep. 30, 2021.

\* cited by examiner

Antigen: human GDF-15

FIG. 5
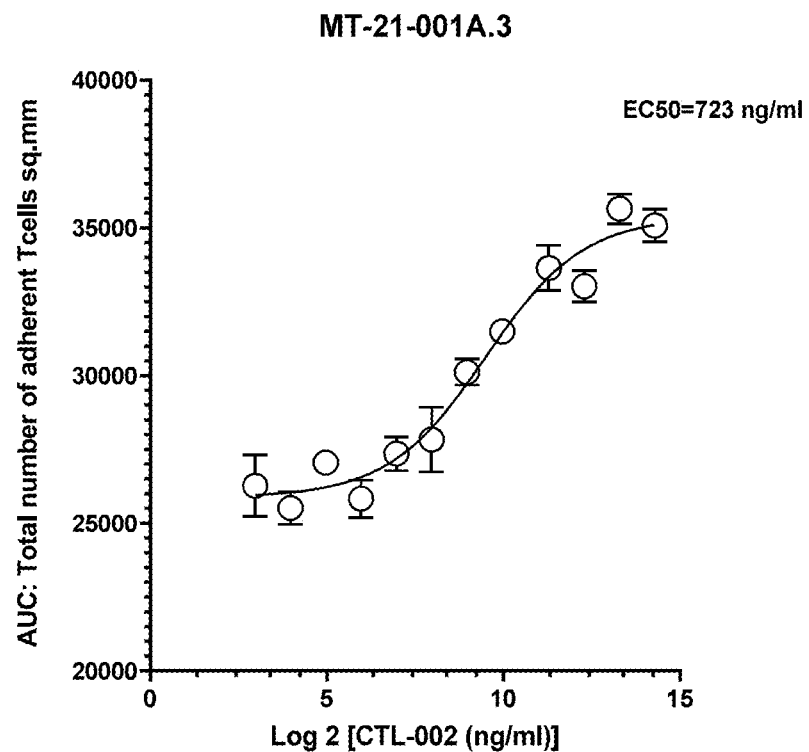
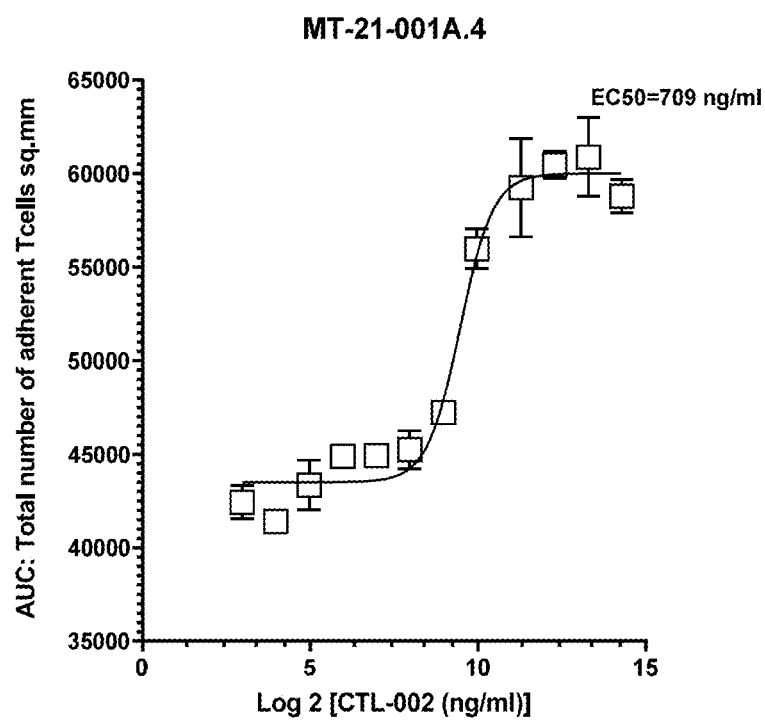

FIG. 22

```
                              CTL-002 epitope (a)
>GDF15_HUMAN  220 LEDLGWADWVLSPR EVQVTMCIGACPSQFR AARMHAQIKTSLHRLKPDTVPAPCCVPASYNPMVLIQK TDTGVSLQTYDDLLAKDCHC  I
>GDF15_MACFA  220 LEDLGWADWVLSPR EVQVTMCIGACPSQFR EANMRAQIKMNLARLKPDTVPAPCCVPASYNPMVLIQK HDTGVSLQTYDDLLAKDCHC  V
>GDF15_MOUSE  220 LEDLGWSDWVLSPR QLQLSMCVGECPHLYR SANTHAQIKARLHGLQPDKVFAPCCVPSSYTPVVLMHR TDSGVSLQTYDDIVARGCHC  A---
>GDF15_RAT    220 LEDLGWSDWVLSPR QLQLSMCVGECPHLYR SANTHALIKARLHGLQPDRVPAPCCVPSSYTPVVLMHR TDSGVSLQTYDDLVAGGCHC  A---

Consensus         ++Q++MC+G+CP+++R                                                 TD+GVSLQTYDDL+AK+CHC
```

Sequence liability map of H1L5 light chain

Legend:

I   - Asn N-Linked Glycosylation
II  - Ser/Thr O-Linked Glycosylation
III - Asn Deamidation
IV  - Asp Isomerisation/Fragmentation V    - Pyro-Glutamate
VI   - C-Terminal Lys
VII  - Met/Trp Oxidation
VIII - Free Thiol Sequence liability map of H1L5 heavy chain:

Legend:
I   - Asn N-Linked Glycosylation
II  - Ser/Thr O-Linked Glycosylation
III - Asn Deamidation
IV  - Asp Isomerisation/Fragmentation
V   - Pyro-Glutamate
VI  - C-Terminal Lys
VII - Met/Trp Oxidation
VIII - Free Thiol

SEQUENCE LISTING

```
Sequence total quantity: 19
SEQ ID NO: 1            moltype = AA  length = 10
FEATURE                 Location/Qualifiers
source                  1..10
                        mol_type = protein
                        organism = synthetic construct
SEQUENCE: 1
GFSLSTSGMG                                                                  10

SEQ ID NO: 2            moltype = AA  length = 7
FEATURE                 Location/Qualifiers
source                  1..7
                        mol_type = protein
                        organism = synthetic construct
SEQUENCE: 2
IYWDDDK                                                                      7

SEQ ID NO: 3            moltype = AA  length = 10
FEATURE                 Location/Qualifiers
source                  1..10
                        mol_type = protein
                        organism = synthetic construct
SEQUENCE: 3
ARSSYGAMDY                                                                  10

SEQ ID NO: 4            moltype = AA  length = 6
FEATURE                 Location/Qualifiers
source                  1..6
                        mol_type = protein
                        organism = synthetic construct
SEQUENCE: 4
QNVGTN                                                                       6

SEQ ID NO: 5            moltype = AA  length = 9
FEATURE                 Location/Qualifiers
source                  1..9
                        mol_type = protein
                        organism = synthetic construct
SEQUENCE: 5
QQYNNFPYT                                                                    9

SEQ ID NO: 6            moltype = AA  length = 124
```

```
FEATURE                 Location/Qualifiers
source                  1..124
                        mol_type = protein
                        organism = synthetic construct
SEQUENCE: 6
QITLKESGPT LVKPTQTLTL TCTFSGFSLS TSGMGVSWIR QPPGKGLEWL AHIYWDDDKR    60
YNPTLKSRLT ITKDPSKNQV VLTMTNMDPV DTATYYCARS SYGAMDYWGQ GTLVTVSSAS   120
TKGP                                                                124

SEQ ID NO: 7            moltype = AA  length = 109
FEATURE                 Location/Qualifiers
source                  1..109
                        mol_type = protein
                        organism = synthetic construct
SEQUENCE: 7
DIVLTQSPSF LSASVGDRVT ITCKASQNVG TNVAWFQQKP GKSPKALIYS ASYRYSGVPD    60
RFTGSGSGTE FTLTISSLQP EDFAAYFCQQ YNNFPYTFGG GTKLEIKRT               109

SEQ ID NO: 8            moltype = AA  length = 444
FEATURE                 Location/Qualifiers
source                  1..444
                        mol_type = protein
                        organism = synthetic construct
SEQUENCE: 8
QITLKESGPT LVKPTQTLTL TCTFSGFSLS TSGMGVSWIR QPPGKGLEWL AHIYWDDDKR    60
YNPTLKSRLT ITKDPSKNQV VLTMTNMDPV DTATYYCARS SYGAMDYWGQ GTLVTVSSAS   120
TKGPSVFPLA PCSRSTSEST AALGCLVKDY FPEPVTVSWN SGALTSGVHT FPAVLQSSGL   180
YSLSSVVTVP SSSLGTKTYT CNVDHKPSNT KVDKRVESKY GPPCPPCPAP EFLGGPSVFL   240
FPPKPKDTLM ISRTPEVTCV VVDVSQEDPE VQFNWYVDGV EVHNAKTKPR EEQFNSTYRV   300
VSVLTVLHQD WLNGKEYKCK VSNKGLPSSI EKTISKAKGQ PREPQVYTLP PSQEEMTKNQ   360
VSLTCLVKGF YPSDIAVEWE SNGQPENNYK TTPPVLDSDG SFFLYSRLTV DKSRWQEGNV   420
FSCSVMHEAL HNHYTQKSLS LSLG                                         444

SEQ ID NO: 9            moltype = AA  length = 214
FEATURE                 Location/Qualifiers
source                  1..214
                        mol_type = protein
                        organism = synthetic construct
SEQUENCE: 9
DIVLTQSPSF LSASVGDRVT ITCKASQNVG TNVAWFQQKP GKSPKALIYS ASYRYSGVPD    60
RFTGSGSGTE FTLTISSLQP EDFAAYFCQQ YNNFPYTFGG GTKLEIKRTV AAPSVFIFPP   120
SDEQLKSGTA SVVCLLNNFY PREAKVQWKV DNALQSGNSQ ESVTEQDSKD STYSLSSTLT   180
LSKADYEKHK VYACEVTHQG LSSPVTKSFN RGEC                               214

SEQ ID NO: 10           moltype = AA  length = 447
FEATURE                 Location/Qualifiers
source                  1..447
                        mol_type = protein
                        organism = synthetic construct
SEQUENCE: 10
QITLKESGPT LVKPTQTLTL TCTFSGFSLS TSGMGVSWIR QPPGKGLEWL AHIYWDDDKR    60
YNPTLKSRLT ITKDPSKNQV VLTMTNMDPV DTATYYCARS SYGAMDYWGQ GTLVTVSSAS   120
TKGPSVFPLA PSSKSTSGGT AALGCLVKDY FPEPVTVSWN SGALTSGVHT FPAVLQSSGL   180
YSLSSVVTVP SSSLGTQTYI CNVNHKPSNT KVDKKVEPKS CDKTHTCPPC PAPELLGGPS   240
VFLFPPKPKD TLMISRTPEV TCVVVDVSHE DPEVKFNWYV DGVEVHNAKT KPREEQYNST   300
YRVVSVLTVL HQDWLNGKEY KCKVSNKALP APIEKTISKA KGQPREPQVY TLPPSREEMT   360
KNQVSLTCLV KGFYPSDIAV EWESNGQPEN NYKTTPPVLD SDGSFFLYSK LTVDKSRWQQ   420
GNVFSCSVMH EALHNHYTQK SLSLSPG                                      447

SEQ ID NO: 11           moltype = AA  length = 214
FEATURE                 Location/Qualifiers
source                  1..214
                        mol_type = protein
                        organism = synthetic construct
SEQUENCE: 11
DIVLTQSPSF LSASVGDRVT ITCKASQNVG TNVAWFQQKP GKSPKALIYS ASYRYSGVPD    60
RFTGSGSGTE FTLTISSLQP EDFAAYFCQQ YNNFPYTFGG GTKLEIKRTV AAPSVFIFPP   120
SDEQLKSGTA SVVCLLNNFY PREAKVQWKV DNALQSGNSQ ESVTEQDSKD STYSLSSTLT   180
LSKADYEKHK VYACEVTHQG LSSPVTKSFN RGEC                               214

SEQ ID NO: 12           moltype = AA  length = 16
FEATURE                 Location/Qualifiers
source                  1..16
                        mol_type = protein
                        organism = synthetic construct
SEQUENCE: 12
EVQVTMCIGA CPSQFR                                                   16

SEQ ID NO: 13           moltype = AA  length = 21
```

```
FEATURE                 Location/Qualifiers
source                  1..21
                        mol_type = protein
                        organism = synthetic construct
SEQUENCE: 13
TDTGVSLQTY DDLLAKDCHC I                                                     21

SEQ ID NO: 14           moltype = AA  length = 89
FEATURE                 Location/Qualifiers
source                  1..89
                        mol_type = protein
                        organism = synthetic construct
SEQUENCE: 14
LEDLGWADWV LSPREVQVTM CIGACPSQFR AANMHAQIKT SLHRLKPDTV PAPCCVPASY           60
NPMVLIQKTD TGVSLQTYDD LLAKDCHCI                                             89

SEQ ID NO: 15           moltype = AA  length = 89
FEATURE                 Location/Qualifiers
source                  1..89
                        mol_type = protein
                        organism = synthetic construct
SEQUENCE: 15
LEDLGWADWV LSPREVQVTM CIGACPSQFR EANMHAQIKM NLHRLKPDTV PAPCCVPASY           60
NPMVLIQKTD TGVSLQTYDD LLAKDCHCV                                             89

SEQ ID NO: 16           moltype = AA  length = 89
FEATURE                 Location/Qualifiers
source                  1..89
                        mol_type = protein
                        organism = synthetic construct
SEQUENCE: 16
LEDLGWSDWV LSPRQLQLSM CVGECPHLYR SANTHAQIKA RLHGLQPDKV PAPCCVPSSY           60
TPVVLMHRTD SGVSLQTYDD LVARGCHCA                                             89

SEQ ID NO: 17           moltype = AA  length = 89
FEATURE                 Location/Qualifiers
source                  1..89
                        mol_type = protein
                        organism = synthetic construct
SEQUENCE: 17
LEDLGWSDWV LSPRQLQLSM CVGECPHLYR SANTHALIKA RLHGLQPDRV PAPCCVPSSY           60
TPVVLMHRTD SGVSLQTYDD LVAQGCHCA                                             89

SEQ ID NO: 18           moltype = AA  length = 10
FEATURE                 Location/Qualifiers
source                  1..10
                        mol_type = protein
                        organism = synthetic construct
SEQUENCE: 18
GVSLQTYDDL                                                                  10

SEQ ID NO: 19           moltype = AA  length = 448
FEATURE                 Location/Qualifiers
source                  1..448
                        mol_type = protein
                        organism = synthetic construct
SEQUENCE: 19
QITLKESGPT LVKPTQTLTL TCTFSGFSLS TSGMGVSWIR QPPGKGLEWL AHIYWDDDKR           60
YNPTLKSRLT ITKDPSKNQV VLTMTNMDPV DTATYYCARS SYGAMDYWGQ GTLVTVSSAS          120
TKGPSVFPLA PSSKSTSGGT AALGCLVKDY FPEPVTVSWN SGALTSGVHT FPAVLQSSGL          180
YSLSSVVTVP SSSLGTQTYI CNVNHKPSNT KVDKKVEPKS CDKTHTCPPC PAPELLGGPS          240
VFLFPPKPKD TLMISRTPEV TCVVVDVSHE DPEVKFNWYV DGVEVHNAKT KPREEQYNST          300
YRVVSVLTVL HQDWLNGKEY KCKVSNKALP APIEKTISKA KGQPREPQVY TLPPSREEMT          360
KNQVSLTCLV KGFYPSDIAV EWESNGQPEN NYKTTPPVLD SDGSFFLYSK LTVDKSRWQQ          420
GNVFSCSVMH EALHNHYTQK SLSLSPGK                                             448
```

ANTI-GDF15 ANTIBODY AND A DOSAGE REGIMEN FOR THE TREATMENT OF CANCER

RELATED APPLICATIONS

This application is a continuation of U.S. patent application Ser. No. 18/314,940, filed May 10, 2023, which is a continuation of International Application No. PCT/EP2021/081236, filed Nov. 10, 2021, which claims benefit of European Application No. EP 20206801.1, filed Nov. 10, 2020, European Application No. EP 21175107.8, filed May 20, 2021, and European Application No. EP 21196910.0, filed Sep. 15, 2021, each of which is incorporated by reference herein in its entirety.

SEQUENCE LISTING

The instant application contains a sequence listing which has been submitted electronically in XML ST.26 format and is hereby incorporated by reference in its entirety (said XML. ST.26 copy created on May 5, 2025, is named 217993_SL.xml and is 19,564 bytes in size).

FIELD OF INVENTION

The present invention relates to an anti-GDF15 antibody and to a dosage regimen for the treatment of cancer in human subjects with cancer using the anti-GDF15 antibody.

BACKGROUND

GDF-15, is a divergent member of the TGF-beta superfamily for which functions in appetite regulation, metabolism, cell and tissue survival, and immune tolerance have been described. GDF-15 is a homodimer, that is generated as a pro-protein, which is cleaved to a 25 kDa (2×112 aa) dimeric mature GDF-15 and 2×18 kDa (2×167 aa) propeptides that reside in the tissue (Tsai 2018).

To date two main categories of activity of GDF-15 have been described. The first category relates to a metabolic effect, i.e. GDF-15 mediates cachexia via changing food-intake behavior, inducing anorexia. (Johnen 2007) This effect is mediated by a brain stem specific receptor named GFRAL which was described in late 2017 (Emmerson 2017). In contrast, the second category relates to an immunomodulatory effect, i.e. GDF-15 was shown to be a mediator of immune tolerance in pregnancy (Tong et al. 2004), tissue injury (Chung et al. 2017) and inflammation (Abulizi 2016), auto-immune diseases and tumor evasion. GDF-15 inhibits leukocyte integrin activation and thereby prevents their infiltration (Kempf 2011).

In recent years increasing evidence has emerged that GDF-15 seems to play a critical immuno-regulatory role in physiologic and pathophysiologic situations and specifically in cancer. For cancer cells it would naturally be highly attractive to utilize and "hijack" such an immune-cell repellant mechanism, blocking immune-cell entry into the tumor microenvironment, and consequently preventing the immune system from removing cancer cells. In line with this, in recent years a wealth of publications has emerged indicating that high GDF-15 serum levels in various cancer types correlate with shorter overall survival and that GDF-15 is an independent factor for patient survival within various tumor types (Wischhusen et al, 2020).

Elevated GDF-15 levels are frequently reported in cancer patients. In a microarray-based study comparing 150 carcinomas from 10 anatomic sites of origin with 46 normal tissues GDF-15 showed the highest level of tumor-associated (over)expression (Welsh 2003) and several studies correlate GDF-15 serum levels and response/prognosis in cancer.

In addition, two proprietary analyses with two different academic melanoma study groups indicate that GDF-15 levels also seem to correlate with response to PD-1 antagonists.

As indicated, cancer tissues, normal organ tissues in distress and placenta are known to overexpress GDF-15, most likely in all cases to prevent an excessive immune cell infiltration to the respective tissue. Hence, the inventors considered that GDF-15 produced by above tissues does substantially reduce vascular T cell adhesion and endothelial transmigration, preventing T cell entry into the respective tissue or its immediate proximity.

Whilst an anti-GDF-15 antibody generally shows a benign and well acceptable safety profile in animal models, this mode-of-action naturally carries various potential risks when aiming at providing a suitable dosage regimen for the treatment of humans.

Rational combination partners for an anti-GDF-15 antibody will be T-cell activating compounds, such as anti-PD-1/PD-L1 checkpoint inhibitors. The efficacy of such compounds may be substantially enhanced. Yet, potentially also their toxicities may be potentiated when combining them with certain dosage regimens of an anti-GDF-15 neutralizing antibody. A second potential area of concern is the physiologic role of GDF-15 in organ protection for organs in distress. If GDF-15 is suppressed using an anti-GDF-15 antibody and organ distress occurs (e.g. myocardial infarction, infection, other significant organ damage) excessive organ infiltration by immune cells and unwelcome tissue impairment/destruction might occur.

A third potential area of concern are rare findings made in individual mouse knock-out models for GDF-15 (Wischhusen 2020).

Moreover, two important mechanisms supporting the cytotoxic effect of antibody drugs on against tumor cells are Antibody-Dependent Cell-Mediated Cytotoxicity (ADCC) and Complement Dependent Cytotoxicity (CDC). Both mechanisms can be responsible for undesirable effects on endogenous healthy cells, expressing the antibody target or binding the antibody non-specifically.

In this respect, ADCC is an important mechanism for killing target cancer cells and is based on the binding of certain antibody drugs to human FcγRIIIa receptor on immune cells (mostly natural killer cells), resulting in activation of the bound killer cell. Thereby, the recognition and binding of the target antigen on tumor cells and the linkage between target cells and immune cells by the antibody is essential for ADCC induction. The cross-linkage of target and immune cells leads to the activation of ADCC MOA (mechanism of action) pathway and finally to cell lysis.

It is additionally important to provide a stable formulation for said antibody which can be safely administered to a patient and which meets all criteria of long-term stability.

DESCRIPTION OF INVENTION

The present invention aims to overcome the unmet clinical needs to provide a safe and effective composition for use in the therapeutic treatment of human patients.

The present invention furthermore provides a safe and stable formulation for said antibody.

Based on extensive experimental tests, the inventors of the present application have found that surprisingly neither Antibody-Dependent Cell-Mediated Cytotoxicity (ADCC) nor Complement Dependent Cytotoxicity (CDC) substantially contributes to the anti-cancer effect of the anti-GDF15 antibodies of the invention.

GDF-15 blocks adhesion and transgression of T-lymphocytes into tissues. With the anti-GDF15 antibodies of the invention blocking GDF-15 a treatment approach has been established that facilitates effector T cell entry into cancer tissue, without any contributions of ADCC or CDC to the anti-cancer effect. This should increase substantially efficacy of any T cell activating agent, e.g. checkpoint inhibitors, and thus allow to provide an effective immunotherapy, either alone or in combination with checkpoint inhibitors.

At the same time, the inventor's finding that neither ADCC nor CDC contributes to the anticancer effect allows to use anti-GDF-15 antibodies which do not induce ADCC and/or CDC effectively against cancer, increasing safety overall.

Hence, the anti-GDF-15 antibodies of the invention are particularly safe and thus surprisingly combine full efficacy against cancer with safety.

Moreover, the present applicant also provides the first dosage regimen of the anti-GDF15 antibody allowing an advantageous treatment of human patients.

Accordingly, the present invention provides the following preferred embodiments:

Item 1 A composition comprising an anti-GDF-15 antibody for use in a method of treating cancer and/or cancer cachexia in a human patient.

Item 2 The composition for use according to item 1, wherein the anti-GDF-15 antibody is to be administered at a dose of 0.3, 1.0, 3.0, 10.0 or 20.0 mg/kg, preferably 3, 10 or 20 mg/kg, more preferably 10 mg/kg, and at a dosage regimen of at least one administration cycle, wherein the cycle is a period of two weeks and wherein said dose is to be administered at least once in each of the at least one cycle.

Item 3 The composition for use according to item 1, wherein the anti-GDF-15 antibody is to be administered at a dose of between 10 and 20 mg/kg, preferably 20 mg/kg, and at a dosage regimen of at least one administration cycle, wherein the cycle is a period of four weeks and wherein said dose is to be administered at least once in each of the at least one cycle.

Item 4 The composition for use according to item 1, wherein the anti-GDF-15 antibody is to be administered at a dose of between 10 and 20 mg/kg and at a dosage regimen of at least one administration cycle, wherein the cycle is a period of three weeks and wherein said dose is to be administered at least once in each of the at least one cycle.

Item 5 The composition for use according to any one of items 1 to 4, wherein said antibody does not induce antibody-dependent cell-mediated cytotoxicity (ADCC) and/or does not induce Complement Dependent Cytotoxicity (CDC).

Item 6 The composition for use according to any one of items 1 to 5, wherein said anti-GDF-15 antibody is an IgG4 isotype antibody.

Item 7 The composition for use according to item 6, wherein said antibody comprises a hinge stabilizing mutation.

Item 8 The composition for use according to item 7, wherein said hinge stabilizing mutation is a S228P mutation.

Item 9 The composition for use according to any one of items 1 to 8, wherein said anti-GDF-15 antibody comprises a heavy chain variable domain comprising a CDR1 region represented by an amino acid sequences shown in SEQ ID NO: 1, a CDR2 region represented by an amino acid sequences shown in SEQ ID NO: 2 and a CDR3 region represented by an amino acid sequences shown in SEQ ID NO: 3 and a light chain variable domain comprising a CDR1 region represented by an amino acid sequences shown in SEQ ID NO: 4, a CDR2 region represented by an amino acid sequence ser-ala-ser and a CDR3 region represented by an amino acid sequences shown in SEQ ID NO: 5.

Item 10 The composition for use according to anyone of items 1 to 9, wherein the heavy chain variable domain of said antibody comprises the amino acid sequence represented by SEQ ID NO: 6 or an amino acid sequence having at least 90% identity to the amino acid sequence shown in SEQ ID NO: 6 and the light chain variable domain of said antibody comprises the amino acid sequence represented by SEQ ID NO: 7 or an amino acid sequence having at least 90% identity to the amino acid sequence shown in SEQ ID NO: 7.

Item 11 The composition for use according to any one of items 1 to 10, wherein the heavy chain of said antibody comprises the amino acid sequence represented by SEQ ID NO: 8 or an amino acid sequence having at least 90% identity to the amino acid sequence shown in SEQ ID NO: 8 and the light chain of said antibody comprises the amino acid sequence represented by SEQ ID NO: 9 or an amino acid sequence having at least 90% identity to the amino acid sequence shown in SEQ ID NO: 9.

Item 12 The composition for use according to any one of items 1 to 11, wherein said anti-GDF-15 antibody is obtainable by expression in CHO cells.

Item 13 The composition for use according to any one of items 1 to 12, wherein the concentration of GDF-15 in the serum/plasma of said patient is below 10 ng/mL at the end of an administration cycle.

Item 14 The composition for use according to item 13, wherein the concentration of GDF-15 in the serum of said patient is below 2 ng/mL at the end of an administration cycle.

Item 15 The composition for use according to item 13, wherein the concentration of GDF-15 in the serum of said patient is below 0.5 ng/mL at the end of an administration cycle.

Item 16 The composition for use according to any one of items 1 to 15, wherein the administration cycle is a period of three weeks and wherein said dose is to be administered at least once in each of the at least one cycle.

Item 17 The composition for use according to any one of items 1 to 15, wherein the administration cycle is a period of four weeks and wherein said dose is to be administered at least once in each of the at least one cycle.

Item 18 The composition for use according to any one of items 1 to 15, wherein said dosage regimen consists of multiple cycles and optionally of up to 52 administration cycles.

Item 19 The composition for use according to item 18, wherein said dosage regimen consists of 26 to 52 administration cycles.

Item 20 The composition for use according to item 16, wherein said dosage regimen consists of up to 34 administration cycles.

Item 21 The composition for use according to item 20, wherein said dosage regimen consists of 17 to 34 administration cycles.

Item 22 The composition for use according to item 17, wherein said dosage regimen consists of up to 26 administration cycles.

Item 23 The composition for use according to item 22 wherein said dosage regimen consists of 12 to 26 administration cycles.

Item 24 The composition for use according to any one of items 1 to 23, wherein said anti-GDF-15 antibody is to be administered in combination with a checkpoint inhibitor.

Item 25 The composition for use according to item 24, wherein said checkpoint inhibitor is selected from the groups consisting of anti-PD-1 antibody, anti-PD-L1 antibody, or anti-CD40 antibody.

Item 26 The composition for use according to items 24 or 25, wherein said checkpoint inhibitor is to be administered in the same dosage regimen as the GDF-15 antibody.

Item 27 The composition for use according to any one of items 24 to 26, wherein said checkpoint inhibitor is to be administered prior to the administration of GDF-15 antibody.

Item 28 The composition for use according to item 27, wherein said checkpoint inhibitor is to be administered within 120 min prior to the administration of GDF-15 antibody.

Item 29 The composition for use according to item 28, wherein said checkpoint inhibitor is to be administered within 30 minutes prior to the administration of GDF-15 antibody.

Item 30 The composition for use according to any one of items 1 to 29, wherein the cancer is selected from the group consisting of all brain cancers (including glioma), all cancers of the nervous system, melanoma, lung cancer, liver cancer, endometrial cancer, cervical cancer, ovarian cancer, breast cancer, renal cell carcinoma, bone and soft tissue tumors (including e.g. Ewing's sarcoma), non-small cell lung cancer and small cell lung cancer, lip and oral cavity cancer, nasopharynx cancer, larynx cancer, pharynx cancer, any type of head and neck cancer, leukemia, Hodgkin's lymphoma, Non-Hodgkin's lymphoma, bladder cancer, any type of urothelial tract cancer, cancer of the testis, thyroid cancer, kidney cancer, gallbladder and choledochus tract cancer, multiple myeloma, oesophageal cancer, gastrointestinal tumors including stomach, colorectal, rectal and anal cancer, pancreatic cancer, prostate cancer, ovarian cancer, breast carcinoma, and carcinoma of unknown primary, and any other type of human cancer, and wherein the use is optionally also a use for the treatment of cancer-cachexia.

Item 31 The composition for use according to any one of items 1 to 30, wherein said dose of the anti-GDF-15 antibody is to be administered intravenously.

Item 32 An anti-GDF-15 antibody, wherein said antibody is an IgG4 isotype antibody having a hinge stabilizing mutation and wherein the heavy chain variable domain of said antibody comprises the amino acid sequence represented by SEQ ID NO: 6 or an amino acid sequence having at least 90% identity to the amino acid sequence shown in SEQ ID NO: 6 and the light chain variable domain of said antibody comprises the amino acid sequence represented by SEQ ID NO: 7 or an amino acid sequence having at least 90% identity to the amino acid sequence shown in SEQ ID NO: 7.

Item 33 The anti-GDF-15 antibody according to item 32, wherein the heavy chain of said antibody comprises the amino acid sequence represented by SEQ ID NO: 8 or an amino acid sequence having at least 90% identity, preferably at least 95% identity, more preferably at least 98% identity to the amino acid sequence shown in SEQ ID NO: 8 and the light chain of said antibody comprises the amino acid sequence represented by SEQ ID NO: 9 or an amino acid sequence having at least 90% identity, preferably at least 95% identity, more preferably at least 98% identity to the amino acid sequence shown in SEQ ID NO: 9.

Item 34 The anti-GDF-15 antibody according to items 32 or 33, wherein said hinge stabilizing mutation is a S228P mutation.

Item 35 The antibody according to any one of item 32 to 34, wherein said antibody does not induce antibody-dependent cell-mediated cytotoxicity (ADCC) and/or does not induce Complement Dependent Cytotoxicity (CDC).

Item 36 The antibody according to any one of items 32 to 35, wherein said antibody is obtainable by expression in CHO cells.

Item 37 The antibody according to any one of items 32 to 36, wherein said anti-GDF-15 antibody comprises a heavy chain variable domain comprising a CDR1 region represented by an amino acid sequences shown in SEQ ID NO: 1, a CDR2 region represented by an amino acid sequences shown in SEQ ID NO: 2 and a CDR3 region represented by an amino acid sequences shown in SEQ ID NO: 3 and a light chain variable domain comprising a CDR1 region represented by an amino acid sequences shown in SEQ ID NO: 4, a CDR2 region represented by an amino acid sequence ser-ala-ser and a CDR3 region represented by an amino acid sequences shown in SEQ ID NO: 5.

Item 38 A formulation comprising the anti-GDF-15-antibody as defined above or the composition for use, comprising said antibody as defined above, wherein said formulation comprises 10-50 mg/ml of the anti-GDF-15 antibody.

Item 39 The formulation according to item 38, wherein said formulation comprises histidine/histidine HCl, sucrose, arginine-HCl, and polysorbate at a pH between 5 and 6.

Item 40 The formulation according to item 38 or 39, wherein said formulation comprises 10-50 mg/ml CTL-002, 10-50 mg/ml histidine/histidine HCl, 100-200 mM sucrose, 20-80 mM arginine-HCl, and 0.01 to 0.05% w/v polysorbate 20 or polysorbate 80 at a pH between 5.0 and 6.0, preferably between pH 5.3 and 5.7.

Item 41 The formulation according to any one or more of items 38-40, which comprises 25 mg/ml CTL-002, 20 mM histidine/histidine HCl, 150 mM sucrose, 50 mM arginine-HCl, 0.02% w/v polysorbate 20, at pH 5.5.

Item 42 The formulation according to item 41, which consists of 25 mg/ml CTL-002, 20 mM histidine/histidine HCl, 150 mM sucrose, 50 mM arginine-HCl, 0.02% w/v polysorbate 20, at pH 5.5.

Anti-GDF-15 antibody B1-23 alone had only minimal effect, whereas combination with anti-PD-1 was able to substantially reverse the impairment of anti-PD-1 treatment.

FIG. 2A-FIG. 2D: Baseline GDF-15 serum level correlate with response to anti-PD1/-L1 treatment.

(FIG. 2A+FIG. 2B) Study in advanced stage melanoma patients. Baseline GDF-15 level are linked to (FIG. 2A) response outcome and (FIG. 2B) overall survival (FIG. 2C+FIG. 2D) in advanced stage melanoma. Baseline GDF-15 level are linked to (FIG. 2C) response outcome and (FIG. 2D) overall survival.

Figure 3:
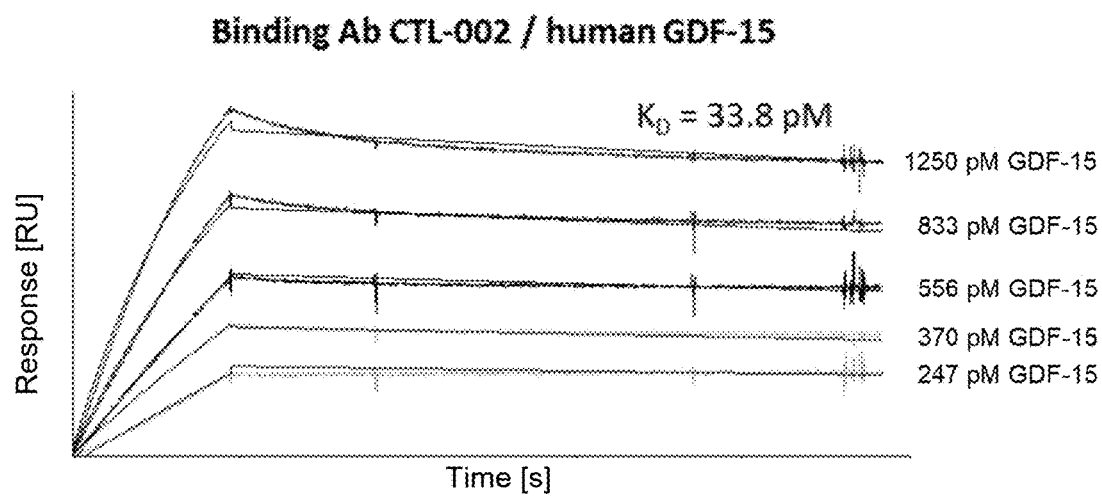

FIG. 3: Affinity determination human antibody CTL-002 (=H1L5 IgG4)

Binding kinetics analyzed using Biacore T3000. Different GDF-15 concentrations were applied to a flow cell with CTL-002. Association and dissociation phases were recorded to calculate the dissociation constant of the antibody. Kinetic data were evaluated by global fitting using software BIAevaluation 4.1. One representative measurement of three is shown.

Figure 4:
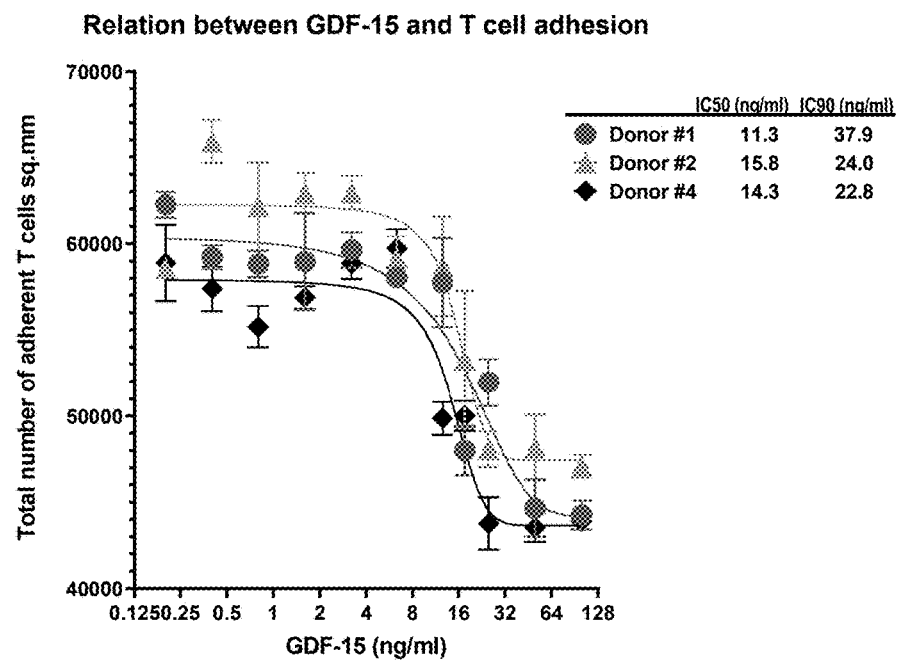

FIG. 4: GDF-15 has an IC50 of 7 to 14 ng/ml in the in vitro flow-adhesion assay.

HUVECs are cultured over 3-days before overnight activation. T-cells are purified from healthy donors and purified on the day of experimentation. Physiological flow is generated through mounted HUVEC channel slides using a calibrated pump. Primary T-cells are pretreated with a dose titration from 0.4 to 100 ng/ml of GDF-15 for 20 mins. The HUVEC monolayer is equilibrated 20 mins with wash buffer containing 1 uM CXCL12, then perfused 6 min with the pretreated T-cells followed by a co-culture step with wash buffer for 40 mins. Individual images are recorded every 30-secs on 1 fixed field and adhesion events are recorded as the total of number of cells per unit field. Due to technical and biological variability of the assay the IC50 usually is between 7 and 14 ng/ml.

| Assay System | Experiment | $IC_{50}$ of GDF-15 |
|---|---|---|
| Cell-based flow adhesion | Study 1 (n = 3) | 13.8 ng/ml |
| | Study 2 (n = 3) | 7.47 ng/ml |

Figure 5:
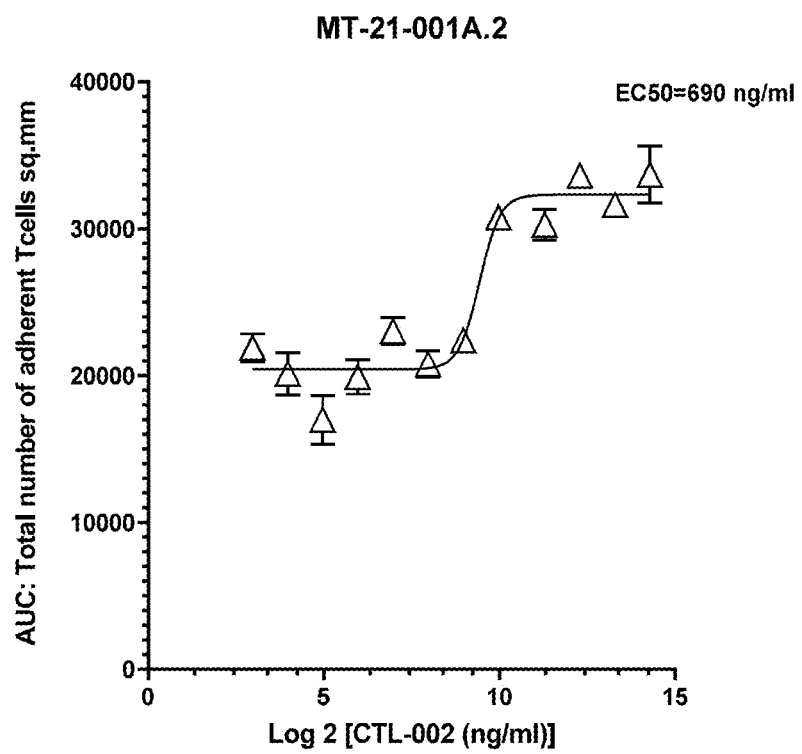

FIG. 5: CTL-002 reverts adhesion inhibition of GDF-15 in a concentration dependent manner with an EC50 of 690 to 725 ng/ml HUVECs are cultured over 3-days before overnight activation. T-cells are purified from healthy donors and purified on the day of experimentation. 50 ng/ml GDF-15 was preincubated with CTL-002 at different concentrations for 20 minutes to allow binding. Primary T-cells and HUVEC monolayer are pretreated with CTL-002/GDF-15 complex for 20 mins. The HUVEC monolayer is perfused after CTL-002/GDF-15 incubation with wash buffer containing 1 uM CXCL12 for 5 minutes followed by a 15 minutes stasis. After washing, the pretreated T-cells are perfused for 6 minutes followed by a 50 minutes wash. The first time-point is recorded after 10 mins and then individual images are recorded every 30-secs on 1 fixed field and adhesion events are recorded as the total of number of cells per unit field for 50 minutes in total. Plots of AUC values were generated to determine EC50. Three individual donors are shown. Due to technical and biological variability of the assay the IC50 usually is between 690 and 725 ng/ml.

Figure 6:
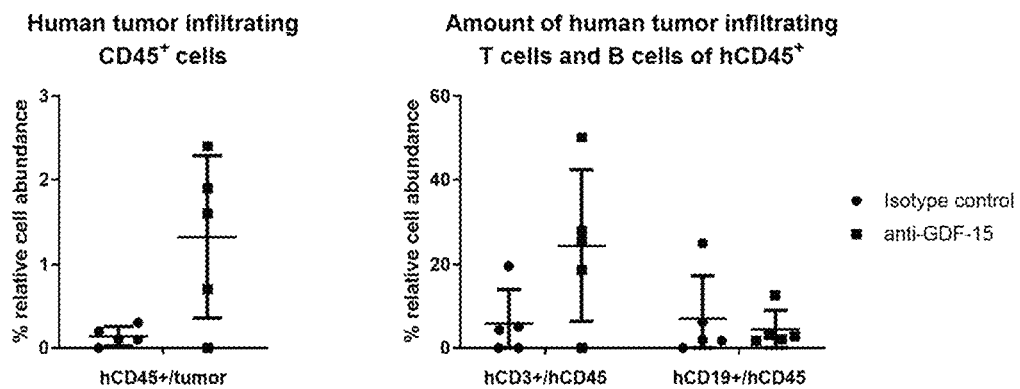

FIG. 6: CTL-002 treated animals show higher immune cell infiltration enriched in CD3+ cells.

Figure 7:
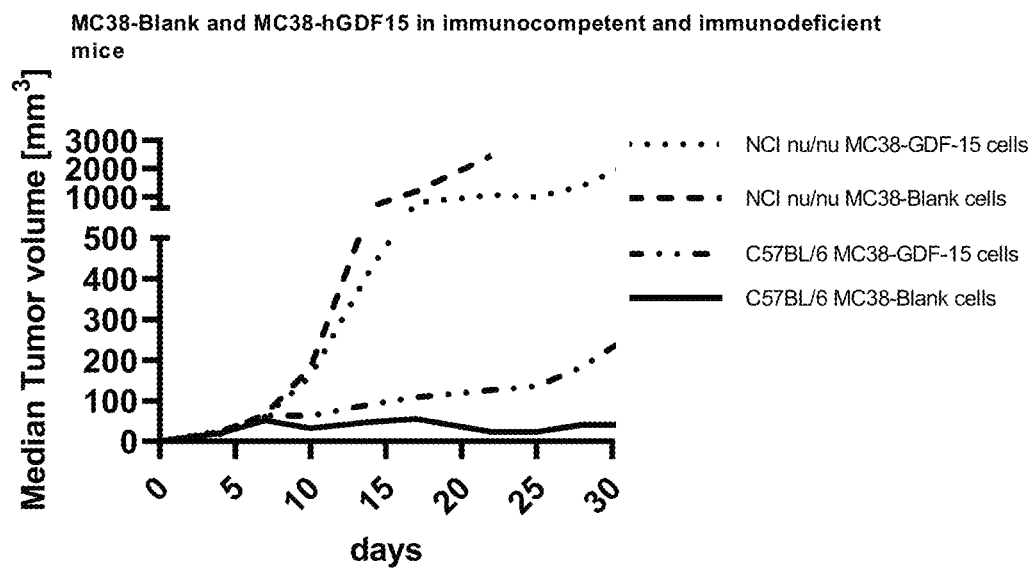

FIG. 7: MC38-hGDF-15 show a growth advantage only in immune competent mice.

Figure 8A:
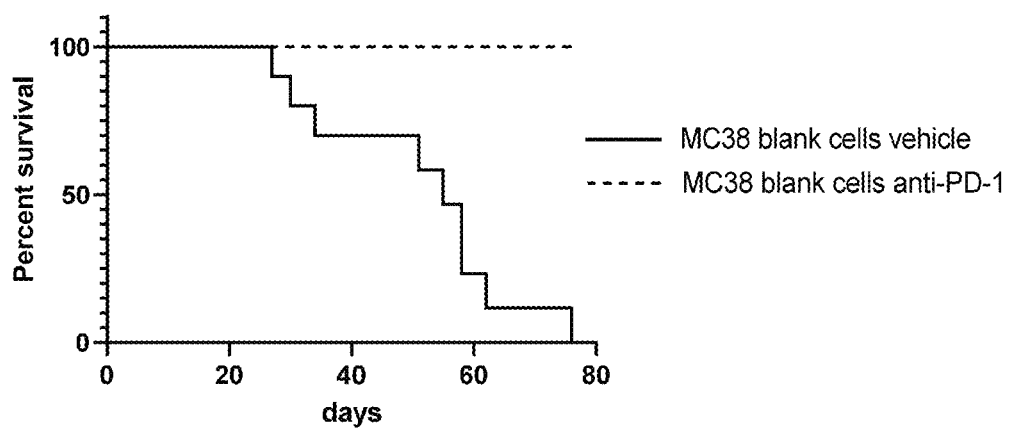
Figure 8B:
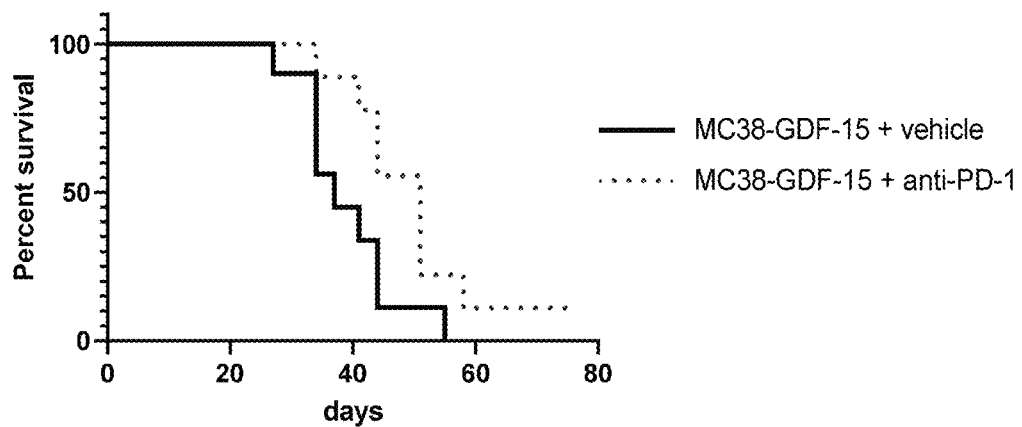

FIG. 8A and FIG. 8B: GDF-15 expression interferes with successful anti-PD-1 therapy.

MC38 blank tumors respond to anti-PD-1 treatment (FIG. 8A), whereas GDF-15 secreting tumors showed severely impaired response to anti-PD-1 (FIG. 8B).

Figure 9A:
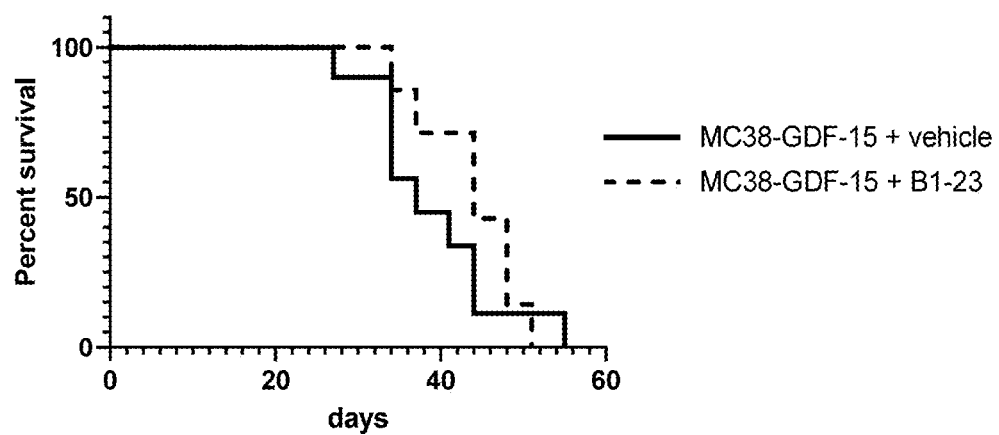
Figure 9B:
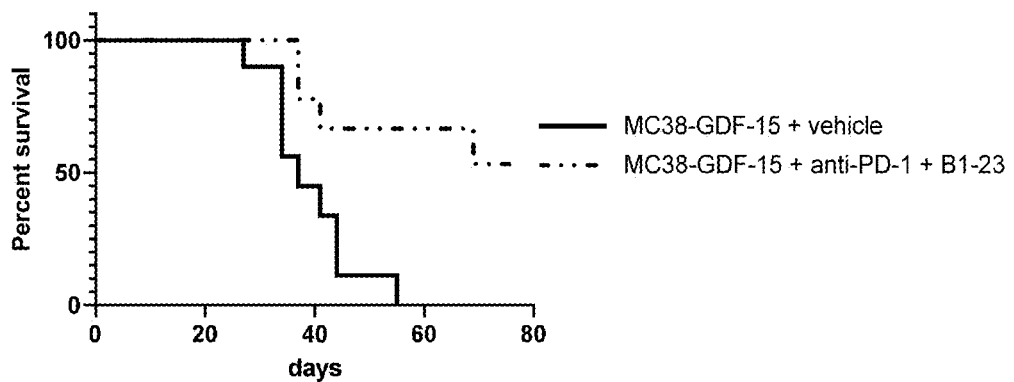

FIG. 9A and FIG. 9B: Therapy of high-GDF-15 tumors with anti-GDF-15 plus anti-PD-1 antibodies can reestablish therapy success of checkpoint inhibition.

Anti-GDF-15 antibody B1-23 alone (solid line, FIG. 9A) had only minimal effect, whereas combination with anti-PD-1 (dashed line, FIG. 9B) was able to partially reverse the impairment of anti-PD-1 treatment.

Figure 10:
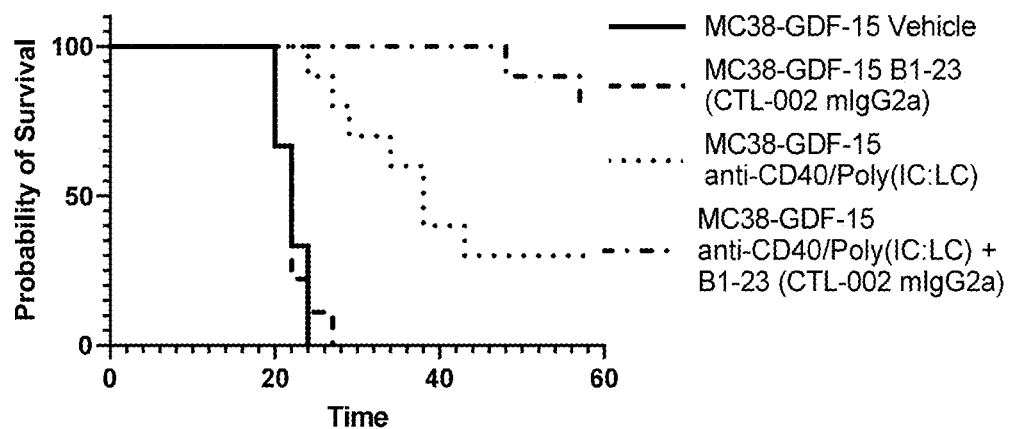

FIG. 10: Combination of B1-23 with anti-CD40/Poly(IC:LC) immunotherapy eradicated MC38 expressing human GDF-15 in contrast to anti-CD40/Poly(IC:LC) alone.

Figure 11:
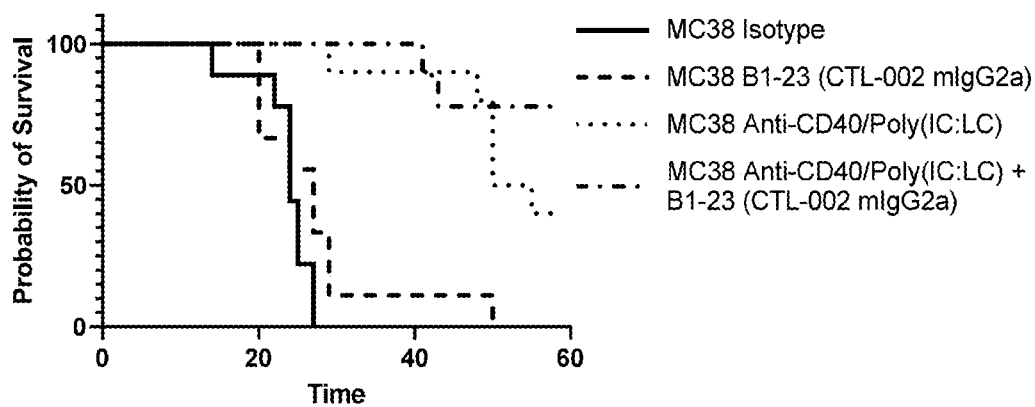

FIG. 11: Combination of B1-23 with anti-CD40/Poly(IC:LC) immunotherapy eradicated MC38 in contrast to anti-CD40/Poly(IC:LC) alone.

Figure 12:
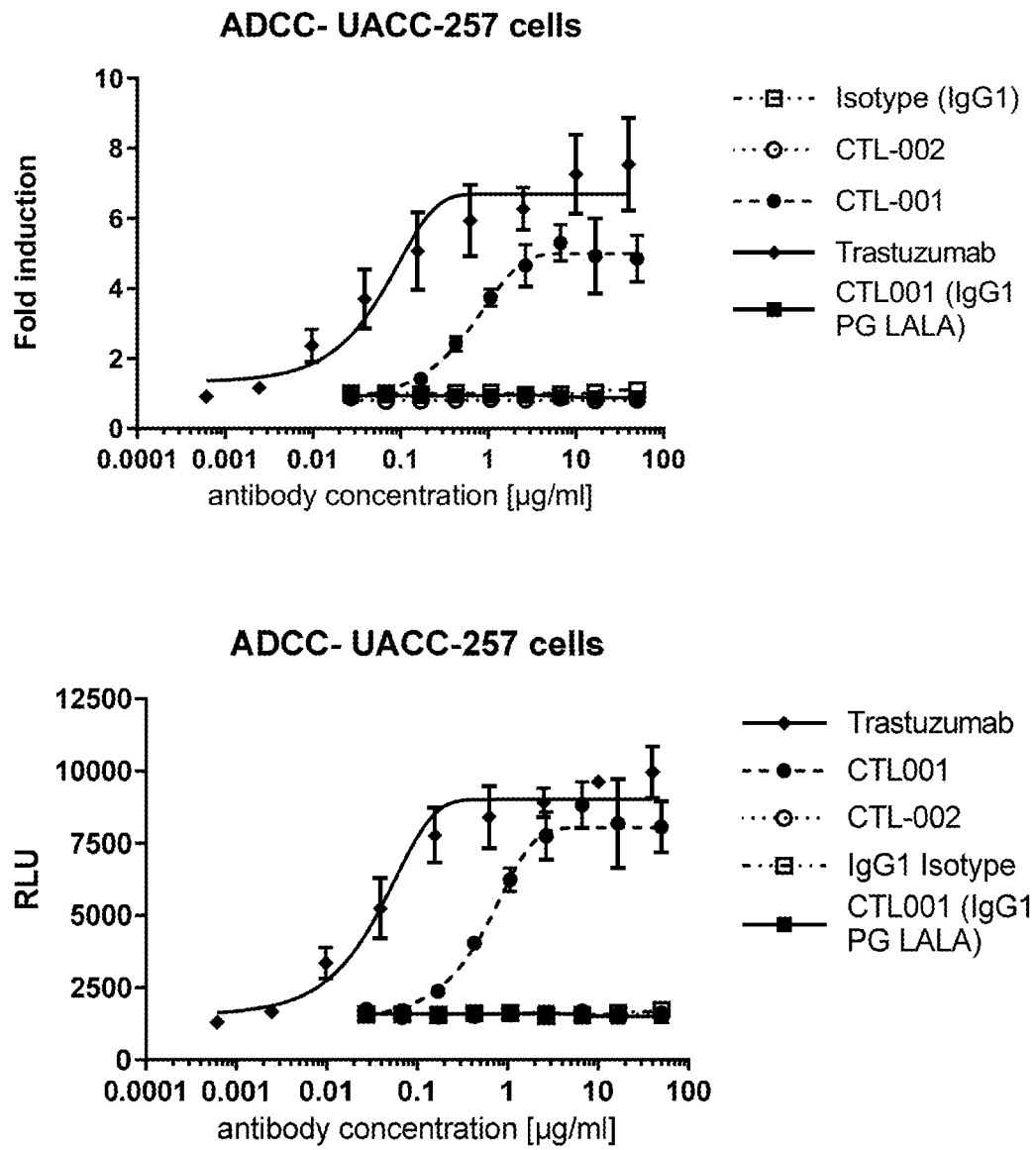

FIG. 12: ADCC induction in UACC-257 with test antibodies CTL-001, variants CTL-001 IgG1*PG LALA and CTL-002.

Target cells were incubated with effector cells and different concentrations of test or control antibody for 6 h at 37° C. in triplicates. Afterwards, luminescence signal was measured. Here, the fold induction of the luminescence signal or the obtained relative light units (RLU) was plotted against the antibody concentration.

Figure 13:
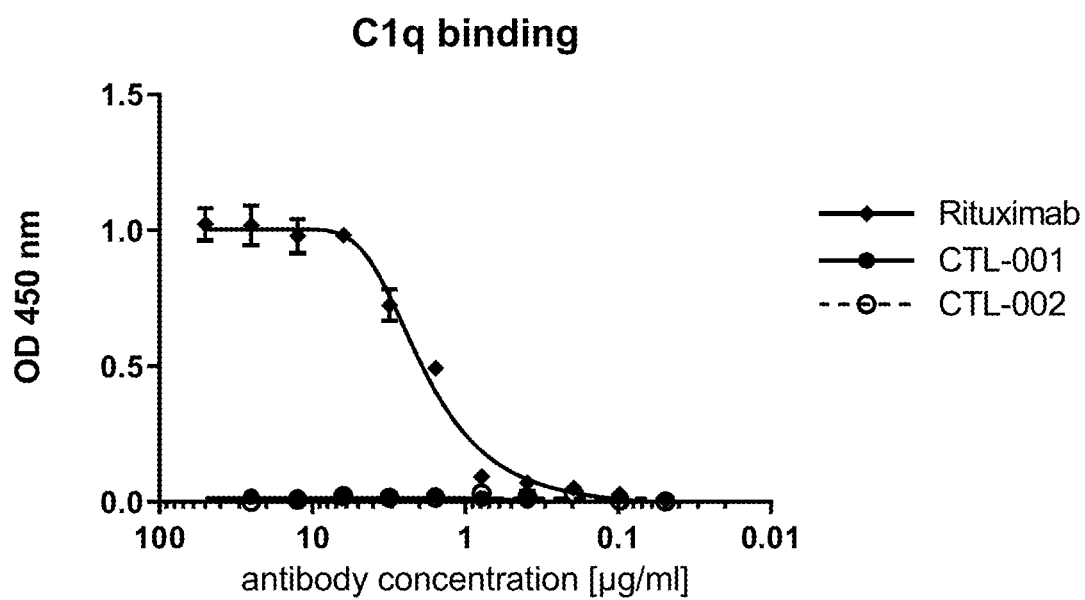

FIG. 13: Binding of human complement protein C1q to CTL-001, different isotype variants of CTL-001, CTL-002 and control antibody Rituximab in varying concentrations.

Interaction of C1q protein and therapeutic antibody was determined in an ELISA-based approach with 10 μg/ml human C1q protein using a HRP-conjugated anti-C1q antibody for detection. Here, CTL-001 and the different isotype variants were incubated to prior coated human GDF-15 protein before C1q binding was obtained. Experiment was performed in triplicated and mean of absorption (A450 nm) was plotted against the antibody concentration.

Figures 14A, 14B:
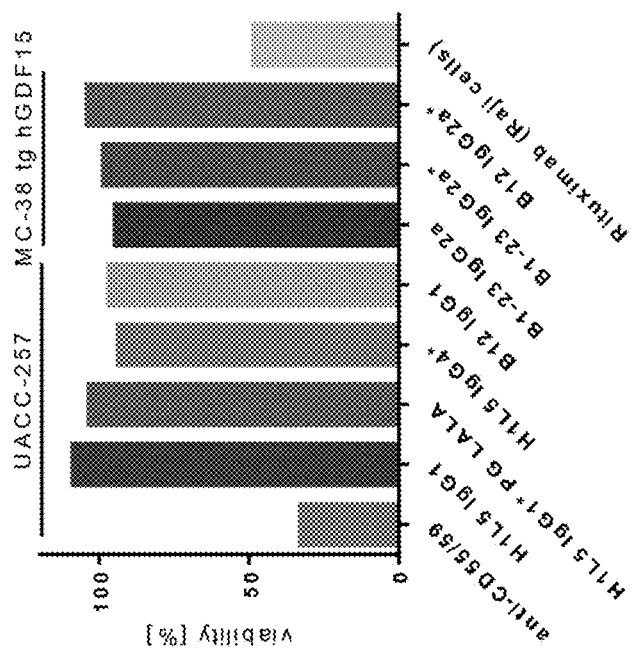

FIG. 14A and FIG. 14B: Complement dependent cytotoxicity (CDC) induced by test antibodies and different control antibodies to GDF-15 expressing cells.

Cells were incubated with the indicated concentrations of test or control antibodies in presence of 10% serum containing active baby rabbit complement proteins. Alamar Blue Viability dye was added to determine the viability of the cells. The mean fluorescence intensity (MFI) was measured after an incubation time of 6 h respectively 24 h at 37° C. and 5% CO2. Calculated viability after 6 h [FIG. 14A] and after 24 h [FIG. 14B] of incubation are shown. Plotted is always the highest used antibody concentration.

Figure 15:
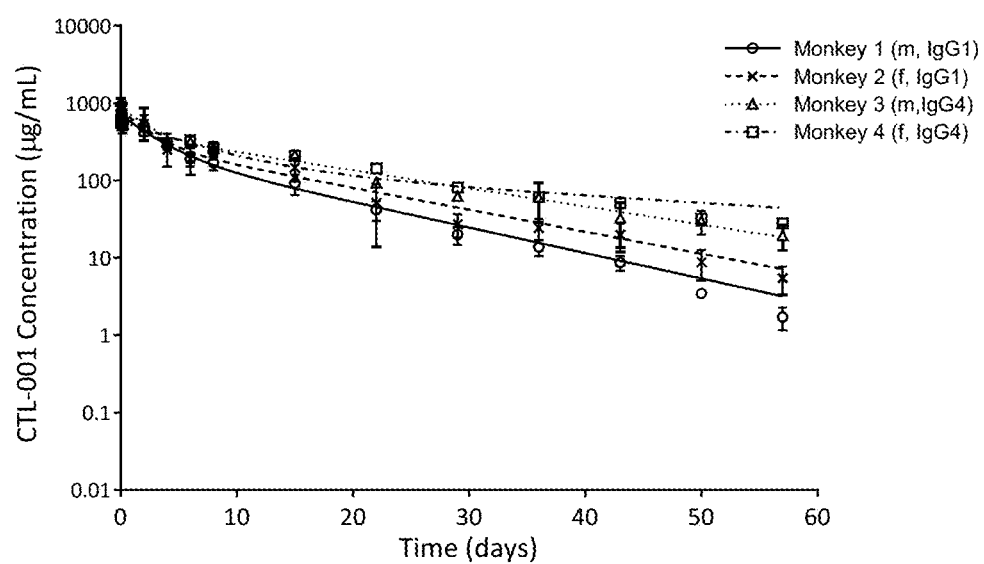

FIG. 15: Serum concentration-time profiles of CTL-001 and CTL-002 in Cynomolgus monkeys.

Figure 16:
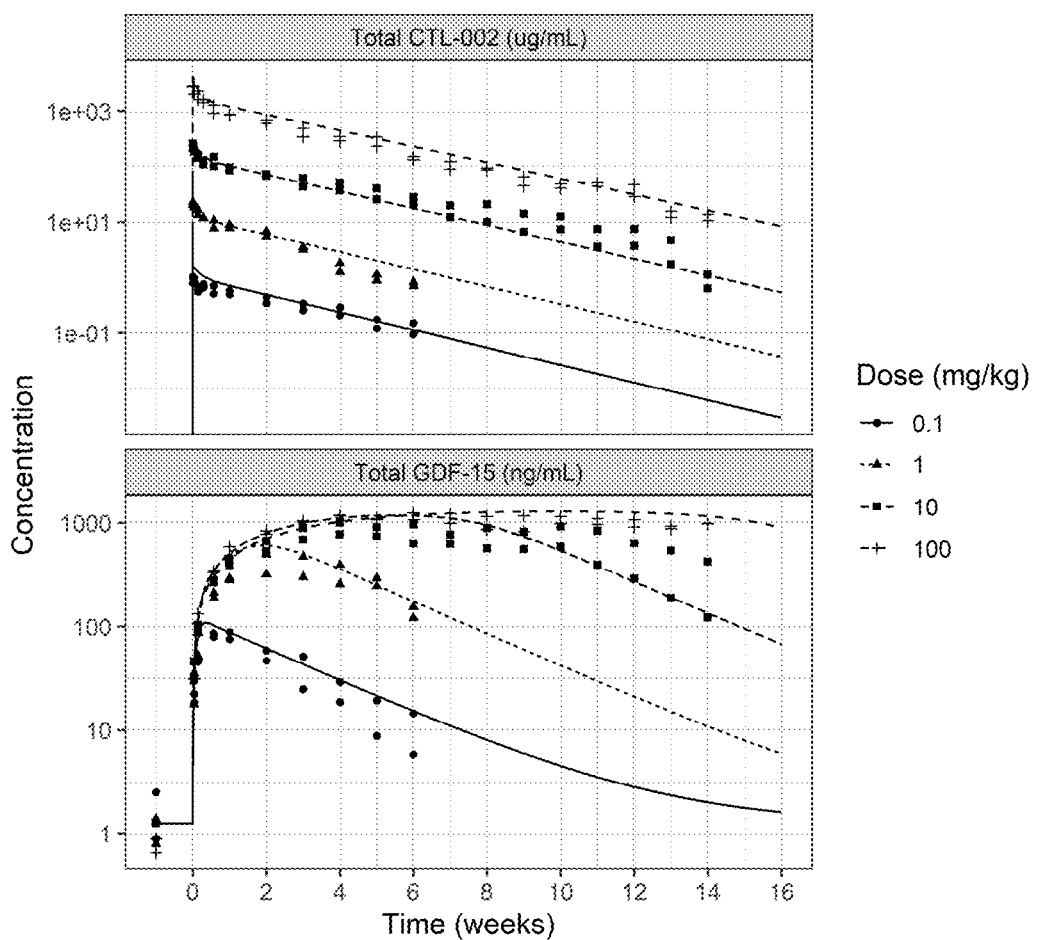

FIG. 16: Observed CTL-002 PK and total GDF-15 NHP DRF study

Note: the PK of CTL-002 is linear and approximately dose-proportional in the range 1-100 mg/kg. A plateau in GDF-15 capture at both 10 and 100 mg/kg dose indicates that all the available GDF-15 has been captured and increasing the dose simply increases the duration of complete target capture.

Figure 17:
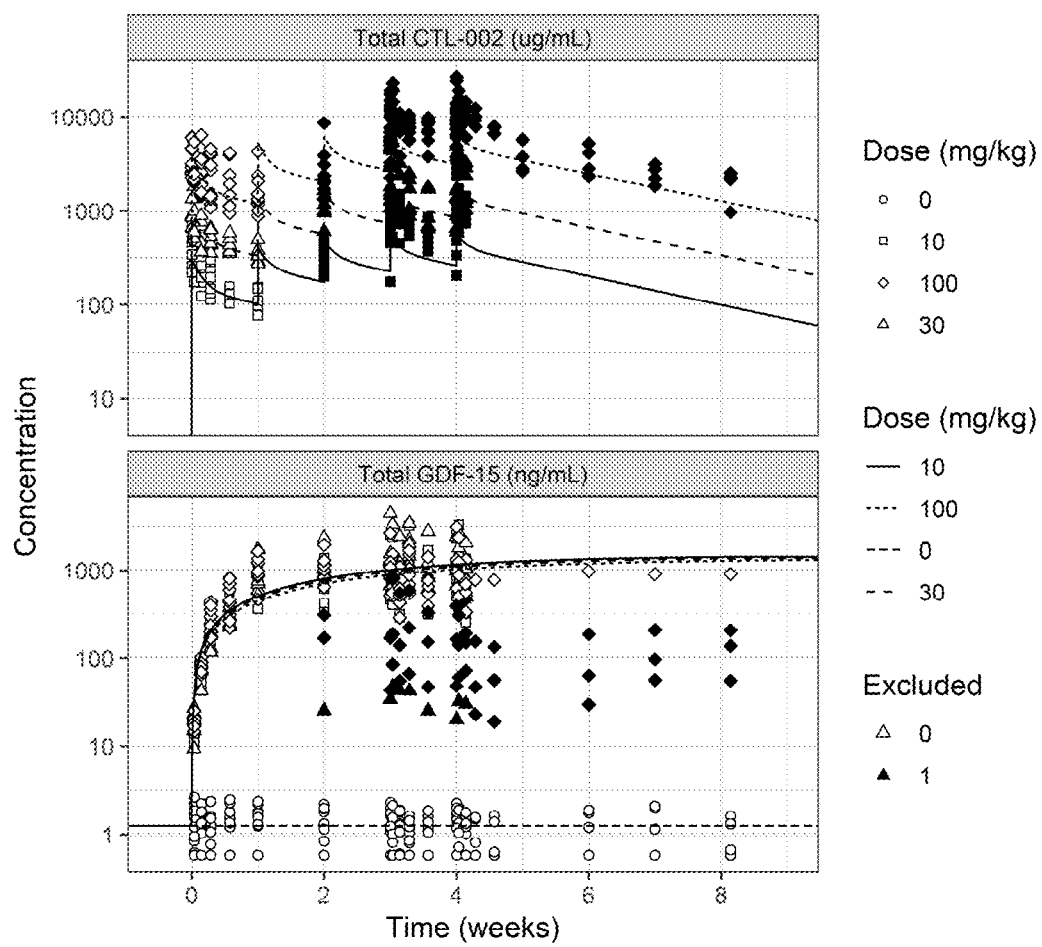

FIG. 17: Observed CTL-002 PK and total GDF-15—NHP 4 wk GLP toxicity study

Observed values (symbols) for individual animals in the 4 wk GLP toxicity study. Solid lines—PK-PD model fitted to the observed data: data shown as a solid circle were included in the PK-PD model, data shown as a cross are outliers which were excluded from PK-PD modelling.

Figure 18:
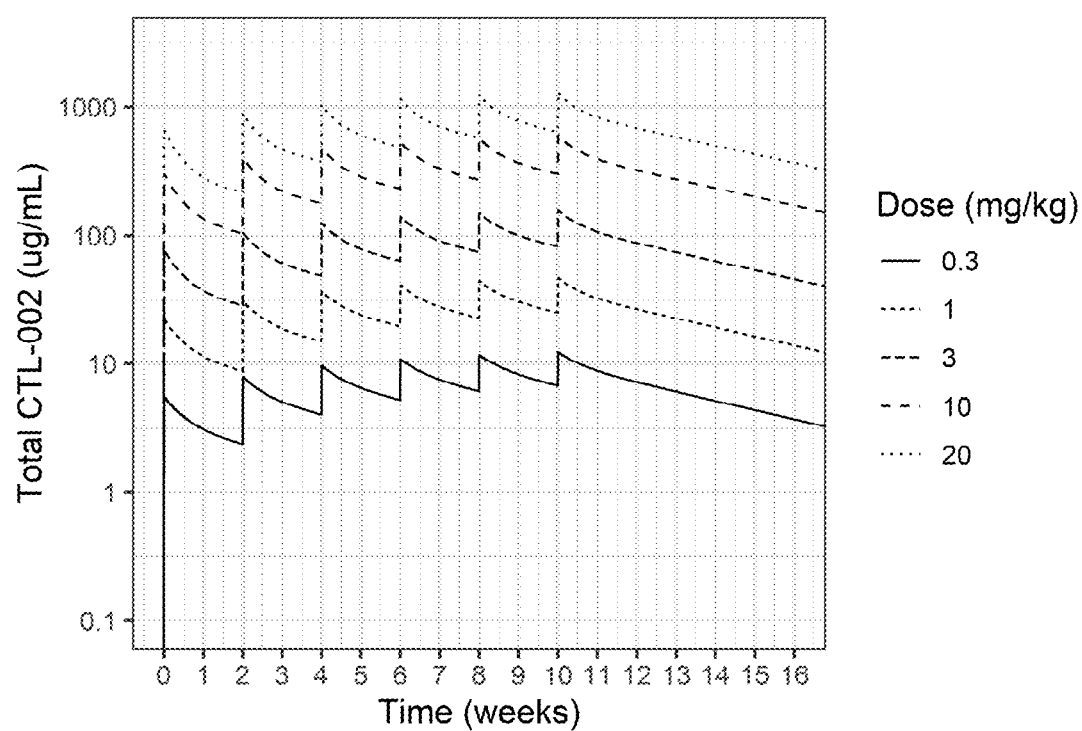

FIG. 18: Predicted human CTL-002 PK (serum concentration)

Figure 19:
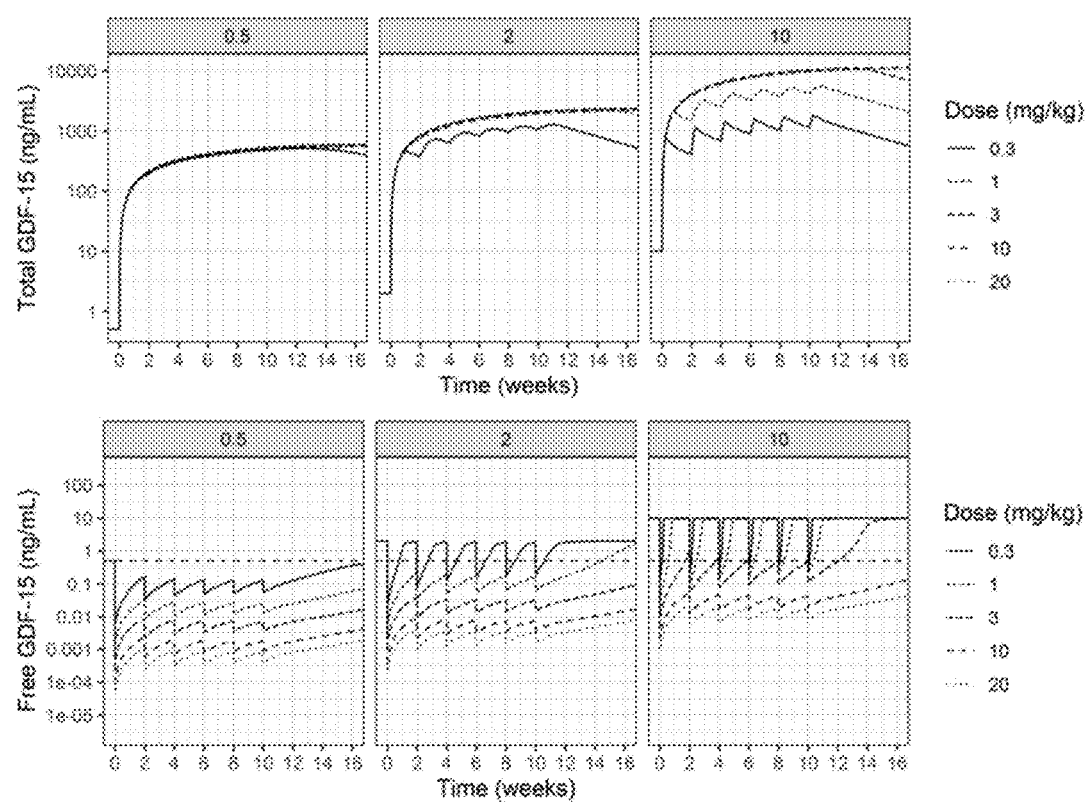

FIG. 19: Predicted human free and total GDF-15 (serum concentration)

Predicted suppression of GDF-15 in the systemic circulation Three baseline levels of serum GDF-15 are considered; 0.5 ng/mL (mean level in healthy subjects and approx. 15th percentile in cancer patient cohort), 2 ng/mL (median level in cancer patient cohort; 50th percentile) and 10 ng/mL (98th percentile in cancer patient cohort)

Figure 20:
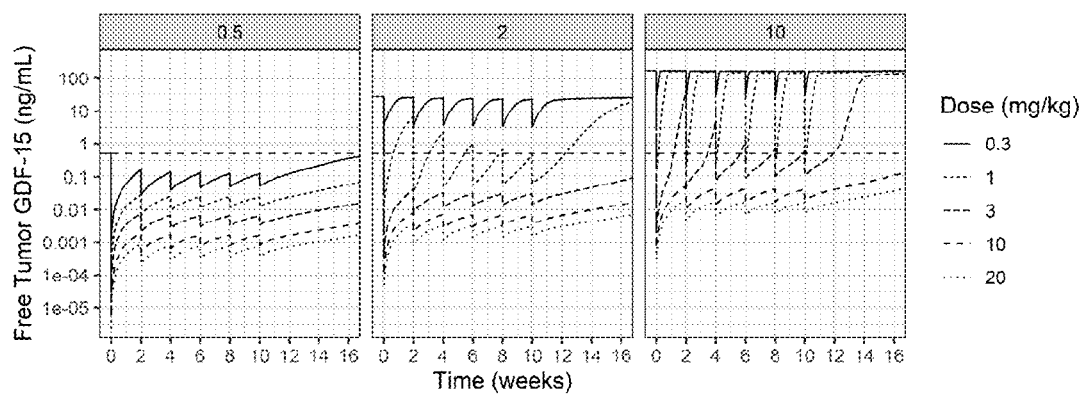

FIG. 20: Predicted GDF-15 suppression in the tumor micro-vasculature

Predicted suppression of GDF-15 in the tumor microvasculature Assumption: three baseline levels of systemic GDF-15; 0.5, 2 and 10 ng/mL; resulting in tumor microvasculature GDF-15 concentrations of 0.5, 25 and 161 ng/mL, respectively.

Figure 21:
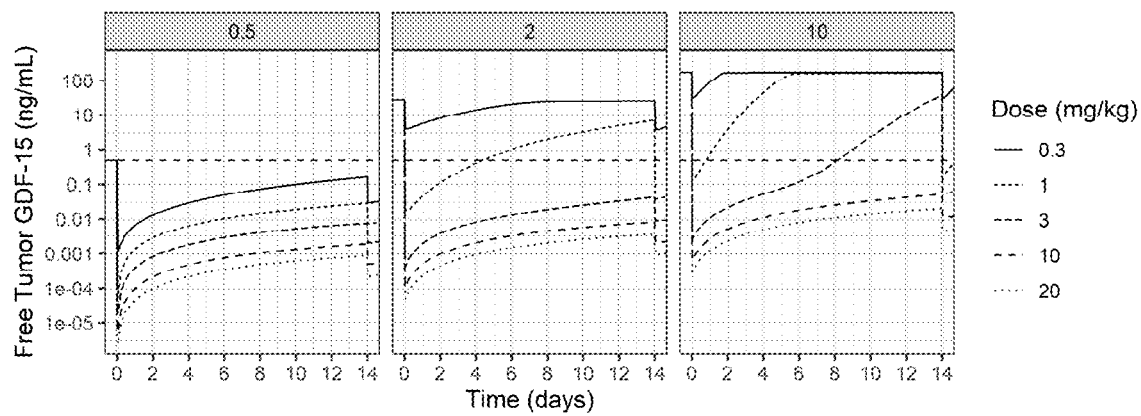

FIG. 21: Predicted inhibition of serum GDF-15 at planned clinical doses and for a range of baseline levels.

Normal serum level of GDF-15 in healthy subjects (0.5 ng/mL) indicated as a dashed line.

FIG. 22: Sequence of the binding region of CTL-002 in various species

The sequences of the binding regions of CTL-002 are shown for humans, cynomolgus monkeys, mice and rats (first four lines from top to bottom).

Figure 23:
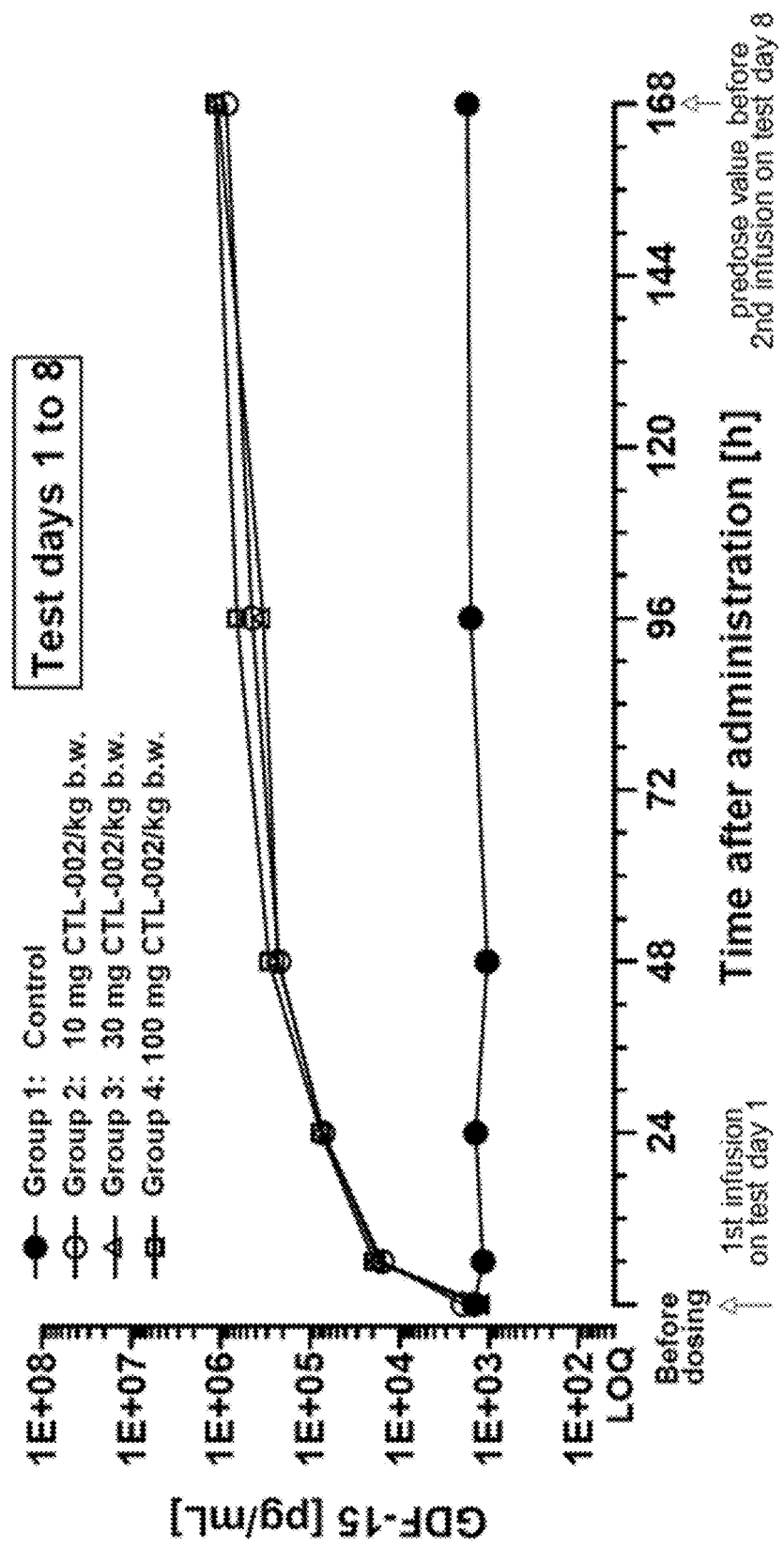

FIG. 23: GDF-15 serum levels in female monkeys following the first dose of CTL-002

Figure 24:
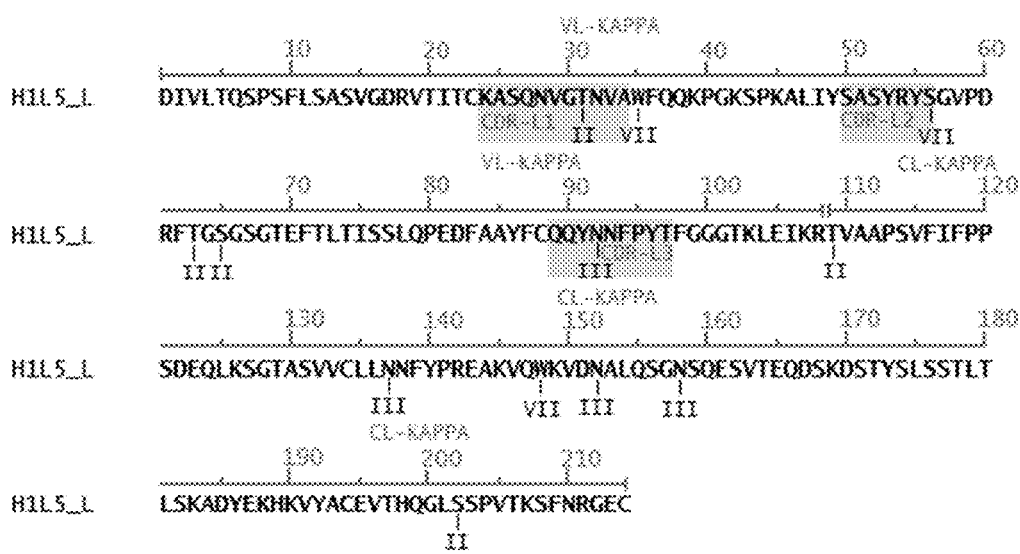

FIG. 24: Sequence liability map of H1L5 light chain

The sequence map shows as diagrammatic representations the locations of all identified sequence liabilities in the H1L5 light chain. The locations of the domain boundaries and the CDRs as well as the type of liability are detected at a given position in relation to the overall sequence. The type of of liability is indicated as follows: (I) Asn N-Linked Glycosylation, (II) Ser/Thr O-Linked Glycosylation, (III) Asn Deamidation, (IV) Asp Isomerisation/Fragmentation, (V) Pyro-Glutamate, (VI) C-Terminal Lys, (VII) Met/Trp Oxidation, (VIII) Free Thiol.

Figure 25:
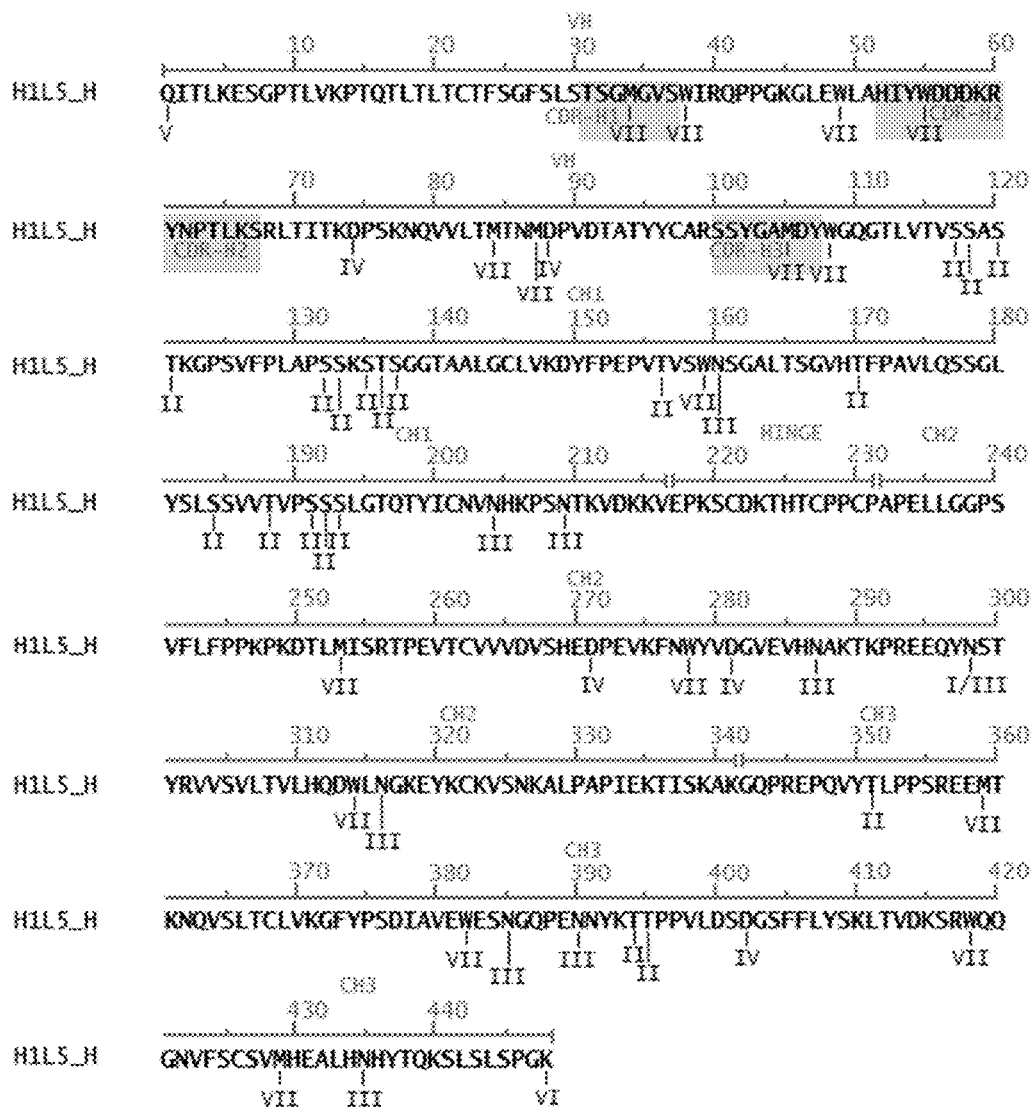

FIG. 25: Sequence liability map of H1L5 heavy chain

The sequence map shows as diagrammatic representations the locations of all identified sequence liabilities in the H1L5 heavy chain. The locations of the domain boundaries and the CDRs as well as the type of liability are detected at a given position in relation to the overall sequence. The type of of liability is indicated as follows: (I) Asn N-Linked Glycosylation, (II) Ser/Thr O-Linked Glycosylation, (Ill) Asn Deamidation, (IV) Asp Isomerisation/Fragmentation, (V) Pyro-Glutamate, (VI) C-Terminal Lys, (VII) Met/Trp Oxidation, (VIII) Free Thiol.

DETAILED DESCRIPTION OF INVENTION

Unless specifically defined herein, all technical and scientific terms used herein have the same meaning as commonly understood by a skilled artisan in the fields of gene therapy, immunology, biochemistry, genetics, and molecular biology.

All methods and materials similar or equivalent to those described herein can be used in the practice or testing of the present invention, with suitable methods and materials being described herein.

As used herein, each occurrence of terms such as "comprising" or "comprises" may optionally be substituted with "consisting of" or "consists of".

The present invention provides an anti-GDF15 antibody which may be used in the treatment of cancer in human patients.

In an embodiment of the invention, the anti-GDF15 antibody does not induce antibody-dependent cell-mediated cytotoxicity (ADCC). The ADCC reporter assay to determine whether an antibody induces antibody-dependent cell-mediated cytotoxicity is not particularly limited and may be any ADCC reporter assay known in the art. An exemplary ADCC reporter assay may be the ADCC Reporter Bioassay, Core Kit (Technical Manual TM383, Promega Corporation) and is performed according to the manufacturer's protocol. In this respect, the test and control antibodies may be applied in different concentrations to the target cells and may be incubated with FcγRIIIa expressing effector cells for 6 h at 37° C. Afterwards a luciferase substrate may be added and the luminescence signal may be determined with a luminescence reader after 30 min of incubation at RT.

GDF-15 can be measured by ELISA. ELISAs which can be used to measure GDF-15 include but are not limited to the R&D systems Quantikine ELISA, an immunoradiometric assay, Luminex™ sandwich assay and electrochemiluminescence sandwich assay, as e.g. the ELECSYS® GDF15 assay (Roche Diagnostics), which was summarized by Wollert et al. (Wollert K C, Kempf T, Giannitsis E, et al. An Automated Assay for Growth Differentiation Factor 15. J Appl Lab Med An AACC Publ. 2018; 1(5):510-521. doi: 10.1373/jalm.2016.022376). All mentioned assays are based on the immunosandwich principle using monoclonal or polyclonal antibodies to capture and to quantify the GDF-15. Dependent on the used reagents and their combination, free GDF-15 or total GDF-15 (free GDF-15 and GDF-15 bound to CTL-002) is measured.

In a preferred embodiment in accordance with all other embodiments of the invention, the cancer is a "solid cancer". A "solid cancer" is a cancer which forms one or more solid tumors. Such solid cancers forming solid tumors are generally known in the art. The term "solid cancer" encompasses both a primary tumor formed by the cancer and possible secondary tumors, which are also known as metastases. Preferred solid cancers to be treated according to the invention are selected from the group consisting of melanoma, colorectal cancer, prostate cancer, head and neck cancer, urothelial cancer, stomach cancer, pancreatic cancer, liver cancer, testis cancer, ovarian cancer, endometrial cancer, cervical cancer, brain cancer, breast cancer, gastric cancer, renal cell carcinoma, Ewing's sarcoma, non-small cell lung cancer and small cell lung cancer, carcinoma of unknown primary, preferably selected from the group consisting of melanoma, colorectal cancer, prostate cancer, head and neck cancer, urothelial cancer, stomach cancer, pancreatic cancer, liver cancer, testis cancer, ovarian cancer, endometrial cancer and cervical cancer, more preferably selected from the group consisting of melanoma, colorectal cancer, prostate cancer, head and neck cancer, urothelial cancer and stomach cancer, and most preferably selected from the group consisting of melanoma, colorectal cancer and prostate cancer.

As referred to herein, the terms "CTL-002", "CTL-001 IgG4*", "CTL-001 IgG4" and "H1L5 IgG4*" are used synonymously. They refer to an antibody having the heavy chain amino acid sequence of SEQ ID NO: 8 and the light chain amino acid sequence of SEQ ID NO: 9.

In a preferred embodiment in accordance with all other embodiments of the invention, the GDF-15 is human GDF-15 (also referred to herein has "hGDF-15") and the anti-GDF-15 antibody is an anti-human GDF-15 antibody (also referred to herein as "anti-hGDF-15 antibody").

Provision of Stable Formulation

Therapeutic proteins are complex and very heterogeneous due to post-translational modifications (PTMs) and chemical modifications. These modifications include glycosylation, deamidation, oxidation and variations of N- and C-termini. Modifications which result in relevant product-related variants are classified as critical quality attributes (CQAs) by regulators. CQAs are given narrow acceptance criteria and their variations are monitored by appropriate qualitative and quantitative methods. The provision of a stable antibody formulation is thus in many cases for from straightforward.

In a first step to approach the goal to provide a stable formulation for the inventive antibody, Applicants set out to determine which parts and sequences of the antibody were potentially at risk in the future formulation effort. To do so, an in silico determination was done. The humanised anti-GDF-15 antibody H1L5 was screened with in silico manufacturability assessment tools. The amino-acid sequence of H1L5, composed of a full-length Kappa isotype light chain and a full length IgG1 heavy chain, was screened for the sequence motifs and features of a number of potential developability issues and for aggregation risk, as set out in detail in the examples below. The Applicants found that H1L5 has a potential CDR deamidation site and an oxidation site that would have to be further evaluated. The antibody also has other potential stability issues in the form of potential oxidation and acid-labile sites as well as C-terminal clipping. It was thus clear that the present antibody would potentially not be easy to stabilize.

As evident from the initial round of experimental data several risk factors were identified which could potentially destabilize the antibody during further formulation efforts.

Thus, in a second step, the antibody H1L5 was engineered to an IgG4 backbone, as described herein elsewhere, and was then designated as CTL-002. With the IgG4 backbone three of the above identified risk factors could be eliminated, namely
1) the K448 of IgG1 has been deleted
2) the N at position 204 of IgG1 has been replaced by a D in the IgG4 antibody
3) the S at position 132 of IgG1 has been replaced by a C in the IgG4 antibody The change from IgG1 to IgG4 thus eliminated three potential risk factors for the provision of a stable antibody formulation.

Applicants provides—on the basis of this change and the further stability studies as shown below—a stable antibody formulation. The formulation comprises preferably histidine/histidine HCl, arginine-HCl, polysorbate, and sucrose at a pH of 5-6. Further preferred formulations are described in the embodiments above and in the claims.

Examples

Drug Substance (DS)

CTL-002 is a humanized, hinge-stabilized IgG4 monoclonal antibody targeting Growth Differentiation Factor-15 (GDF-15) and relates to an antibody of the present invention.

In an exemplified liquid formulation of the CTL-002 Drug Substance, the CTL-002 antibody is presented at a concentration of about 25 mg/mL, further comprising 20 mM Histidine/Histidine HCl, 150 mM sucrose, 50 mM Arginine-HCl and 0.02% w/v Polysorbate 20, at a pH of 5.5.

Manufacturing & Control

The CTL-002 Drug Substance may be manufactured in CHO cells such as CHOK1SV GS KO™ cells. The downstream process includes 2 chromatography steps; one Protein A-based affinity affinity chromatography (e.g. MabSelect SuRe) followed by anion exchange membrane chromatography (e.g. Sartobind Q).

Virus inactivation is achieved by e.g. Triton-X 100 treatment.

Analytical testing is performed routinely in-process and for the final release.

Stability

Drug Product stability studies are currently ongoing as follows:
Pilot non-cGMP (Batch #DPS026) representative stability study for (up to) 3 years for the intended long-term storage conditions at +2-8° C., and for 12 months at +25° C. and for 6 months at +40° C. in order to provide representative stability data for the setting of provisional shelf life of Drug Product GMP batch(es).
GMP (Batch #F19235) stability study for (up to) 3 years for the intended long-term storage conditions at +2-8° C., and for 12 months at +25° C. and for 6 months at +40° C. in order to confirm the stability of the proposed IMP.

Storage

CTL-002 Drug Product vials must be stored at +2-8° C. in their original secondary packaging within a secure environment, protected from light and separated from other medication or investigational product. The product should not be frozen.

Preparation & Administration

To prepare CTL-002 for intravenous administration, the CTL-002 solution is added to an infusion bag containing 0.9% NaCl. CTL-002 solution for infusion may be administered using IV bags made of polyethylene (PVC-, DEHP- and latex-free) or polyvinylchloride (latex-free) and infusion lines made of PE (PVC-, DEHP- and latex-free) or PVC (DEHP- and latex-free) material. The use of an 0.2 µm in-line filter (positive charged/uncharged PES membrane) is mandated.

Once compounded, the CTL-002 solution for infusion in infusion bags may be used immediately and administered at ambient temperature. The infusion bag might be stored up to 6 hours at room temperature and up to 24 hours at +2-8° C. but should be used no longer than 24 hours after preparation.

Nonclinical Pharmacology

The present inventors identified a mechanism by which GDF-15 blocks adhesion and transgression of predominantly CD8+-T-lymphocytes into tissues. With CTL-002 blocking GDF-15 a novel treatment approach has been established that facilitates effector T cell entry into tumor tissue. This may substantially enhance the efficacy of any T cell activating agent, e.g. checkpoint inhibitors.

Specifically, in a flow-adhesion assay, different immune cell subsets pre-treated+/−GDF-15 were perfused over an activated layer of endothelial cells or recombinant adhesion molecules. Adhesion and transmigration processes were monitored by live imaging microscopy. Adhesion of T cells to the endothelial cell layer was significantly impaired by addition of GDF-15. Among T-cell subsets CD8+ T-cells were most affected while adhesion of other immune cells was not reduced. Inhibitory effects of GDF-15 on CD8+ T-cell adhesion were comparable to potent blockade of LFA-1 by TS1/18 antibody and could be rescued by the anti-GDF-15 antibody CTL-002 with an EC50 of ~700 ng/ml.

This initial finding has been further substantiated with data from relevant animal models, in which the anti-GDF-15 antibody CTL-002 or a mouse surrogate induced strong increase of tumor infiltrating lymphocyte numbers and increased the response to T cell activating therapies. Neutralization of GDF-15 in HV18-MK melanoma-bearing humanized mice by CTL-002 resulted in a strong increase of tumor infiltrating leukocyte numbers. Subset analysis revealed an over proportional enrichment of T-cells, especially CD8+-T cells (see FIG. 6).

Figure 1:
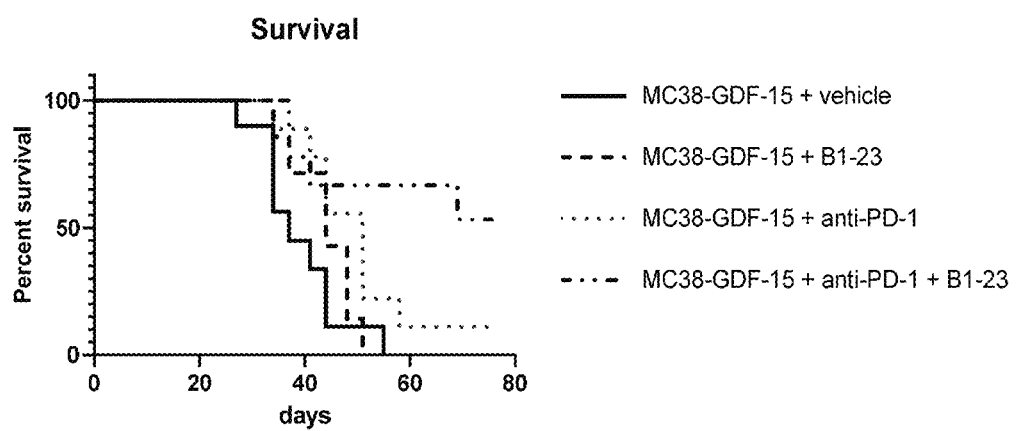
FIG. 1: Treatment of GDF-15-producing tumors with anti-GDF-15 antibody B1-23 (murine progenitor Ab of CTL-002) substantially improves response to anti-PD1 antibodies.

Further, syngeneic mouse tumor models with genetically modified mouse colon tumor MC38 cells expressing human GDF-15 (MC38-GDF15), showed an increased response to otherwise diminished responses towards anti-PD-1 or anti-CD40/poly(IC:LC) combination therapy. No adverse effects were observed in any of the animals (FIG. 1, 13, 14).

Hence, CTL-002 is developed to neutralize the pathological effects mediated by GDF-15. The biological activity of GDF-15 adhesion and transmigration processes were monitored by live cell imaging microscopy in an in vitro flow adhesion system with primary immune cells and key parameter of the inhibition of GDF-15 effects by CTL-002 were determined in this system.

Moreover, secondary pharmacology studies examined the ability of CTL-002 to elicit CDC and ADCC, on-target/off-tissue binding as well as off-target binding. Safety pharmacology assessments were included in standard repeat-dose toxicity studies.

Overall, these studies provide a thorough characterization of the mechanism of action of CTL-002 as well as a well-supported rationale for its clinical examination in patients with cancer and GDF-15 elevation in the tumor microenvironment.

Binding of the Drug CTL-002 to the Target GDF-15

As shown in Table 1, GDF-15 and CTL-002 form a main complex of two CTL-002 antibodies and two dimeric GDF-15 molecules in solution. Other complexes seem to be less favorable and only one additional complex of three CTL-002 and three GDF-15 was reliably detected. This complex was maximal during equimolar incubation of CTL-002 and GDF-15 but was still below 8% and decreased when the ratio was changed in either direction. Above three molar excess of the antibody, all GDF-15 is complexed by CTL-002 molecules and no tendency for formation of high molecular weight aggregates was observed.

Affinity of CTL-002 to recombinant human GDF-15 was determined by measuring surface plasmon resonance on a Biacore T3000. In addition, the affinity to cynomolgus rat and mouse GDF-15 was measured (see Table 2).

All experiments were performed in 10 mM HEPES buffer, pH 7.4, 150 mM NaCl, 3.4 mM EDTA and 0.05% Tween. anti-human IgG Fc specific antibody (Jackson, Order #109-005-008, Lot #111148) was covalently immobilized by EDC/NHS chemistry on Biacore CM5 Chips (GE Healthcare, Order #61144275, Lot #10236645). For kinetic characterization of the antigen-antibody interaction pulses of increasing GDF-15 concentrations (e.g. 156.3 pM, 312 pM, 625 pM, 1,250 pM) were injected at a flow rate of 30 µl/min. After each measurement cycle (8 min of association followed by 30 min of dissociation) the antibody-antigen complex was resolved by regeneration of the surface with 10 mM glycine-HCl at pH 2.0. For calculation of the dissociation constant of CTL-002 the association and dissociation phases were recorded and evaluated by global fitting using the software BIAevaluation 4.1. For global fit analysis only, these antigen concentrations were taken into account, which allowed the analysis following the Langmuir 1:1 binding model or 1:1 binding with drifting baseline.

$K_D$ values for human GDF-15 are shown in Table 2.

TABLE 2

Overview of species affinities of CTL-002

|  | CTL-002 |
|---|---|
| $K_D$ (human) | 38.3 pM |
| $K_D$ (Cynomolgus) | 107.7 pM |
| $K_D$ (rat) | 449 pM |
| $K_D$ (mouse) | 9.76 nM |

An overview and comparison of the three antibodies used in a panel of non-clinical studies is given in Table 3.

TABLE 1

Overview of formed complexes of CTL-002 and GDF-15

| Simplified Visualization | | | | | |
|---|---|---|---|---|---|
| Estim. MW | 506 kDa | 337 kDa | 169/193 kDa | 144 kDa | 24.6 kDa |
| Ratio CTL002/GDF-15 | [CTL-002]$_3$-[GDF-15]$_3$ | [CTL-002]$_2$-[GDF-15]$_2$ | [CTL-002]$_1$-[GDF-15]$_{1/2}$ | CTL-002 | GDF-15 |
| 1:30 | 1.1% | 15.7% | 4.2% | 0% | 79.1% |
| 1:3 | 4.9% | 70.3% | 4.3% | 0% | 20.6% |
| 1:1 | 8.0% | 74.3% | 4.0% | 13.0% | 0.6% |
| 3:1 | 2.9% | 27.5% | 0% | 69.6% | 0% |
| 30:1 | 0.4% | 2.9% | 0% | 96.7% | 0% |

TABLE 3

Overview on antibody details used in in vitro and in vivo experiments

| | B1-23 | CTL-001 | CTL-002 |
|---|---|---|---|
| Binding domain | Discontinuous epitope (EVQVTMCIGACPSQFR ---38 amino acids--- TDTGVSLQTYDDLLAKDCHCI) | | |
| Species | mouse | humanized | humanized |
| Isotype | IgG2a (rec IgG1) | IgG1 | IgG4S228P |
| Alternative names | | H1L5, B1-23-H1L5 | CTL-001 IgG4*, CTL-001 IgG4, H1L5 IgG4* |
| Characterization studies | Epitope mapping by proteolytic excision | | |
| | ADCC, C1q and CDC | ADCC, C1q binding and CDC | ADCC, C1q binding and CDC |
| | Immunoblot and ELISA of human GDF-15 | Immunoblot and ELISA of human and mouse GDF-15 | ELISA of human GDF-15 |
| | Flow cytometry stain of surface associated GDF-15 | Flow cytometry stain of surface associated GDF-15 | |
| | | Immunoblot and ELISA of different TGF-beta proteins | |
| | | Inhibition of LFA-1 activation by D-Storm microscopy | |
| | | Inhibition of adhesion of flowing T cells to preactivated HUVECs | |
| | In vivo combination with anti-PD-1 to treat transgenic MC38 secreting hGDF-15 in mice | | |
| | In vivo combination with anti-CD40/Poly(IC:LC) to treat transgenic MC38 tumors secreting hGDF-15 in mice | | |
| | In vivo neutralization of cachexia in mice | In vivo neutralization of cachexia in mice | |
| | | In vivo preliminary PK study in cynomolgus monkeys | In vivo preliminary PK study in cynomolgus monkeys |
| | | | In vivo treatment with CTL-002 of humanized mouse human melanoma model |
| | | | Non-GLP single-dose dose-finding study in Cynomolgus monkeys |
| | | | PK and Dose-range finding in rats |
| | | | Mouse PK |
| | | | 4-Week Repeat-Dose Toxicity Study of CTL-002 in Cynomolgus Monkeys |

In summary, CTL-002 is a humanized IgG4 antibody derived from mouse antibody B1-23 with high specificity for human GDF-15. CTL-002 binds with picomolar affinity to human, cynomolgus and rat GDF-15 (38.3, 108 and 449 pM, respectively), and with low nanomolar affinity to mouse GDF-15 (9.76 nM). CTL-002 binds to a discontinuous conformational epitope at the carboxy terminus of the mature GDF-15 and specifically recognizes the physiological dimeric conformation.

Figure 2:
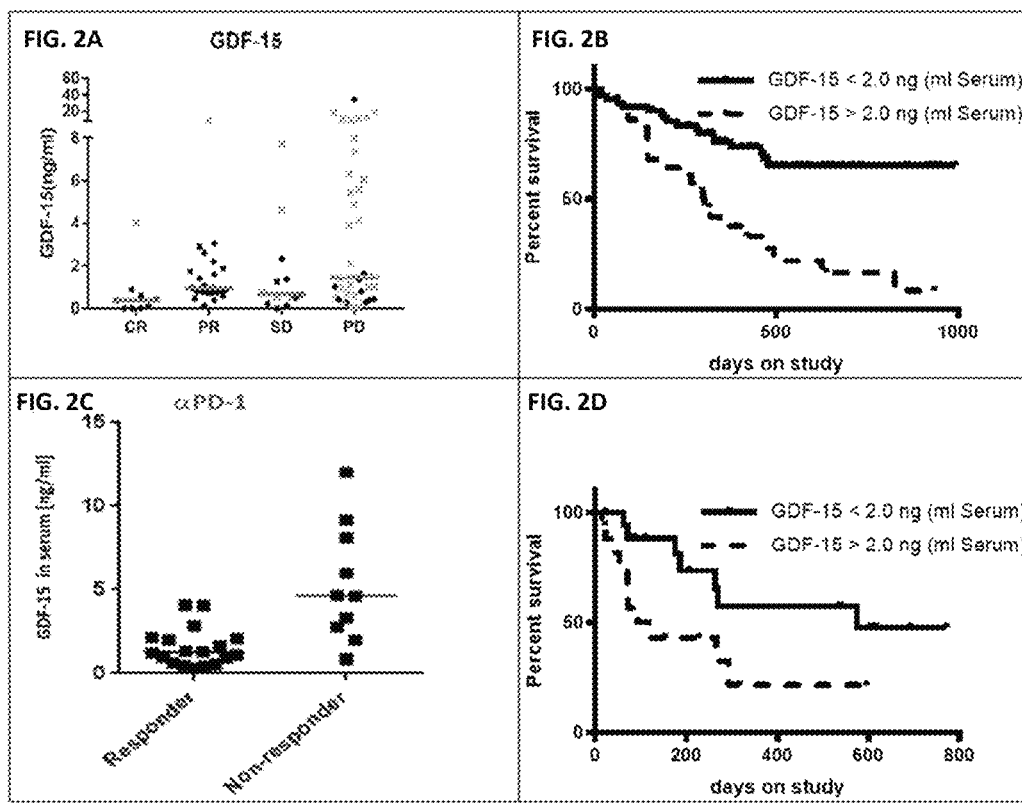

In Vitro Biological Activity of CTL-002 on GDF-15 Mediated Inhibition of T Cell Adhesion Two proprietary analyses indicated in addition that GDF-15 levels also seem to correlate with non-response to PD-1 antagonists. This again is in line with the concept that GDF-15 acts as immune- and T cell repellant and keeps CD8+/CD4+ T cells out of the tumor, preventing PD-1 antagonism-based activity (FIG. 2).

A flow adhesion assay system was used to mimic the dynamics at the blood vessel wall separating the immune cells from the tumor tissue and to analyze the effect of neutralization of GDF-15 by CTL-002. To evaluate the potency of GDF-15 adhesion inhibition and the sensitivity of the system, the IC50 of GDF-15 in the assay system was determined to 13.8±2.3 ng/ml (FIG. 4).

To evaluate the potency of CTL-002 in preventing GDF-15 mediated inhibition of T cell adhesion, the EC50 of CTL-002 was determined in the flow-adhesion assay with T cells. As a result, in average a concentration of 707±17 ng/ml of CTL-002 was effective to increase the T cell adhesion by 50%, as was shown in different donors (see FIG. 5).

In Vivo Pharmacology

Among all TGF-beta superfamily members orthologous GDF-15 molecules show the lowest sequence conservation. While mature rat, mouse and human TGF-beta1 and BMP-2 proteins are 99-100% sequence identical between humans and mice, homology is below 70% for GDF-15 (Böttner 1999). Biological differences between different species thus cannot be ruled out. Murine GDF-15 shows rather low sequence identity of 67.9% with its human counterpart reflected also in the fact that the anti-GDF-15 antibodies show less affinity for the mouse homologue. Two different in vivo approaches were followed to investigate pharmacodynamic effects.

First, a humanized mouse model was used, where immunodeficient mice are engrafted with human cord-blood derived CD34+-hematopoietic stem cells.

Three months after reconstitution these mice developed a functional human-like immune system containing all major human immune cell subsets (Wang 2018). These mice were then inoculated with a patient-derived human melanoma cell line, HV-18MK, that has been shown to secrete high levels of GDF-15, was inoculated. Mice were treated beginning three days later with isotype control or CTL-002 two times a week and after four weeks tumors were harvested and analyzed for immune cell infiltration by flow-cytometry.

Although the tumor size was unaffected, the CTL-002 treated groups showed a 9-fold increase in human tumor infiltrating CD45+ cells (FIG. 6). Within the infiltrating cell population, T-cells were enriched 4-fold. In a follow-up study, analysing the infiltrating immune cell population in more detail, the increase in infiltration of CD45+ and the enrichment in CD3+ was confirmed, albeit less pronounced with 3-fold increase of CD45+ and 4-fold enrichment of CD3+ T cells.

As a second experimental model, a genetically modified mouse cell line overexpressing human GDF-15 was generated for testing the therapeutic efficacy of anti-GDF-15 antibodies.

In this respect, MC38 colon adenocarcinoma cells are the preferred mouse tumor cells to analyze immune checkpoint blocker activity (Selby 2016) and were used to generate in vivo data to support the development of the approved anti-PD-1 antibody. Overexpression was implemented by stable transfection and did not affect in vitro proliferation compared to control treated MC38.

Age matched immunocompetent C57BL/6 and immunodeficient NCI nu/nu mice were inoculated subcutaneously with a suspension of $5 \times 10^5$ MC38 blank colon tumor cells or the transgenic derivative MC38$^{GDF-15}$ expressing recombinant human GDF-15. In contrast to in vitro proliferation and in vivo proliferation in immunodeficient NCI nu/nu mice, it is shown that GDF-15 expression mediated a growth advantage in immunocompetent C57BL/6 mice supporting the idea that GDF-15 interferes with the immune system of the tumor host (FIG. 7).

Further, expression of human GDF-15 rendered anti-PD-1 responsive MC38 colon carcinoma tumors into anti-PD-1 resistant tumors. This was partially reversed by anti-GDF-15 (B1-23)/anti-PD-1 combination treatment, but not by anti-GDF-15 monotherapy and partially by anti-PD-1 alone. (data also shown in FIG. 1)

Similarly, monotherapy using an anti-GDF-15 antibody showed only minimal improvement, whereas GDF-15 secreting tumors (solid line, FIG. 9B) showed better survival when treated with a combination of anti-GDF-15 B1-23 and anti-PD-1 (FIG. 9). This combination treatment was non-significantly better than anti-PD-1 mono therapy (FIG. 8).

Since anti-GDF-15 treatment is suggested to increase T cell infiltration, other cancer immunotherapies depending on T cell presence in the tumor should benefit from neutralization of GDF-15.

Another immunotherapy, anti-CD40 and poly(IC:LC) tumor treatment, which was shown previously to depend on T cell immune responses (van den Boom 2013) was tested in a mouse model with MC38 cells expressing human GDF-15. The combination treatment using GDF-15 neutralization and anti-CD40/poly(IC:LC) resulted in complete rejection of the tumors in 8 out of 10 animals, whereas only 3 out of 10 tumors were cleared by anti-CD40/poly(IC:LC) treatment alone (FIG. 10).

Although mouse GDF-15 could not be detected in wild-type MC38 cells, which might be due to insufficient analytic assays, a similar experiment comparing isotype control antibody with anti-GDF-15 treatment in combination with anti-CD40/Poly(IC:LC) was done with MC38 cells that were not manipulated to secrete human GDF-15. Similar to the experiment with genetically modified MC38, anti-GDF-15 could improve efficacy of the anti-CD40/Poly(IC:LC) treatment, however to a lesser extent (FIG. 11).

Secondary Pharmacology (ADCC, CDC)

GDF-15 is a soluble factor with an interim presence on cells during its maturation. The ability of CTL-002 to bind cell surface associated GDF-15 in vitro implies the possibility that CTL-002 could potentially mediate cell- and complement mediated cytotoxicity to healthy tissue with associated GDF-15.

ADCC induction was analyzed with ADCC Reporter Assay (Promega). The test and control antibodies were applied in different concentrations to the target cells and were incubated with FcγRIIIa expressing effector cells for 6 h at 37° C. Afterwards a luciferase substrate was added, and the luminescence signal was determined with a luminescence reader after 30 min of incubation at RT.

As a result, it was found that CTL-002 did not induce any measurable ADCC, while the positive control trastuzumab performed as expected on both cell lines (FIG. 12).

In addition, the ability of CTL-002 to mediate CDC was also analyzed by measuring C1q binding by ELISA and a cellular reporter assay. As a result, CTL-002 did not show binding to human complement protein C1q, in contrast to the control antibody Rituximab (FIG. 13).

In a second approach the ability to mediate CDC was tested in a cellular assay. CDC was analyzed on Raji cells with Rituximab as a positive control and on GDF-15 expressing UACC-257 cells. As positive control anti-CD55 and anti-CD59-antibodies were chosen, since neutralization of complement inhibiting molecules was enough to induce CDC, but no antibody directly inducing CDC on UACC-257 was available. As a result, it was found that CTL-002 did not induce any CDC in combination with anti-CD55 and anti-CD59-antibodies, although high levels of the target protein GDF-15 can be detected by flow cytometry (FIG. 14).

In conclusion, it was surprisingly revealed based on the experimental data that the CTL-002 antibody neither induces ADCC nor CDC.

Pharmacokinetics and Product Metabolism in Animals

The pharmacokinetics of CTL-002 were analyzed in non-human primates and a PK model of CTL-002 was generated to predict pharmacokinetics in humans. Pharmacodynamic data were generated in the same study (and in the subsequent repeat-dose study in monkeys) by measuring the inhibition of GDF-15 in serum. These datasets were combined into a PK/PD model and used to predict the pharmacodynamic activity of CTL-002 in humans.

Data from the PK/PD model also provided important information for the estimation of a safe starting dose in the first-in-human study of CTL-002.

Absorption

A preliminary study has been performed in Cynomolgus monkeys to compare the pharmacokinetics of IgG1- and IgG4-based anti-GDF-15 antibody (CTL-001 and CTL-002, respectively). In this study, each of one male and one female monkey, received a single intravenous injection of 25 mg/kg of either CTL-001 or CTL-002. Blood samples were taken over sixty days.

The serum concentration-time profiles are shown in FIG. 15 and key pharmacokinetic parameters are summarized in Table 4.

TABLE 4

Pharmacokinetic parameters of CTL-001 (IgG1) and CTL-002 (IgG4) in monkeys

| Monkey | Sex | Isotype | Dose level (mg/kg) | $t_{1/2}$ (days) | $C_{max}$ (µg/mL) | $AUC_{inf}$ (µg · day/mL) |
|---|---|---|---|---|---|---|
| 1 | Male | IgG1 | 25 | 9.1 | 710.9 | 4514 |
| 2 | Female | IgG1 | 25 | 10.6 | 827.8 | 5756 |
| 3 | Male | IgG4 | 25 | 12.9 | 949.2 | 7931 |
| 4 | Female | IgG4 | 25 | 14.3 | 615.2 | 7980 |

In summary, CTL-002 (IgG4 isotype) displayed a slightly longer half-life and slightly higher AUC in the tested monkeys compared to CTL-001 (IgG1 isotype) whilst no adverse effects were observed in any of the animals.

Dose-Response Information and Modelling of Human Therapeutic Doses

A 2-compartment population pharmacokinetic (PK) model describing the systemic exposure to CTL-002 has been constructed from the non-human primate (NHP) PK data after a single dose and including trough concentration prior to the third weekly dose.

There is an accumulation of inactive GDF-15 after administration of CTL-002 and the PK model has been extended to include a binding PD model describing the suppression of GDF-15 (FIG. 16 and FIG. 17). This model describes the observed single dose PK-PD data in NHP and predicts the observed data up to 14 days after repeated weekly administration (2 doses) in the 4 wk GLP toxicity study. There is no evidence to suggest a significant saturable component in the clearance of CTL-002 and maximum target capture can be achieved at doses ≥10 mg/kg/wk.

It should be noted that the observed IgG clearance for CTL-002 in NHP is typical for a human IgG-like molecule in NHP. A possible explanation for the observed over-proportional increase in exposure and loss of GDF-15 capture in some animals after repeated administration of CTL-002 is an ADA response, although this has not been confirmed experimentally (inavailability of ADA-detecting assay in this species).

The NHP PK-PD model was allometrically scaled to predict the human PK of CTL-002, using exponents of 0.75 for clearance, 0.67 for inter-compartmental exchange and 1.0 for volume. Target binding to NHP and human GDF-15 were also included in the model in order to predict the extent and duration of target suppression (Table 5).

TABLE 5

CTL-002 - PK-PD model parameters

| PK parameter | Unit | NHP | Exponent* | Human |
|---|---|---|---|---|
| Central Volume | L | 0.136 | 1 | 3.182 |
| Peripheral volume | L | 0.0866 | 1 | 2.021 |
| Exchange coefficient | L/day | 0.0404 | 0.67 | 0.330 |
| CTL-002 clearance | L/day | 0.0121 | 0.75 | 0.128 |
| Elimination rate free GDF-15 | 1/day | 121 | −0.25 | 55.2 |
| Baseline GDF-15 | ng/ml | 1.25 | — | 0.5-10 |
| $K_D$ (from PK-PD model) | nM | 0.019 | ** | 0.007 |

*Body weight exponent used to scale from NHP to human (NHP 3 Kg; Human 70 Kg)
** In vitro $K_D$ multiplied by 0.18 (observed difference in vitro/in vivo in NHP)

Given these assumptions, CTL-002 exposure in human was predicted for different dosing regimens (FIG. 18) and the resulting safety margins for Cmax and AUC were compared with the exposure achieved in the 4 wk GLP toxicity study at 100 mg/kg/Q1 wk (Table 6).

TABLE 6

Predicted exposure margins: First in human (FIH) study

| Dose (mg/kg/Q2wk) | Cmax | AUC |
|---|---|---|
| 0.3 | 683 | 487 |
| 1 | 186 | 131 |
| 3 | 54 | 40 |
| 10 | 14 | 11 |
| 20 | 6 | 5 |

Predicted exposure margins compared with 100 mg/kg CTL-002 in the 4wk GLP toxicity study (NOEL): First dose Cmax in human compared with first dose Cmax in NHP AUC (steady-state Q2wk) in human compared with AUC (steady-state Q1wk x 2) in NHP from population PK model; assuming linear PK behavior Observed baseline levels of GDF-15 in the target patient population have been analyzed in a cohort of 34 patients previously treated and being refractory or having relapsed after anti-PD-1 antibody treatment. In this cohort, baseline GDF-15 ranged from 0.35-12 ng/mL. The extent and duration of suppression of systemic GDF-15 is likely to be dependent on the baseline level of GDF-15, with higher production rates of GDF-15 requiring a higher dose to achieve suppression (FIG. 19).

The estimated FIH dose is a conservative approach, since it will suppress GDF-15 levels below physiologic levels for prolonged periods, but not yet for the full dosing period even in lower level GDF-15 patients. This was done to comply with requests by the consulted agency (PEI, Germany) for the FIH dose. The relationship between baseline GDF-15 level and the extent and duration of target suppression will be explored in the phase I clinical trial.

The above PK-PD model has been developed to describe the suppression of systemic GDF-15 for various levels of baseline GDF-15. However, the desired target is the tumor micro-environment. If the tumor is largely responsible for the increase in systemic GDF-15 then the amount of GDF-15 in the tumor vasculature should also be considered. Consequently, an estimate of GDF-15 suppression in the tumor micro-environment was included as an extension to the human PK-PD model.

The serum half-life of GDF-15 in human is predicted to be 18 minutes (allometric scaling from NHP). Based on this elimination rate, GDF-15 will need to be produced at 1.67 mg/day in order to produce a steady-state serum GDF-15 concentration of 10 ng/mL. For a tumor size of 36 g and an average blood flow rate of 0.2 mL/min/g of tumor tissue (range 0.01-2 mL/min/g—Vaupel 2004) the resulting GDF- 15 homodimer concentration in the tumor vasculature will be 161 ng/mL (6.5 nM) i.e. about 16-fold higher than the systemic GDF-15 concentration.

Based on these assumptions, predictions for tumor GDF-15 suppression in the tumor micro-vasculature are shown in FIG. 20 for various levels of tumor GDF-15. It should be emphasized that predicted tumor GDF-15 is critically dependent on tumor blood flow rate.

For a patient with a baseline serum GDF-15 level of 2 ng/mL, GDF-15 concentration in the tumor micro-vasculature is predicted to be suppressed to <0.5 ng/mL (average level in healthy individuals) for about 5 days at the proposed starting dose of 0.3 mg/kg. The predicted duration of suppression is much less for patients with a higher serum baseline level of GDF-15 (Table 7).

Note: suppression of sGDF-15 in the tumor interstitial space, outside the vasculature, has not been incorporated into the PK-PD model since this would require additional assumptions regarding CTL-002 penetration into the tumor environment and GDF-15 levels in the interstitial space.

TABLE 7

Predicted duration of GDF-15 suppression

| GDF-15 baseline | | Dose | GDF-15 suppression Serum | | GDF-15 suppression Tumour | |
| --- | --- | --- | --- | --- | --- | --- |
| Serum (ng/mL) | Tumour (ng/mL) | CTL-002 (mg/kg) | Min * (ng/mL) | Duration ** (days) | Min * (ng/mL) | Duration ** (days) |
| 0.5 | 0.5 | 0.3 | 0.006 | >14 | 0.001 | >14 |
| | | 1 | 0.002 | >14 | 0.000 | >14 |
| | | 3 | 0.000 | >14 | 0.000 | >14 |
| | | 10 | 0.000 | >14 | 0.000 | >14 |
| | | 20 | 0.000 | >14 | 0.000 | >14 |
| 2 | 25 | 0.3 | 0.024 | 5.2 | 4.02 | 0 |
| | | 1 | 0.006 | >14 | 0.017 | 4.2 |
| | | 3 | 0.002 | >14 | 0.000 | >14 |
| | | 10 | 0.000 | >14 | 0.000 | >14 |
| | | 20 | 0.000 | >14 | 0.000 | >14 |
| 10 | 161 | 0.3 | 0.123 | 0.8 | 30.964 | 0 |
| | | 1 | 0.031 | 3.8 | 0.148 | 0.6 |
| | | 3 | 0.009 | 11.8 | 0.003 | 8 |
| | | 10 | 0.002 | >14 | 0.001 | >14 |
| | | 20 | 0.001 | >14 | 0.000 | >14 |

* Predicted suppression (lowest concentration) of GDF-15 in either serum or the tumor vasculature
** Predicted duration of GDF-15 suppression below 0.5 ng/mL (mean serum GDF-15 in healthy subjects)

Moreover, as observed in advanced melanoma patients (10 ng/ml), the proposed starting dose of 0.3 mg/kg CTL-002 will only lower serum GDF-15 slightly below normal levels (0.5 ng/ml) at $C_{max}$, at the high end of the range of GDF-15 baseline levels, so that its endogenous functions should not be compromised (FIG. 21).

In conclusion, CTL-002 is described by a linear PK model. In other words, CTL-002 does not display saturable target-mediated kinetic behavior, as sometimes observed with IgG-like molecules targeted to a membrane receptor.

In the NHP 4 wk GLP toxicity study, CTL-002 has been shown to be safe and well tolerated at doses which provide adequate exposure margins for clinical testing.

The proposed FIH starting dose of 0.3 mg/kg/Q2 wk is projected to give a maximum plasma concentration (Cmax) at the end of the 1 hour infusion of 6 µg/mL, which is 683-fold lower than Cmax exposure to CTL-002 at the No-Observed-Effect-Level (NOEL) in NHP. This dose may achieve only transient suppression of GDF-15 in the tumor micro-environment and is considered to be a minimal acceptable biological effect level (MABEL).

Serum total GDF-15 has been shown to be a useful biomarker of GDF-15 target engagement in NHP and CTL-002 doses ≥10 mg/kg are associated with maintenance of GDF-15 capture (and by inference, GDF-15 suppression). Hence, the total human GDF-15 may be a potential clinical biomarker of GDF-15 target engagement and the FIH clinical study is designed to explore both maximum suppression of GDF-15 for a limited time period and continuous suppression of GDF-15 throughout each dosing cycle.

Toxicology

CTL-002 is being tested for the treatment of patients with advanced cancer.

To identify relevant species for non-clinical testing, sequence homology of GDF-15 was compared across species. Sequence homology from humans to Cynomolgus monkeys, mice and rats is 94.6%, 67.9% and 66.1%, respectively.

CTL-002 binds to a non-linear conformational epitope within GDF-15, illustrated as two boxes in FIG. 22. The sequences of the binding regions of CTL-002 are shown for Cynomolgus monkeys, humans, mice and rats (first four lines from top to bottom).

The cynomolgus monkey displays 100% sequence homology with the human CTL-002 binding epitope within GDF-15. It is therefore regarded as relevant species for toxicity testing. The binding affinity of CTL-002 to human and cynomolgus GDF-15 is 38.3 pM and 108 pM, respectively.

A dose response finding (DRF) study of CTL-002 has been performed in rats, as the product was expected to be sufficiently pharmacologically active to achieve sustained complete target inhibition at reasonable intravenous dose levels (binding affinity to rat GDF-15: 449 pM). However, PK/PD data obtained in the study indicated that CTL-002, even at the highest dose level 100 mg/kg, was not able to saturate GDF-15 binding. Therefore, pivotal toxicology was only assessed in the Cynomolgus monkey in a 4-week study with once weekly intravenous administration of CTL-002. No toxicity was observed up to the highest tested dose of 100 mg/kg.

A Good Laboratory Practice (GLP)-compliant tissue cross-reactivity study was conducted using human and Cynomolgus monkey tissues. Staining with CTL-002 in the tissue panels examined was limited to the cytoplasm of trophoblasts in the human and monkey placenta, which was consistent with the reported expression of its target protein, GDF-15, in the placenta. No unanticipated cross-reactivity was observed.

Toxicology: Non-Pivotal Studies

A non-GLP single-dose dose-finding study in Cynomolgus monkeys was performed. The main objective of this study was to support dose selection for the subsequent GLP-compliant 28-day repeat-dose toxicity study. Furthermore, the pharmacokinetics of CTL-002 at various dose levels were characterized.

One male and one female animal, per dose level (0.1; 1; 10 or 100 mg/kg) were dosed by a single 30-minute intravenous infusion and pharmacokinetic profiles were recorded over 14 weeks. In addition to the pharmacokinetics analysis the occurrence of anti-drug antibodies was assessed pre-dose, as well as 6 and 12 weeks after dosing. GDF-15 and CTL-002 serum levels were quantified, pharmacokinetic data were calculated as total CTL-002 (PK total) and as free CTL-002 (PK free), separately.

As indicators of toxicity, mortality and clinical signs were checked daily. Bodyweights and food and water consumption were analyzed weekly and body temperatures, ECGs, blood pressure, hematology incl. coagulation as well as clinical chemistry including cytokines were assessed on several occasions during the study.

None of the animals died prematurely, and there were no CTL-002-related signs of toxicity at any of the tested dose levels.

The single infusion of 0.1, 1, 10 or 100 mg/kg CTL-002 on test day 1 led to a dose-related increase of the total GDF-15 serum level in all males and females. Target saturation by CTL-002 at dose levels of 10 and 100 mg/kg was indicated by overlapping GDF-15 curves at these two dose levels.

The measurement of total and free CTL-002 in serum samples obtained up to test day 43 (groups 1 and 2; treatment with 0.1 or 1 mg/kg CTL-002) or test day 99 (groups 3 and 4; treatment with 10 or 100 mg/kg CTL-002) revealed a dose-related exposure of the animals to CTL-002.

Key pharmacokinetic data are given in Table 8 as means of the one male and one female animal per group.

TABLE 8

Key pharmacokinetic data obtained in the monkey DRF study CTL-002-TOX-01

| Group | Dose level [mg/kg b.w.] | $C_{max}$ [µg/ml] | $t_{1/2}$ [h] | $AUC_{0-t}$ [µgh/ml] | $AUC_{inf}$ [µgh/ml] |
|---|---|---|---|---|---|
| | | Total CTL-002 | | | |
| 1 | 0.1 | 0.92 | 383.4 | 344.8 | 412.5 |
| 2 | 1 | 21.6 | 230.3 | 4631 | 4855 |
| 3 | 10 | 235.8 | 275.7 | 77692 | 78661 |
| 4 | 100 | 2751 | 352.6 | 666861 | 673354 |

Based on the results of this study, dose levels of 10, 30 and 100 mg/kg were recommended for the pivotal 4-week repeat dose toxicity study.

Toxicology: Pivotal Studies

The additional pivotal study was a 4-week repeat-dose toxicity study of CTL-002 in Cynomolgus monkeys (age: 3-4 years) with a 4-week recovery period.

In this study, CTL-002 was administered by 30-minute intravenous infusions once weekly, i.e. on test days 1, 8, 15, 22 and 29. The recovery period ended on day 58. Dose levels of 0; 10; 30 or 100 mg/kg were administered to 3 male and 3 female monkeys per group plus 2 male and 2 female recovery animals in the control and high dose groups.

None of the animals died or had to be sacrificed prematurely and no test item-related signs of local intolerance were noted.

No test item-related effects were noted on behavior and external appearance, the body weight and body weight gain, the food and drinking water consumption, the electrocardiographic parameters and the heart rate, the circulatory functions, the hematological including coagulation parameters, the D-Dimer levels, the clinical chemistry parameters, the cytokine levels, the urinary parameters, the ophthalmological and auditory functions, the organ weights, and the myeloid:erythroid ratio of any of the animals at any dose level. No macroscopic organ changes were noted in any of the animals examined at any tested dose level.

Histopathology did not reveal any test item-related local or systemic lesions. No test item-related changes were noted during or at the end of the 4-week treatment-free recovery period.

Based on the above results, the No-Observed-Effect-Level (NOEL) was 100 mg CTL-002/kg by once weekly repeated intravenous 30-minute infusion for 4 weeks, i.e. 5 administrations per animal.

The Cmax-levels and AUC-areas for Total CTL-002 revealed a roughly linear dose-related systemic exposure of the animals. No sex-specific differences were noted. An accumulation of Total CTL-002 with time was noted with an accumulation ranging from approx. 2-fold to 6-fold. The calculated mean terminal serum elimination half-lives ($t_{1/2}$) of Total CTL-002 ranged from 119 to 651 hours.

Key pharmacokinetic data following the first (days 1-8) and fourth (days 22-29) administration of CTL-002 are given in Table 9 for the male and female animals.

TABLE 9

Key pharmacokinetic data for Total CTL-002 obtained in the monkey GLP toxicity study CTL-002-TOX-03 after the first and fourth administration

| Group | Dose level [mg/kg b.w.] | $C_{max}$ [µg/ml] | $t_{1/2}$ [h] | $AUC_{0-t}$ [µgh/ml] | $AUC_{inf}$ [µgh/ml] |
|---|---|---|---|---|---|
| | | Days 1-8 | | | |
| 2 | 10 | M: 237 | M: 197 | M: 21500 | M: 47505 |
| | | F: 686 | F: 165 | F: 36901 | F: 67303 |
| 3 | 30 | M: 804 | M: 292 | M: 65026 | M: 193062 |
| | | F: 2292 | F: 212 | F: 103114 | F: 233692 |
| 4 | 100 | M: 2725 | M: 312 | M: 227335 | M: 717624 |
| | | F: 5428 | F: 458 | F: 533272 | F: 2981268 |
| | | Days 22-29 | | | |
| 2 | 10 | M: 1520 | M: 486 | M: 135788 | M: 503693 |
| | | F: 1030 | F: 119 | F: 89266 | F: 149202 |
| 3 | 30 | M: 4363 | M: 308 | M: 149037 | M: 450025 |
| | | F: 4935 | F: 169 | F: 360184 | F: 697479 |
| 4 | 100 | M: 12553 | M: 651 | M: 1388031 | M: 9257432 |
| | | F: 13624 | F: 234 | F: 1329769 | F: 3233365 |

Following infusion of CTL-002, GDF-15 serum levels of all animals at all dose levels increased up to 100-1000-fold and remained increased throughout the dosing interval. As indicated in FIG. 23, showing as example the GDF-15 levels in female monkeys throughout the first week after dosing, the increase was comparable across dose groups.

Therefore, it can be concluded that full target inhibition was obtained at all dose levels and throughout the dosing interval in the pivotal monkey study.

Overall Study Design

A Phase 1 multi-center, first-in-human (FIH), open-label study consisting of Part A (dose escalation) followed by Part B (expansion) will be performed using the CTL-002 antibody. The main intent of the study is (a) to demonstrate safety of CTL-002 and the combination of CTL-002+anti-PD1/PD-L1 and (b) to demonstrate that patients relapsed post/refractory to anti-PD1/PD-L1 therapy due to elevated GDF-15 will respond again and show tumor shrinkage when the combination of CTL-002+anti-PD1/PD-L1 is administered.

Part A (Dose Escalation)

At least 21 subjects will receive in "3+3" cohorts escalating doses of CTL-002 IV given as monotherapy and in combination with an anti-PD-1 checkpoint inhibitor in subjects with advanced-stage solid tumors that relapsed post or were refractory to a prior anti-PD-1/PD-L1 therapy and have exhausted all available approved standard treatments or are not eligible for them anymore. "Backfill cohorts" will recruit additional patients to the highest dose levels.

Part B (Expansion)

Comprised of up to 5 expansion cohorts of up to 25 subjects per cohort in defined tumor entities that relapsed post or were refractory to a prior anti-PD-1/PD-L1 therapy to further evaluate the safety and efficacy of CTL-002 as monotherapy (one monotherapy cohort to be explored) or in combination with an anti-PD-1 checkpoint inhibitor (up to 4 combination cohorts to be explored) and to confirm the RP2D. The dedicated monotherapy cohort will serve to establish the safety profile of CTL-002 in prolonged monotherapy at a dose considered to be therapeutic (no anti-PD-1/PD-L1 added). Enrollment into all 5 cohorts may occur in parallel.

Treatment Period

Part A (Dose Escalation)

This study will employ a standard "3+3" dose escalation design for which 3 to 6 subjects will be enrolled at each assigned dose level, per cohort, depending on the occurrence of DLTs.

The planned doses of CTL-002 to be tested are outlined below:

Cohort 1: 0.3 mg/kg
Cohort 2: 1.0 mg/kg
Cohort 3: 3.0 mg/kg
Cohort 4: 10 mg/kg
Cohort 5: 20 mg/kg The start dose of 0.3 mg/kg for Cohort 1 is fixed. Doses explored in Cohorts 2-5 (as outlined above) may be modified by the Safety Review Committee (SRC) based on emerging data (i.e., available safety, PK/pharmacodynamic, other biomarker data).

The DLT Observation Period will be the first two treatment cycles (i.e., first 4 weeks) for each dosing cohort. All treatment cycles are defined initially as 2 weeks in duration. CTL-002 will be administered once every two weeks as an IV infusion. Subjects will first receive one dose of CTL-002 given as monotherapy for one cycle, followed by a combination of CTL-002 given together with the defined checkpoint inhibitor for one cycle, where the defined checkpoint inhibitor will be administered at a dose of 240 mg IV given once every 2 weeks.

For the combination, CTL-002 and the defined checkpoint inhibitor will be given on the same day concomitantly, where CTL-002 will be administered first and for the first combination infusion, there will be a 30-minute observation period to assess safety, which will then be followed by the defined checkpoint inhibitor infusion. The period of observation may be modified (i.e., shortened or lengthened) based on emerging safety data.

The first two treatment cycles (i.e., first 4 weeks) represent the DLT Observation Period.

Thereafter, subjects will continue with the combination treatment, until progression or until withdrawal from the study for any other reasons (e.g., toxicity or subject withdraws consent).

Additional, intermediate dose cohorts may be explored based on emerging data and upon Safety Review Committee (SRC) request. The maximum dose of CTL-002 to be tested in this study will not exceed 20 mg/kg.

All subjects will be hospitalized overnight after receiving the first dose of CTL-002 and also after receiving the first combination dose of CTL-002 and the defined checkpoint inhibitor, for the purposes of safety observation and to enable logistical collection of sampling time-points (e.g., PK).

Intra-Patient Dose Escalation in Extended Treatment

If any Cohort 1 subjects are still on 0.3 mg/kg treatment when Cohort 2 has been completed and reviewed by the SRC, the subjects can be increased to the Cohort 2 dose of 1.0 mg/kg.

If any Cohort 1 or 2 subjects are still on 1.0 mg/kg treatment when Cohort 3 has been completed and reviewed by the SRC, the subjects can be increased to the Cohort 3 dose of 3.0 mg/kg.

Note: Any subjects still on 0.3 mg/kg treatment must be treated at 1.0 mg/kg prior to advancing to 3.0 mg/kg in agreement with the Sponsor Medical Monitor.

The maximum a subject dose can be increased to, through intra-dose escalation, will be 3.0 mg/kg.

Available safety, PK/pharmacodynamic data, as well as preliminary efficacy data will inform the decision regarding the MTD/dose(s) to be further explored in Part B of the study.

The MTD is defined as the highest dose level of CTL-002 at which no more than 1 out of 6 subjects experienced a DLT during the first 2 treatment cycles (i.e., the first 4 weeks, where CTL-002 is given as monotherapy [Weeks 1 and 2] and in combination with the defined checkpoint inhibitor [Weeks 3 and 4]).

In addition, for Cohorts 3-5, in the absence of any DLT, an additional 3 subjects can be recruited into each of these cohorts (up to a total of 6 subjects per cohort), to increase the understanding of the PK and pharmacodynamic data. This occurs while dose escalation continues. These additional "backfill" subjects will receive the combination treatment of CTL-002 and the defined checkpoint inhibitor once every two weeks from Cycle 1 Day 1 onwards, with CTL-002 always administered first and the defined checkpoint inhibitor given thereafter as outlined above.

For Part A subjects (except backfill subjects), three sequential tumor biopsies are to be taken; one biopsy at baseline, the second biopsy prior to the initiation of the combination therapy (after 2 weeks) and the third after the first cycle of combination therapy (either at the End of Treatment or, if combination treatment is continued, at the end of Cycle 2/beginning of Cycle 3).

For backfill patients, only two biopsies are mandated; one at baseline, and the second after 4 weeks of combination treatment (either at the End of Treatment or, if combination treatment is continued, at the end of Cycle 2/beginning of Cycle 3).

These biopsies are mandatory in order to assess immune cell infiltration in the tumor. If a biopsy cannot be taken for safety reasons, this must be discussed with the medical monitor.

Treatment with CTL-002 in monotherapy (one cycle) as well as in combination with a checkpoint inhibitor (nivolumab) has been safely tolerated up to dose level 5 of CTL-002 (20 mg/kg). No DLT occurred, no grade 4 adverse event in any patient treated. Combination treatment can be started simultaneously, as demonstrated by the so-called backfill cohorts with immediate combination of CTL-002 and anti-PD1/PD-L1 treatment.

Biomarker analyses show a tumor selective influx of CD8+ and CD4+ cells from DL1-4 consistently. Preliminary analysis indicate that in several patients T cell proliferation is increased in the tumor as demonstrated by CD3/ki-67+ staining. In tumors that at baseline have "cold tumors" characterized by rather low CD8 and CD4 counts are turned into hot tumors by increasing CD8 and CD4 counts.

First tumor shrinkages have been observed at various dose levels. Most notable is a patient with carcinoma of unknown primary (squamous cell type) treated at dose level 3 backfill cohort that has been relapsed under prior nivolumab treatment and just maintained slowly progressing disease (with stable disease range as per RECIST) when escalated to ipilimumab+nivolumab. Under CTL-002/Nivolumab treatment the patient so far managed to obtain a −49% tumor shrinkage, equal to a confirmed partial remission. Treatment is ongoing. Another patient on dose level 4 with hepatocellular cancer showed −11% tumor shrinkage so far, treatment is ongoing.

Part B (Expansion)

In Part B of the study, up to 6 cohorts (up to 20 subjects per cohort) each enrolling subjects with a specific tumor type may be enrolled.

A dedicated CTL-002 monotherapy cohort may be set up in this expansion part of the study to explore the safety profile of CTL-002 given as monotherapy (e.g., in subjects with advanced-stage melanoma). In addition, for this monotherapy cohort, mandatory sequential tumor biopsies are required to broaden the understanding of the pharmacodynamic effects of CTL-002 in tumor tissue.

In this monotherapy cohort, two serial tumor biopsies are mandated; one biopsy to be taken at baseline and a second biopsy to be taken after 2 weeks (at the end of Cycle 1/beginning of Cycle 2). All subjects will be treated until progression.

Then, up to 5 other expansion cohorts of defined tumor populations may be treated with a combination of CTL-002 and the defined checkpoint inhibitor. Tumor indications will consist of PD-1/PD-L1 treatment approved tumor types and subjects that relapsed/progressed on or after anti-PD-1/PD-L1 treatment. Enrollment into expansion cohorts may occur in parallel. All subjects will be treated until progression.

For the purposes of safety observation and to enable logistical collection of sampling time points (i.e., PK sampling), all subjects will be hospitalized overnight after receiving the first dose of CTL-002 (monotherapy cohort) or after receiving the first combination dose with CTL-002 and the defined checkpoint inhibitor (combination therapy cohort), respectively.

Study Assessments

Tumor Biopsy

Timing of biopsies are as follows:

Part A (all subjects except backfill subjects): three sequential tumor biopsies are mandated; one biopsy at baseline, the second biopsy prior to the initiation of the combination therapy (after 2 weeks) and the third biopsy after the first cycle of combination treatment (either at the End of Treatment Visit or, if combination treatment is continued, at the end of Cycle 2/beginning of Cycle 3). These biopsies are mandatory in order to assess immune cell infiltration in the tumor.

Part A (backfill subjects): two serial tumor biopsies are mandated; one biopsy at baseline and a second biopsy after 4 weeks (either at the End of Treatment Visit or, if combination treatment is continued, at the end of Cycle 2/beginning of Cycle 3)

Part B (subjects enrolled in the monotherapy cohort): two serial tumor biopsies are mandated; one biopsy at baseline and a second biopsy after the first monotherapy cycle (i.e., 2 weeks).

There has to be a lesion that is amenable to sequential biopsy, if possible, or a lesion in close proximity, but this lesion should not be the only target lesion that will be radiologically assessed during the course of the study.

Biomarkers may be analyzed from biopsy tumor tissue samples. Additional immune cell markers and/or tumor markers specific to any of the tumor type may be included.

Biopsied tumor tissue will be fixed with formalin and embedded in paraffin (FFPE) to determine treatment-induced changes in the number, frequency and spatial location of infiltrating immune cells including but not limited to leukocytes, different lymphocytes (e.g., CD4+ and CD8+ T cells, B cells, NK cells) by histology before and after treatment with CTL-002 or in combination with the defined checkpoint inhibitor. Moreover, the expression of the CTL-002 drug target, GDF-15 protein and mRNA, will be determined.

Tumor Lesions

For subjects in Part A of the study, the target cutaneous lesions selected for RECIST evaluation will be measured by caliper and photographed. In addition, the number of cutaneous lesions will be recorded. For clinical measurements of cutaneous lesions in Part A, documentation by color photography (including size measurement) and caliper measurement of lesion will be performed at Baseline within −7 days before infusion of CTL-002, every 4 weeks during extended treatment, at End of Treatment Visit and during follow-up.

Assessment of Safety

The safety and tolerability of IV infusions of CTL-002 monotherapy and CTL-002 in combination with the defined checkpoint inhibitor will be evaluated by the incidence of AEs (all AEs will be evaluated according to NCI CTCAE v5.0), SAEs, DLTs, and use of concomitant medications. Safety assessments will include: ECGs, physical examinations including neurological examination to exclude motor neuropathy, ECOG performance status, vital signs and clinical laboratory samples (hematology, clinical chemistry, coagulation, thyroid function (thyroid stimulating hormone [TSH] and free T3), cytokines, assessment of hemoglobin A1c [HbA1c], N-terminal B-type natriuretic peptide [NT proBNP], and urinalysis).

Subjects are assessed for safety at Screening, as well as during treatment until the Safety Follow-up Visit. Thereafter safety related to the study is further captured during the follow-up of 12 months (Part A)/24 months (Part B) post-treatment.

Vital Signs

Vital signs including systolic and diastolic BP (sitting), pulse rate, temperature, respiratory rate, and oxygen saturation should be evaluated. Additional vital sign measurements may be performed if clinically warranted.

Physical and Neurologic Examination

A physical examination will be performed at Screening and will include examination of head, eyes, ears, nose, throat, neck, cardiovascular, chest/lungs, abdomen (including liver and spleen size), extremities, skin, and lymph nodes, as well as a brief neurologic examination to assess motor neuropathy.

Additional physical examination assessment time points are outlined below and in the SoAs in Table 5, Table 6 and Table 7.

Performance Status

Performance status will be assessed at Screening according to ECOG criteria as follows:
- 0=Fully active, able to carry out all pre-disease activities without restrictions
- 1=Restricted in physically strenuous activity but ambulatory and able to carry out work of a light or sedentary nature (e.g., light housework, office work)
- 2=Ambulatory and capable of self-care, but unable to carry out any work activities. Up and about more than 50% of waking hours.
- 3=Capable of only limited self-care, confined to bed or chair more than 50% of waking hours
- 4=Completely disabled, cannot carry on self-care, totally confined to bed or chair
- 5=Death Cardiac Function Monitoring Subjects will undergo a thorough monitoring for cardiac/vascular AEs and protective measures are in place to exclude subjects at risk from trial participation.

At baseline, subjects undergo an ECG, an echocardiography (or MUGA if ECHO cannot be performed) and testing for N-terminal pro b-type Natriuretic Peptid levels (NT-proBNP, heart-failure screening). Testing for NT-proBNP will be repeated every 2 weeks for 3 months and thereafter monthly or in case of any suspicion regarding cardiac/vascular damage of any type (then combined with ECG and echocardiography, again).

A single, 12-lead ECG will be performed.

All ECG monitoring is to be performed locally at the Investigator site.

The subject should be relaxed and in a recumbent or semi-recumbent position at least 5 minutes before recording an ECG.

Additional ECG testing may be performed at the Investigator's discretion if deemed clinically warranted.

Clinical Laboratory Assessment

Samples for laboratory testing listed as below will be collected. All tests are performed locally.

Hematology/coagulation, clinical chemistry results must be available and reviewed and deemed acceptable by the Investigator or authorized designee, prior to CTL-002/PD-1/PD-L1 administration.

Clinically significant abnormal tests must be repeated to confirm the nature and degree of the abnormality. When necessary, appropriate ancillary investigations should be initiated. If the abnormality fails to resolve or cannot be explained by events or conditions unrelated to the study medication or its administration, the Medical Monitor must be consulted.

The clinical significance of an abnormal test value, within the context of the disease under study, must be determined by the Investigator which includes significant shifts from baseline within the range of normal that the Investigator considers to be clinically important.

TABLE 10

Safety Laboratory Testing

| | |
|---|---|
| Hematology | Hemoglobin, hematocrit, RBC, WBC with differential, ANC, AMC, platelet count |
| Clinical Chemistry | CRP, creatinine, LDH, calcium, electrolytes (sodium and potassium), total bilirubin, GGT, albumin, alkaline phosphatase, AST, ALT, and glucose |
| Coagulation | Includes: αPTT, PT/INR<br>INR/PT should be measured daily for any subject experiencing ALT or AST elevations ≥3 × ULN with concomitant elevation in bilirubin ≥ 2 × ULN until resolution to baseline of the liver function test abnormality.<br>AT III<br>D-Dimer |
| Serology | Analysis for HIV1 and HIV2, HBV, HCV, TBC, SARS-COV-2 |
| Urinalysis | pH, ketones, specific gravity, bilirubin, protein, blood and glucose will be assessed by dipstick. |

αPTT = activated partial prothrombin time;
AMC = absolute monocyte count;
ALT = alanine aminotransferase;
ANC = absolute neutrophil count;
AST = aspartate aminotransferase;
AT III = Antithrombin III;
CRP = C-reactive protein;
GGT = gamma-glutamyltransferase;
HBV = hepatitis B virus;
HCV = hepatitis C virus;
HIV1 = human immunodeficiency virus 1;
HIV2 = human immunodeficiency virus 2;
INR = international normalized ratio;
LDH = lactate dehydrogenase;
PT = prothrombin time;
RBC = red blood cell count;
TB = tuberculosis;
ULN = upper limit of normal;
WBC = white blood cell count Pharmacokinetics The PK of CTL-002 given as monotherapy and/or in combination with the defined checkpoint inhibitor will be measured from blood samples collected at the start of treatment and at various subsequent time points (Part A). Additional PK data may be evaluated in the expansion groups (Part B).

Blood samples will be taken at the start of treatment and at various subsequent time points to determine, if antibodies directed against CTL-002 may have developed.

Monitoring of Systemic Cytokines/Chemokines (Pharmacodynamics)

Serum samples will be collected for measurement of cytokines, chemokines and other circulating biomarkers to assess pharmacodynamic effects as well as safety. Cytokines and Chemokines to be analyzed may include but are not limited to: tumor necrosis factor alpha (TNF-α), interferon (IFN)-γ, interleukin (IL)-1β, IL-2, IL-4, IL-6, IL-8, IL-10, IL-12p70, IL-13, CXCL9 (monokine induced by gamma [MIG]) and CXCL10 (IP-10).

Exploratory Assessments

Serum biomarker testing on specimens specifically collected for future biomedical research during this clinical trial (retention aliquots) might be conducted to identify serum factors (e.g., but not limited to metabolites, soluble growth factors, cytokines, chemokines) important for anti-GDF-15 (CTL-002) therapy. Retrospective biomarker studies will be conducted with appropriate biostatistical design and analysis and compared to PK/Pharmacodynamic results, previously assessed biomarkers or clinical outcomes.

Efficacy Assessment: Imaging Assessments (Local Testing)

Tumor response is evaluated according to institutional standards using RECIST V1.1 as well as imRECIST criteria.

For the purposes of this study, subjects will undergo evaluation at Screening fora baseline scan and should be re-evaluated every 8 weeks beginning at Cycle 3 and/or from the End of Treatment Visit, then after this time response assessments may be performed as per local institutional guidelines until the end of the Efficacy and Survival Follow-up.

All lesions identified at Screening/baseline will be consistently followed using the unique lesion number assigned at Screening/baseline and need to be documented in the subject file and in the eCRF.

The same method of assessment (imaging modality, e.g., MRI, CT) must be used to characterize each identified and reported lesion at baseline and during all follow-up examinations for an individual subject. If there is a change in modality, then the trial site may be asked to explain the reason for the change in the eCRF. A change in modality may be considered a protocol deviation.

Each efficacy time point/visit may be completed up to a window of ±7 days.

A central reading of the images by a reading center will be performed post-hoc in addition to local reading by the investigator during the trial.

Definition of Progressive Disease According to RECIST V1.1 and imRECIST:

RECIST assessments will be used to identify subjects with possible progression of disease (Eisenhaur et al, 2009). As defined by modified RECIST V1.1 criteria for immune-based therapeutics or imRECIST criteria (Hodi et al, 2018), the date of initial potential progression by RECIST scanning will be defined as the immune unconfirmed progressive disease (iUPD) date. Subjects with an iUPD date who are stable will continue to participate in the study as planned and be reassessed for progression 4 to 8 weeks after the initial assessment. If the confirmatory assessment supports PD, the date of disease progression will be the iUPD date. If the confirmatory assessment does not support PD, the subject does not have disease progression and the iUPD date is ignored; such subjects will remain in the study as planned and continue the next imaging evaluation as planned per protocol.

Anti-tumor activity will be assessed per Investigator assessment using RECIST V1.1 and the Immune Response Criteria according to imRECIST as described below.

- Contrast CT scans of the chest, abdomen and pelvis, MRI or positron emission tomography-computed tomography (PET-CT).
- Disease response and disease progression will be evaluated in this study using RECIST and imRECIST criteria.
- Subjects with brain and/or leptomeningeal metastases that are symptomatic or untreated or that require current therapy will not be eligible for the study. Brain imaging must not be older than 12 weeks. Results with abnormal/unexpected findings of brain MRI should be discussed with the Medical Monitor as part of the screening process.
- The same method of assessment and the same technique should be used to characterize each identified and reported lesion at baseline and during follow-up. If there is a change in modality, then the trial site may be asked to explain the reason for the change in the eCRF. A change in modality may be considered a protocol deviation.

Results

The study was initiated in December 2020 and enrolled the first patient on Dec. 9, 2020. Cohorts 1-4 have been completed without dose-limiting toxicity (DLT) and dose escalation continues. Note: Interim data.

Patients and CTL-002 Treatment:

This interim report includes demographics and preliminary safety data of the first 16 patients treated in the CTL-002-001 trial.

TABLE 11

Patient demographics per dose cohort

| | Dose Level 1 (0.3 mg/kg) N = 3 | Dose Level 2 (1.0 mg/kg) N = 4* | Dose Level 3 (3 mg/kg) N = 6 | Dose Level 4 (10.0 mg/kg) N = 6 | Dose Level 5 (20.0 mg/kg) N = 3 | Total N = 22 |
|---|---|---|---|---|---|---|
| Age, years, median (range) | 72 (66-77) | 56 (54-61) | 59 (54-65) | 66 (34-79) | 62 (61-65) | 61.5 (34-79) |
| Gender | | | | | | |
| male, number (%) | 2 (67) | 1 (25) | 1 (17) | 6 (100) | 2 (67) | 12 (55) |
| female, number (%) | 1 (33) | 3 (75) | 5 (83) | 0 (0) | 1 (33) | 10 (45) |
| ECOG Baseline | | | | | | |
| 0 | 0 (0) | 3 (75) | 4 (67) | 3 (50) | 2 (67) | 8 (50) |
| 1 | 3 (100) | 1 (25) | 2 (33) | 3 (50) | 1 (33) | 8 (50) |
| Tumor type | Pleural Mesothelioma Melanoma Colorectal CA | Oropharyngeal Cervical CA TN-Breast CA Melanoma | CA Melanoma Melanoma Ovarian CA Squamous CA NSCLC Ocular melanoma | Renal CA Melanoma Hepatocellular CA NSCLC Melanoma Cholangiocellular CA | Melanoma Melanoma Uveal Melanoma Tbd. Tbd. Tbd. | |
| Prior lines of therapy | | | | | | |
| Number (average %) | 11 (3.7) | 15 (3.8) | 28 (4.7) | 23 (3.8) | 13 (4.3) | 91 (4.1) |
| 1-3 | 2 (67) | 2 (50) | 3 (50) | 4 (67) | 1 (33.3) | 12 (54.5) |
| 4-5 | 0 (0) | 2 (50) | 1 (17) | 1 (16.5) | 1 (33.3) | 5 (22.7) |
| ≥6 | 1 (33) | 0 (0) | 2 (33) | 1 (16.5) | 1 (33.3) | 5 (22.7) |

*1 patient replaced due to delayed start of combination treatment

Preliminary Safety and Tolerability of CTL-002:

So far monotherapy as well as the combination with nivolumab showed excellent tolerability. No dose-limiting toxicity (DLT) has occurred and no safety event of concern has been observed to date. Overall, a total of 111 adverse events have been reported for dose levels 1-5 so far. Three of the AEs were classified as SAE and as at least possibly related to CTL-002 (two due to prolonged hospitalization, one declared to be as important medical event per Investigator assessment; all Common Terminology Criteria for Adverse Events (CTCAE) grade 1-2).

No CTCAE Grade ≥4 was observed.

In summary, the side effect profile is very mild.

Biomarker Strategy and Analyses

This clinical trial explores serum- and tissue-based biomarkers. Apart from classic immune-system activation markers such as serum cytokines, specific analyses are conducted to evaluate the immunomodulatory effect of GDF-15 in the tumor microenvironment. Among other parameters, baseline GDF-15 levels, intratumoral GDF-15 levels as well as numbers and profiles of tumor-infiltrating leukocytes are analyzed prior to and under GDF-15 neutralization by CTL-002. Substantial tumor-selective GDF-15 expression was confirmed for most tumors analyzed. Tumor and tumor-stroma selective influx of mainly CD8' and CD4' T cells under CTL-002 dosing was observed in the majority of patients, with effect being seen from dose level 1 onwards. Preliminary analysis indicate that in several patients T cell proliferation is increased in the tumor as demonstrated by CD3/ki-67+ staining. In tumors that at baseline have "cold tumors" characterized by rather low CD8 and CD4 counts are turned into hot tumors by increasing CD8 and CD4 counts.

Furthermore, some tumors showed reactive PD-L1 upregulation, which is an indirect sign of IFN-gamma release.

TABLE 12

List of analytes in blood, tumor and urine for PD/PK modelling, immunological assessment and biomarker identification.

| Methods/Materials | Blood | Serum | Tumor | Urine |
|---|---|---|---|---|
| GDF-15 protein (ELISA, ECL) | − | + | − | + |
| PK total CTL-002 (ECL) | − | + | − | − |
| ADA (ECL) | − | + | − | − |
| Cytokines/Chemokines (ELISA, ECL) IFN-g/Il-1b/IL-2/IL-4/IL-6/IL-8/IL-10/IL-12p70/IL13 CXCL9/CXCL10 | − | + | − | − |
| Tumor infiltrating immune cells/contexture (IHC) CD3/CD4/CD8/Foxp3/Ki67/GranzB/ CD11c/CD29/CD68/MHCII/CKSox10 PD-L1 GDF-15 (IHC to proform) Other markers optional | − | − | + | − |
| Tumor GDF-15 mRNA (FISH) (optional) | − | − | + | − |
| Molecular biomarkers Nanostring nCounter PanCancer IO 360 ™ Panel Mutational load (optional) Other molecular biomarkers optional (MSI, mutations) | (+) | − | + | − |
| Sample biobanking for optional analyses (on request) | + | + | + | + |

Preliminary Response Assessment

First tumor shrinkages have been observed at various dose levels. Most notable is a patient with carcinoma of unknown primary (squamous cell type) treated at dose level 3 backfill cohort that has been relapsed under prior nivolumab treatment and just maintained slowly progressing disease (with stable disease range as per RECIST) when escalated to ipilimumab+nivolumab. Under CTL-002/Nivolumab treatment the patient so far managed to obtain a −49% tumor shrinkage, equal to a confirmed partial remission. Treatment is ongoing. Another patient on dose level 4 with hepatocellular cancer showed −11% tumor shrinkage so far, treatment is ongoing.

Conclusions

Recent preclinical data by us and others indicate that GDF-15 potently (1) prevents T cell infiltration into the tumor microenvironment (TME) and that it (2) suppresses a potent immune response within the (TME) by other mechanisms, too. GDF-15 thus plays a key role in suppressing effective anti-tumor immune responses.

The GDFATHER (GDF-15 Antibody-mediated Effector cell Relocation) phase 1 trial explores the safety, PK and PD and preliminary antitumoral activity of the GDF-15 neutralizing antibody CTL-002 in monotherapy and combination with a checkpoint-inhibitor (CPI) in CPI-relapsed/-refractory patient populations. Anti-cachexia effects are investigated, too.

Dose level 1-5 have been completed safely with excellent tolerability and no DLT.

The preliminary pharmacodynamic analyses from sequential tumor biopsies (dose level 1-4) indicate a CTL-002-mediated selective T cell shift into the tumor microenvironment.

Preferred doses and dosage regimens for the antibodies of the invention including CTL-002 are 3, 10 or 20 mg/kg/Q2 wk; a more preferred dose and dosage regimen is 10 mg/kg/Q2 wk. As reflected by the above-described favorable clinical effects which were observed in patients at dose levels 3 and 4 so far, it is expected that these dose levels are highly effective. Additionally, the dose and dosage regimen selection is based upon extensive investigations carried out by the inventors, including pharmaco-modelling and obtained PK/Pharmacodynamic data from Part A indicating complete GDF-15 neutralization at this dose in patients with all ranges of baseline GDF-15 serum levels. A review of all treatment doses and their adverse events, the PK/Pharmacodynamics observed so far, and a thorough pharmaco-modelling exercise conducted indicates full GDF-15 suppression within the tumor microenvironment at 10 mg/kg of CTL-002 even at elevated baseline serum concentrations of GDF-15 of up to 10 ng/ml GDF-15 in serum, corresponding to approximately 160 ng/ml GDF-15 in immediate tumor proximity. No safety events of concern have been observed so far at this dose and no DLT occurred at this dose and there is still a >10-fold safety margin compared with the NOAEL in Non-human primates (NHP). Thus, it is expected that the above-indicated preferred doses are particularly effective and safe.

The above-indicated observations with regard to efficacy, safety, and PK/Pharmacodynamic data also show that it will be possible to advantageously administer the anti-GDF-15 antibody at a preferred dose of between 10 and 20 mg/kg, more preferably 20 mg/kg, and at a dosage regimen of at least one administration cycle, wherein the cycle is a period of four weeks and wherein said dose is to be administered at least once (i.e. preferably once) in each of the at least one cycle. This dosage regimen has a longer administration cycle of four weeks, but the preferred dose of between 10 and 20 mg/kg, more preferably 20 mg/kg, will allow to obtain an advantageous safety and efficacy profile similar to the preferred 10 mg/kg/Q2 wk regimen and is compatible with the observed PK/Pharmacodynamic profile.

Similarly, the above-indicated observations with regard to efficacy, safety, and PK/Pharmacodynamic data also show that it will be possible to advantageously administer the anti-GDF-15 antibody at a preferred dose of between 10 and 20 mg/kg and at a dosage regimen of at least one administration cycle, wherein the cycle is a period of three weeks and wherein said dose is to be administered at least once (i.e. preferably once) in each of the at least one cycle. This dosage regimen has a longer administration cycle of three weeks, but the preferred dose of between 10 and 20 mg/kg will allow to obtain an advantageous safety and efficacy profile similar to the preferred 10 mg/kg/Q2 wk regimen and is compatible with the observed PK/Pharmacodynamic profile.

The above findings indicate that a treatment with anti-GDF-15 antibodies according to the invention can provide a considerable clinical benefit for cancer patients. Importantly, this benefit is also observed in patients who had previously been refractory to some of the most advanced treatment options such as therapy with antagonists of the PD-1/PD-L1 axis (e.g., nivolumab).

In Silico Determination of Potential Stability Risks in Antibody with IgG1 Backbone "H1L5"

In a first step to approach the goal to provide a stable formulation for the inventive antibody, Applicants set out to determine which parts and sequences of the antibody were potentially at risk in the future formulation effort. To do so, an in silico determination was done. The humanised anti-GDF-15 antibody H1L5 was screened with in silico manufacturability assessment tools. The amino-acid sequence of H1L5, composed of a full-length Kappa isotype light chain and a full length IgG1 heavy chain, was screened for the sequence motifs and features of a number of potential developability issues and for aggregation risk. It was shown that H1L5 has a potential CDR deamidation site and an oxidation site that could benefit from in vitro evaluation. The antibody also has other issues in the form of potential oxidation and acid-labile sites as well as C-terminal clipping.

Therapeutic proteins are complex and very heterogeneous due to post-translational modifications (PTMs) and chemical modifications. These modifications include glycosylation, deamidation, oxidation and variations of N- and C-termini. Modifications which result in relevant product-related variants are classified as critical quality attributes (CQAs) by regulators. CQAs are given narrow acceptance criteria and their variations are monitored by appropriate qualitative and quantitative methods.

Modifications can be attributed to the host cell system, manufacturing processes and storage conditions. They can either relate to the chemical stability of the molecule or the intrinsic physical stability in the form of aggregation potential. Aggregation is an issue which has such a potential impact on safety, quality and efficacy that one or more CQAs are generally defined for it.

Protein aggregation is a commonly encountered problem during biopharmaceutical development. It has the potential to occur at several different steps of the manufacturing such as fermentation, purification, formulation and storage. The potential impact of aggregation spans not only the manufacturing process but also the target product profile, delivery and, critically, patient safety.

Aggregation depends on the protein itself (intrinsic aggregation propensity) and on environmental factors such as pH, concentration, buffers, excipients and shear-forces. However, the fundamental difference as to why one antibody aggregates during a process step or during manufacturing and others do not is encoded in the antibodies' amino-acid sequences and their intrinsic aggregation propensities. Aggregation poses a risk to safety, quality and efficacy of antibodies.

Asparagine deamidation is a non-enzymatic reaction that over time produces a heterogeneous mixture of asparagine, iso-aspartic acid and aspartic acid at the affected position. Deamidation is caused by hydrolysis of the amide group on the side-chains of asparagine and glutamine. Whilst glutamine deamidation may occur in therapeutic proteins the manufacturability focus is on asparagine deamidation. Three primary factors influence the deamidation rates of peptides: pH, high temperature and primary sequence. The secondary and tertiary structures of a protein can significantly alter the deamidation rate. In addition to causing charge heterogeneity, asparagine deamidation can affect protein function if it occurs in a binding interface such as in antibody CDRs. Deamidation has also been reported to cause aggregation.

Aspartic acid isomerisation is the non-enzymatic interconversion of aspartic acid and iso-aspartic acid residues. The peptide bond C-terminal to aspartic acid can be susceptible to fragmentation in acidic conditions. As these reactions proceed through intermediates similar to those of the asparagine deamidation reaction; the rate of aspartic acid isomerisation and fragmentation is influenced by pH, temperature and primary sequence. Aspartic acid isomerisation can affect protein function when it occurs in binding interfaces such as antibody CDRs. Isomerisation also causes charge heterogeneity and can result in fragmentation caused by cleavage of the peptide back-bone. The fragmentation reaction primarily occurs below pH 5 and Asp-Pro peptide bonds are more labile than other peptide bonds. Aspartic acid isomerisation has the potential to increase immunogenicity, a risk that is further increased as fragmentation favours the occurrence of aggregates.

C-terminal Lysine processing is a modification in antibodies and other proteins that occurs during bioprocessing likely due to the action of basic carboxypeptidases. C-terminal lysine processing is a major source of charge and mass heterogeneity in antibody products as species with two, one or no lysines can be formed.

The isoelectric point (pI) of a protein is the pH at which the protein has zero net electrical charge. The isoelectric point is dependent on the number and type of charged residues in the protein, their spatial arrangement and degree of solvent accessibility. The prediction of the isoelectric point from the amino-acid sequence assumes a denatured protein. While it is known that predicted and measured isoelectric points differ, a relationship between the two values can be seen. When a protein solution is at a pH equal to the pI of the protein the repulsive electrostatic forces between charges on the protein molecules are minimised. The lack of repulsive electrostatic forces may increase the risk of hydrophobic surface patches becoming aggregation hot-spots.

N- and O-Glycosylation is a post-translational modification appearing in therapeutic proteins such as antibodies, blood factors, EPO, hormones and interferons]. The attachment of the carbohydrate to amino acid residues occurs at the side chain nitrogen atom of Asparagine in N-Glycosylation and the side chain oxygen atom of Serine and Threonine in O-linked glycosylation. Some immunoglobulin V-genes contain Asparagine residues in the CDRs which may result in an N-glycosylation motif forming during selection, with approximately 20% of all antibodies being glycosylated in the variable regions in vivo. Proper glycosylation is important not only for folding, but also stability, solubility, potency, pharmacokinetics and immunogenicity. Unintended glycan structures in or near binding interfaces such as CDRs may occlude the binding region or introduce steric hindrance thereby reducing binding affinity. Glycan structures can vary in branching and composition thereby introducing further heterogeneity which may have to be characterised and controlled.

Oxidation: Several amino acids are susceptible to damage by oxidation caused by reactive oxygen species (ROS), amongst them are histidine, methionine, cysteine, tyrosine and tryptophan. Oxidation is generally divided into two categories: site-specific metal catalysed oxidation and non site-specific oxidation. Methionine and to a lesser extent tryptophan are more susceptible to non site-specific oxidation. While methionine is primarily sensitive to free ROS, tryptophan is more sensitive to light induced oxidation. The degree of sensitivity is determined in part by the solvent accessibility of the side chain; buried residues are less sensitive or take longer to react.

Pyroglutamate formation is a modification occurring in proteins with an N-terminal glutamine or glutamic acid residue, where the side chain cyclises with the N-terminal amine group to form a five-membered ring structure. As many antibody light and heavy chains have an N-terminal Glutamine or Glutamic acid residue, pyroglutamate formation is a common modification, especially for sequences with an N-terminal glutamine. N-terminal cyclisation causes mass and charge heterogeneity which has to be controlled and monitored. Pyroglutamate formation is commonly found in antibodies with an N-terminal Glutamine. Glutamic acid to pyroglutamate conversion is unlikely to pose a safety risk, however the N-termini in antibodies are proximal to CDRs and the charge variation may influence binding affinity.

Abbreviations
 CDR Complementarity Determining Region
 Fc Fragment crystallisable of an antibody
 FR Framework Region
 FRx Framework Region x (FR1, FR2, FR3, FR4)
 Hx CDR x, Heavy chain (H1, H2, H3)
 H:Ala11 Heavy chain Alanine at ordinal position 11
 IgG Immunoglobulin G antibody
 Lx CDR x, Light chain (L1, L2, L3)
 L:Ala11 Light chain Alanine at ordinal position 11
 pI Isoelectric point
 VH Variable domain, Heavy chain
 VL Variable domain, Light chain Results
Sequence Liability Maps The two sequence maps shown in FIG. 24 and FIG. 25 show diagrammatic representations of the locations of all identified sequence liabilities. In these diagrams the locations of the domain boundaries and the CDRs are indicated in relation to the overall sequence. A scheme is used to indicate the type of liability detected at a given position. Asparagine residues predicted to potentially be involved in both deamidation and N-glycosylation are indicated using both schemes. All indicated residues in both FIGS. 24 and 25 represent potential issues for development of a stable formulation for the present antibody.

This section focusses on the predicted aggregation and the most important developability issues for H15.

The result of the antibody aggregation risk prediction is given in Table 13.

The potential developability issues are summarised in Table 14 summarizing sites which might be particularly problematic for formulation design during development.

TABLE 13

Aggregation Prediction

| Results | Comment |
| --- | --- |
| Low risk | The antibody is predicted to have some aggregation risk |

TABLE 14

Potential Issues for Development

| Chain | Amino- acid and Position | Comment |
| --- | --- | --- |
| L (light) | L: Asn92 | CDR L3 Asparagine with deamidation potential |
| H (heavy) | H: Met34 | CDR H1 Methionine with oxidation potential |
| H | H: Trp55 | Buried CDR H2 Tryptophan with oxidation potential |
| H | H: Asp74 | Acid labile Aspartyl-Proline peptide bond, potential backbone cleavage site. The modification site is located in the FR3 (framework 3 region) and is unusual |
| H | H: Asp88 | Acid labile Aspartyl-Proline peptide bond, potential backbone cleavage site. The modification site is located in FR3 and is unusual |
| H | H: Met105 | CDR H3 Methionine with oxidation potential |
| H | H: Lys448 | Chain susceptible to heterogeneity from C-terminal cleavage |

Clearly, there were several risk factors which could potentially destabilize the antibody during further formulation efforts.

In a second step, the antibody H1L5 was engineered to an IgG4 backbone, as described herein elsewhere, and was then designated as CTL-002. With the IgG4 backbone three of the above identified risk factors could be eliminated, namely
1) the K448 of IgG1 has been deleted
2) the N at position 204 of IgG1 has been replaced by a D in the IgG4 antibody
3) the S at position 132 of IgG1 has been replaced by a C in the IgG4 antibody The change from IgG1 to IgG4 has thus eliminated three potential risk factors for the provision of a stable antibody formulation.

Thermal and Colloidal Stability Testing

Based upon the knowledge obtained with the in silico experiment carried out above, the inventors decided on first basic formulations which might be suitable to stabilize the specific antibody structure with issues as found in the in silico experiment carried out above.

While it was considered clearly preferable to have a stable liquid formulation it was decided that it would be necessary to also include a potential lyophilized formulation in view of potential stability problems with this antibody in liquid surroundings. On that basis, it was decided that it would be necessary to test
 Four liquid formulations
 One lyophilized formulation
 Two different pH points, both of which were chosen to be far below the isoelectric point of the antibody
 Two different buffer systems
 Several different excipients in different concentrations The pH points were chosen after giving specific thoughts to the determination of the pI of the antibody and taking into account potential best surroundings to reduce aggregation and to increase repulsive electrostatic forces between protein molecules for the present particular antibody.

This led to the following study design:

pH and ionic strength screening were performed at microliter scale with selective analytics. The thermal and colloidal stability was studied by dynamic light scattering analysis and intrinsic fluorescence, light scattering analysis and micro calorimetry respectively.

TABLE 15-1

Formulation conditions of the pH and ionic strength screen

| Formulation ID | Buffer | pH | Excipients |
|---|---|---|---|
| F1 | 20 mM histidine | 6.0 | 240 mM sucrose |
| F2 | 20 mM histidine | 5.5 | 240 mM sucrose |
| F3 | 20 mM histidine | 6.0 | 150 mM sucrose, 50 mM arginine-HCl |
| F4 | 20 mM histidine | 6.0 | 150 mM NaCl |
| F5 | 20 mM Na-citrate | 6.0 | 240 mM sucrose |

TABLE 15-2

Analytical testing

| Parameter | Analytical method | Sample concentration |
|---|---|---|
| Melting temperature | Differential scanning micro calorimetry | 5 mg/ml |
| Unfolding temperature | Intrinsic fluorescence | 10 mg/ml |
| Onset of aggregation | Static light scattering | 10 mg/ml |
| Dissociation constant | Dynamic light scattering | 1-10 mg/ml |

Materials

Drug substance (DS) of CTL-002 was processed and provided by Lonza Biologics Plc, Slough (UK). The DS batch was shipped and stored at 2-8° C. from the date of arrival to the date the material was aliquoted and used for different studies.

TABLE 16-1

Drug substance information as delivered by manufacturing site

| Drug substance | Details |
|---|---|
| Name | CTL-002 |
| Batch Number | L35404/H27 (pool from CT08 clone) |
| Concentration | 24.9 mg/ml |
| Buffer | 20 mM histidine, pH 6.0 |
| Storage conditions | 2-8° C. |
| Extinction coefficient | 1.428 ml · mg$^{-1}$ · cm$^{-1}$ at 280 nm |
| Molecular weight | 144 539 Da |

TABLE 16-2

List of chemicals

| Material name (supplier) | Supplier name | Material No (supplier) |
|---|---|---|
| L-Histidine | J. T. Baker | 2080-06 |
| L-Histidine, Monohydrochloride, | J. T. Baker | 2081-06 |
| Sucrose | Pfanstiehl | S-124-2-MC |
| Arginine-HCl | Sigma | A5131-500G |
| Sodium Chloride | Sigma | S7653-1KG |
| Trisodium citrate dihydrate | Merck | 1.37042.1000 |

TABLE 16-2-continued

List of chemicals

| Material name (supplier) | Supplier name | Material No (supplier) |
|---|---|---|
| Citric acid monohydrate | Sigma | C1909-500g |
| Sodium hydroxide solution 50% | Honeywell Fluka | 71686-1L |
| Purified water | In-house | n/a |

TABLE 16-3

Main consumables

| Material name | Supplier name | Material Nr (supplier) |
|---|---|---|
| Vivapsin 6 10,000 MWCO PES | Sartorius | VS0602 |

TABLE 16-4

Main equipment

| Equipment name | Model | Manufacturer |
|---|---|---|
| Analytical balance | XPE206 BR | Mettler Toledo |
| Centrifuge | 5810R | Eppendorf |
| pH meter | 780 | Metrohm |
| UV/VIS Photospectrometer | SoloVPE | C Technologies Inc |
| Capillary Differential Scanning Calorimetry | MicroCal VP | Malvern |
| Dynamic Light Scattering | DynaPro Plate Reader II | Wyatt Technology |
| Fluorescence & Static light scattering Reader | UNit | Unchained Labs |

Methods

Preparation of Test Material

DS was subjected to buffer exchange in formulations F2 and F3 by using centrifugal concentrators. The protein concentration was monitored at the end of processing.

In all formulations, the protein concentration was adjusted by addition of the specific formulation buffer.

Results

Thermal Stability

The thermal structural stability of a protein can be assessed by the temperature at which protein aggregates (aggregation onset temperature (Tagg)) as well as by the temperature at which it unfolds from the native (folded) state to a denatured (unfolded) state. The mid-point of the unfolding transition, which is defined as the temperature at which there is an equal population of folded and unfolded proteins in solution, is termed melting temperature (Tm) when assessed by traditional DSC measurements, and unfolding temperature (Tunfold) when assessed by intrinsic fluorescence. The unfolding of IgG molecules presents two or three transitions reflecting the unfolding of Fab and Fc (CH2 and CH3) fragments.

Onset of aggregation was determined by light scattering at approx. 61-68° C. for the five samples. The Tagg values can be ranked as follows: F5>F1-F4>F3>F2

Unfolding temperatures were observed at temperatures of approx. 64-68° C. and melting temperatures at temperatures of approx. 65-69° C. Both methods gave a similar formulation ranking: F5>F1-F3>F4>F2.

Overall, the thermal stability is higher at pH 6.0 than at pH 5.5. NaCl lowered it, whereas Na-citrate buffer improved it.

TABLE 17-1

Thermal stability results

| ID | Formulation | Tagg [° C.] | Tunfold [° C.][1] | Tm [° C.] |
|---|---|---|---|---|
| F1 | 20 mM histidine 240 mM sucrose pH 6.0 | 65.2 | 66.8; 83.6 | 66.4; 70.3; 86.3 |
| F2 | 20 mM histidine 240 mM sucrose pH 5.5 | 60.5 | 64.2; 80.4 | 63.8; 70.3; 84.4 |
| F3 | 20 mM histidine 150 mM sucrose 50 mM arginine-HCl pH 6.0 | 64.5 | 66.6; 83.3 | 66.2; 70.7; 86.2 |
| F4 | 20 mM histidine 150 mM NaCl pH 6.0 | 65.3 | 64.9; 79.2 | 64.6; 70.3; 84.7 |
| F5 | 20 mM citrate 240 mM sucrose pH 6.0 | 67.5 | 68.0; 80.8 | 68.9; 72.5; 85.9 |

Colloidal Stability

Constant dissociation (kD) and osmotic second virial coefficient (A2) are both colloidal stability indicators that measure interactions due to non-covalent forces between different molecules in solution. High values of kD and A2 indicate strong net repulsive interactions, whereas low values indicate net attractive forces. Whereas it is possible to differentiate between net attractive and net repulsive forces by the sign for A2, this is not possible for kD Formulations having an average good colloidal stability have an A2 value above $1 \cdot 10^{-4}$ mol·ml·g$^2$.

Negative dissociation constants have been measured in all tested conditions, which correlates to weak negative or neutral osmotic second virial coefficient values and reflects a propensity for weak attractive protein-protein interactions.

The kD values can be ranked as follows: F2>F4>F3>F5>F1.

Colloidal stability is therefore improved by reducing the pH value to 5.5.

Increasing the ionic strength with NaCl, arginine-HCl or Na-citrate improves colloidal stability as well.

TABLE 17-2

Colloidal stability results

| ID | Formulation | kD [ml/g] | A2 [mol · mL · g$^2$] |
|---|---|---|---|
| F1 | 20 mM histidine 240 mM sucrose pH 6.0 | −18.2 | −6.9 10$^{-5}$ |
| F2 | 20 mM histidine 240 mM sucrose pH 5.5 | −2.47 | 2.2 10$^{-5}$ |
| F3 | 20 mM histidine 150 mM sucrose 50 mM arginine-HCl pH 6.0 | −10.8 | −2.6 10$^{-5}$ |
| F4 | 20 mM histidine 150 mM NaCl pH 6.0 | −5.03 | 7.3 10$^{-6}$ |
| F5 | 20 mM citrate 240 mM sucrose pH 6.0 | −11.6 | −3.1 10$^{-5}$ |

Thus, the results of the determination of colloidal and thermal stability point in different directions when it comes to which pH to choose for the final formulation. While a pH of 6.0 would provide an improved thermal stability, the colloidal stability might deteriorate at this pH compared to pH 5.5.

This could potentially have a negative impact on the stability of the final formulation unless the negative impact on either of the two (thermal and colloidal stability, respectively) by choosing one over the other pH can be outweighed by carefully choosing other components of the formulation.

Early Stage Formulation Development

Once more in view of the results obtained with the experiments carried out so far, it was decided to still continue with liquid and lyophilized formulations.

In this further formulation set-up, the inventors came finally up with three formulations (two liquids and one lyophilized) which were to be tested under specific stress conditions. Target concentration for the antibody was set to 25 mg/ml.

The antibody to be stabilized in the present is CTL-002, as defined elsewhere herein.

TABLE 18-1

Compositions of formulations under evaluation

| | | | | | | | |
|---|---|---|---|---|---|---|---|
| CTL-002_S6_FOR_F1 | 25 mg/mL | 20 mM His/HCl | pH 5.5 | 150 mM Sucrose | 50 mM L-Arginine-HCl | 0.02% w/v PS20 | 2.4 mL Liquid |
| CTL-002_S6_FOR_F2 | 25 mg/mL | 20 mM Na-citrate | pH 6.4 | 240 mM Sucrose | — | 0.02% w/v PS80 | 2.4 mL Liquid |
| CTL-002_S6_FOR_F3 | 25 mg/mL | 20 mM His/HCl | pH 5.5 | 150 mM Sucrose | 50 mM L-Arginine HCl | 0.02% w/v PS20 | 2.4 mL Lyophilisate |
| CTL-002_S6_FOR_F4 | 25 mg/mL | 20 mM Na-Citrate | pH 6.0 | 240 mM Sucrose | — | 0.02% w/v PS80 | 2.4 mL Liquid |

TABLE 18-2

Vial distribution and testing plan per formulation

| | Initial | −65° C. or below | 5° C. ± 3° C. | 25° C. ± 2° C./60% RH ± 5% RH | 40° C. ± 2° C./75% RH ± 5% RH |
|---|---|---|---|---|---|
| Liquid | | | | | |
| Initial/T0 | 1 | — | — | — | — |
| Freeze thaw: from 25° C. to −65° C., 5 cycles | — | 1 | — | — | — |
| 5 days shaking stress@ | — | — | 1 | 1 | — |
| 4 weeks | — | — | — | 1 | 1 |

TABLE 18-2-continued

Vial distribution and testing plan per formulation

|  | Initial | −65° C. or below | 5° C. ± 3° C. | 25° C. ± 2° C./60% RH ± 5% RH | 40° C. ± 2° C./75% RH ± 5% RH |
|---|---|---|---|---|---|
| 8 weeks | — | — | 1 | 1 | 1 |
| Reserve | — | 1 | 2 | 2 | 2 |
| Vials/Temp | 1 | 2 | 4 | 5 | 4 |
| Target vials | | | | 16 | |
| Lyophilize | | | | | |
| Initial/T0 | 3 | — | — | — | — |
| 4 weeks | — | — | — | — | 1 |
| 8 weeks | — | — | 1 | 1 | 2 |
| Reserve | — | 1 | 3 | 2 | 3 |
| Vials/Temp | 3 | 1 | 4 | 3 | 6 |
| Target vials | | | | 17 | |

@shaking stress performed at ambient and cool temperatures as described under Methods section

TABLE 18-3

Analytical testing plan per formulation

| Analytics | Incoming DS | Initial 5° C. | 1 W Shaking$ Cool | 1 W Shaking$ Ambient | F/T$ 5 Cycles | 4 W 5° C. | 4 W 25° C. | 4 W 40° C. | 8 W 5° C. | 8 W 25° C. | 8 W 40° C. |
|---|---|---|---|---|---|---|---|---|---|---|---|
| Colour | — | x | x | x | x | — | x | x | x | x | x |
| Clarity/opalescence | — | x | x | x | x | — | x | x | x | x | x |
| Visible Particles | — | x | x | x | x | — | x | x | x | x | x |
| Subvisible particles (HIAC) | — | x | x | x | x | — | x | x | x | x | x |
| pH | x | x | x | x | x | — | x | x | x | x | x |
| Osmolality | — | x | — | — | — | — | — | — | — | — | — |
| Protein content | — | x | x | x | x | — | x | x | x | x | x |
| Purity by Size Exclusion-HPLC | x | x | x | x | x | — | x | x | x | x | x |
| Purity by RP-HPLC | x | x | x | x | x | — | x | x | x | x | x |
| Caliper/LabChip Non-Reduced and Reduced | x | x | x | x | x | — | x | x | x | x | x |
| Purity by iCE | x | x | x | x | x | — | x | x | — | x | x |
| Surfactant content | — | x | x | x | x | — | x | x | x | x | x |
| Lyophilisate Reconstitution time[1] | — | x | — | — | — | — | — | — | x | x | x |
| Lyophilisate appearance and colour[2] | — | x | — | — | — | — | — | — | x | x | x |
| Lyophilisate Residual moisture content | — | x | — | — | — | — | — | — | x | x | x |

[1] only for lyophilized formulation
[2] only for lyophilized formulation

Materials

Bulk purified drug substance (BPDS) of CTL-002 was supplied at a concentration of approximately 25 g/L

TABLE 19-1

Excipients and primary packaging materials

| Material name (supplier) | Supplier name | Material Nr (supplier) |
|---|---|---|
| L-Histidine, USP, Multi-compendial | SAFC | H3911 |
| L-Histidine, Monohydrochloride, FCC, Multi-compendial | SAFC | H4036 |

TABLE 19-1-continued

Excipients and primary packaging materials

| Material name (supplier) | Supplier name | Material Nr (supplier) |
|---|---|---|
| Sucrose, NF, Multi-Compendial, High Purity (Low Endotoxin) | Pfanstiehl | S-124-2-MC |
| Trisodium citrate dehydrate, MultiCompendial | Merck | 1.37042.1000 |
| Citric acid monohydrate, MultiCompendial | Merck | 1.00243.1000 |
| L-Arginine Hydrochloride | Sigma Aldrich | A5131 |
| Polysorbate 20, N.F., Multi-Compendial. TWEEN 20 HP-LQ-(MH) | J.T. Baker | 4116-04 |
| Polysorbate 80, NF, Multi-compendial, (polyoxyethylene (80) sorbitan monooleate) CRILLET 4HP | J.T. Baker | 4117-04 |
| Hydrochloric acid, NF, Multi-compendial | Sigma Aldrich | 320331 |
| Sodium Hydroxide 1N | Fluka | 71686.00 |
| 6R Schott Vials SL/NBE Tubular Fiolax ® Clear Type I | SCHOTT France Pharmaceutical Systems or Adelphi Healthcare Packaging | AC1063 |
| 20 mm Flurotec ® Injection stopper | West pharmaceutical service or Adelphi Healthcare Packaging | 7001-8022 or INJ20TB3WRS |
| 20 mm Flurotec ® Freeze dry stopper | | 7001-9820 or FD20TT3WRS |
| 20 mm True Edge ® Flip-off Seal (No text) Royal Blue | West pharmaceutical service | AC1072 |

TABLE 19-2

Main consumables

| Material name | Supplier name | Material Nr (supplier) |
|---|---|---|
| Protein concentrator 30,000 MWCO, PES membrane | Pierce | 88536 |
| Filter Stericup 0.22 µm, PVDF membrane | Millipore | SCGVU05RE/ ScGVU02RE |

Legend: PVDF Polyvinylidene fluoride, PES Polyethersulfone

TABLE 19-3

Main equipment

| Equipment name | Model | Manufacturer |
|---|---|---|
| Centrifuge | 5810R | Eppendorf |
| Freeze dryer | LyoStar 3 FTS system | SP Scientific |
| Shaker/s | KS 15B Control | Edmund Buhler |
| −65° C. and below freezer | Ultralow Dual, MDFU700VX-PE | Panasonic |
| Stability 5° C. ± 3° C. | n/a | cold room A7-47 |
| Stability cabinet 25° C. ± 2° C./60% RH ± 5% RH | KBF 720 | Binder |
| Stability cabinet 40° C. ± 2° C./75% RH ± 5% RH | KBF 720 | Binder |

Samples of all formulations were labelled and stored at 5±3° C. till distribution for the stability studies.

A testing sample per liquid formulation was subjected in horizontal position to shake stress during approximately 5 days at room temperature and cool temperature conditions in a reciprocating (horizontal) shaker at a target speed of 200 rpm.

A testing sample per liquid formulation was subjected in vertical position to five freeze/thaw cycles from −65° C. or below to room temperature.

Lyophilized formulation vials were reconstituted using 2.3 mL of purified water. Volume for reconstitution was calculated under consideration of volume displacement by solids. Upon reconstitution, vials were gently moved to assure completion of reconstitution and were used for further analysis.

Results

Formulations after Compounding

The pH, protein concentration, and osmolality of the compounded solutions for the liquid (F1, F2 and F4) and lyo (F3) formulations after compounding and filtration were determined. Results are shown in Table 20. For completion, the protein concentration determined by UV spectrophotometer (A280) at the initial timepoint during the short term stability study is also included.

All results are close to the target values for pH

The compounded solutions were colourless (BY7), and practically free of visible particles after compounding and filtration.

TABLE 20

Results of characterization of formulations after compounding

| | Formulations CTL-002_S6_FOR_ | | | |
|---|---|---|---|---|
| Test | F1 | F2 | F3 | F4 |
| pH [a] | 5.5 | 6.4 | 5.6 | 6.0 |
| Osmolality by freezing point [mOsm/Kg] [a] | 328 | 337 | 306 | 367 |
| Protein concentration [a] [mg/mL] | 25.5 | 25.5 | 26.2 | 23.1 |

[a] values taken over from T0 results

Freeze-Thaw and Shaking Studies

All formulations, except F3, subjected to 5 freeze-thaw cycles (−65° C. to RT) or shaking stress at ambient temperature and at cool temperature did not show any relevant changes in any of the analytical methods compared to the initial non-stressed samples, indicating that the formulations effectively stabilized the CTL-002 molecule against both freeze-thaw and shaking stress.

For all liquid formulations no major differences were observed in aggregation and fragmentation by SE-HPLC. Also, no major chemical degradation has been observed by iCE and overall visible and subvisible particle counts were low on shaking and F/T stress. Data suggested that both surfactants, Polysorbate 20 and 80 protect formulations against the shaking, freezing and thawing stresses.

Short-Term Stability Studies

Overall, pH and protein concentration remained stable in all four tested formulations over the short-term stability testing up to 8 weeks. The stability testing revealed initial low subvisible particle counts for all formulations. The lyophilizate formulation F3 demonstrated a tendency for higher level of subvisible particles as compared to the liquid formulations F1, F2 and F4, which is inherent to the lyo cake reconstitution. No significant change in subvisible particle counts was detected in all tested formulations after 8-week storage at any of the tested storage conditions. Moreover, all samples were practically free from visible particles at T0 as assessed during the visual inspection using a black and white background. Only formulation F4 demonstrated an increase of the visible particle counts where few particles, white fibres, were observed after 8-week storage at 25° C. This increase was however not confirmed at 40° C. Overall, the level of visible particles did not change over the short-term stability studies.

The lyophilizate formulation F3 demonstrated a high stability. No change in purity by SE-HPLC, iciEF, RP-HPLC and CE-SDS could be observed over the 8-week stability stress under all tested storage conditions. However, the results for the liquid formulations, but in particular formulation F1, showed that it was possible to stabilize the antibody suitably even in a liquid formulation.

The CTL-002 molecule had a low aggregation and fragmentation tendency in all three tested liquid formulations when stressed at 40° C. The loss in monomer by aggregation as well as by fragmentation was more pronounced in formulation F1 than in formulations F2 and F4. After an 8-week storage at 40° C. 1.2% aggregates and 0.3% degradation products were measured in F1 (pH 5.5), whereas formulations F2 (pH 6.4) and F4 (pH 6.0) contained around 1.0-0.9% aggregates and 0.1-0.2% degradation products. The formation of high molecular weight species and low molecular weight species is therefore considered to be pH dependent.

The low solution turbidity, the low level of subvisible particles and the absence of visible particle measured in all tested formulations over the entire stability study underlined the low aggregation tendency. Moreover, no trend for aggregation nor fragmentation could be detected by chip-based CE-SDS, where no changes under normal and reduced conditions could be observed.

The chemical purity of CTL-002 was modified by thermal stress at 40° C. and to a lesser extent at 25° C. as measured by iciEF. A loss in main peak purity was more pronounced in formulations F2 and F4 than in formulation F1 and was mainly attributed to the formation of acidic species. Only formulation F1 at pH 5.5 showed in addition a significant uptake of basic species.

The RP-HPLC analysis under non-reduced conditions showed in all liquid formulations a loss in main peak followed by a post-peak species increase at 40° C., when no changes could be noticed by using RP-HPLC with reduced conditions. The RP-HPLC changes were as in iciEF less pronounced in formulation F1 than in formulations F2 and F4. Formulation F1 having a lower pH 5.5 demonstrated altogether a higher chemical stability than formulations F2 and F4.

No significant changes in polysorbate content could be observed in all formulations over the entire short-term stability study. Both surfactants, polysorbate 20 and polysorbate 80 are suitable for CTL-002 formulation.

Conclusions:

The lyo formulation F3 was stable during the entire short-term stability study.

All liquid formulations were stable against freeze/thaw and shaking stress as well as upon storage for 8 weeks at 5° C. Formulations F2 and F4 demonstrated similar stability profiles overall the tested stressed conditions.

The lowest pH formulation F1 was more prone to aggregation and fragmentation under accelerated storage conditions at 40° C.

The lowest pH formulation, F1, demonstrated a higher chemical stability than formulations F2 and F4 at 40° C. and to a lesser extent at 25° C. by iciEF, where mainly the acidic species propensity increased under stressed conditions, as well as at 40° C. by RPHPLC, where post peak species increased.

Based on the results of all experimental data taken together as performed for this formulation project up to this point, the following liquid formulation was provided for CTL-002:

---

25 mg/mL CTL-002, 20 mM Histidine/Histidine HCl, 150 mM sucrose, 50 mM Arginine-HCl, 0.02% w/v Polysorbate 20, at pH 5.5

---

At this stage, it was very difficult to make that decision, as the data (see above) seemed to be somewhat contradictory for chemical stability on the one hand and physical stability on the other hand. However, the inventors—taking together all data obtained up to this point—found that chemical stability would be particularly important in the context of the stabilization efforts for this antibody.

Long Term Data

With the above described formulation for the IgG4 antibody CTL-002, two long term stability studies were performed.

Stability samples for the product CTL-002 (at 250 mg/10 mL) stored at long term storage conditions 5° C.±3° C. inverted and upright were tested.

After eighteen months at long-term storage conditions 5° C.±3° C. inverted and upright storage, the product CTL-002 shows no degradation by the stability indicating methods:

SE-HPLC (main peak, fragments, aggregates) and

CE-DSD (reduced sum LC+HC, non-reduced intact IgG).

Only a slight shift from main peak towards acidic species is indicated by iciEF results. A decrease in polysorbate content can also be detected.

As can be seen from the results, the antibody was stabilized to a high extent not only with regard to the chemical stability parameters determined during this study, but—very surprisingly—also with regard to its aggregation properties.

Sequences

---

SEQ ID No: 1 (Heavy Chain CDR1 Region Peptide Sequence of monoclonal anti-human GDF-15 antibody):
GFSLSTSGMG -continued SEQ ID No: 2 (Heavy Chain CDR2 Region Peptide Sequence of monoclonal anti-human GDF-15 antibody):
IYWDDDK SEQ ID No: 3 (Heavy Chain CDR3 Region Peptide Sequence of monoclonal anti-human GDF-15 antibody):
ARSSYGAMDY SEQ ID No: 4 (Light Chain CDR1 Region Peptide Sequence of monoclonal anti-human GDF-15 antibody):
QNVGTN Light Chain CDR2 Region Peptide Sequence of monoclonal anti-human GDF-15 antibody:
SAS SEQ ID No: 5 (Light Chain CDR3 Region Peptide Sequence of monoclonal anti-human GDF-15 antibody):
QQYNNFPYT SEQ ID No: 6 (heavy chain variable domain of monoclonal anti-human GDF-15 antibody):
QITLKESGPTLVKPTQTLTLTCTFSGFSLSTSGMGVSWIRQPPGK

GLEWLAHIYWDDDKRYNPTLKSRLTITKDPSKNQVVLTMTNMDPV

DTATYYCARSSYGAMDYWGQGTLVTVSSASTKGP

SEQ ID No: 7 (light chain variable domain of monoclonal anti-human GDF-15 antibody):
DIVLTQSPSFLSASVGDRVTITCKASQNVGTNVAWFQQKPGKSPK

ALIYSASYRYSGVPDRFTGSGSGTEFTLTISSLQPEDFAAYFCQQ

YNNFPYTFGGGTKLEIKRT

SEQ ID No: 8 (heavy chain of monoclonal anti-human GDF-15 antibody CTL-002 without the leader peptide sequence):
QITLKESGPTLVKPTQTLTLTCTFSGFSLSTSGMGVSWIRQPPGK

GLEWLAHIYWDDDKRYNPTLKSRLTITKDPSKNQVVLTMTNMDPV

DTATYYCARSSYGAMDYWGQGTLVTVSSASTKGPSVFPLAPCSRS

TSESTAALGCLVKDYFPEPVTVSWNSGALTSGVHTFPAVLQSSGL

YSLSSVVTVPSSSLGTKTYTCNVDHKPSNTKVDKRVESKYGPPCP

PCPAPEFLGGPSVFLFPPKPKDTLMISRTPEVTCVVVDVSQEDPE

VQFNWYVDGVEVHNAKTKPREEQFNSTYRVVSVLTVLHQDWLNGK

EYKCKVSNKGLPSSIEKTISKAKGQPREPQVYTLPPSQEEMTKNQ

VSLTCLVKGFYPSDIAVEWESNGQPENNYKTTPPVLDSDGSFFLY

SRLTVDKSRWQEGNVFSCSVMHEALHNHYTQKSLSLSLG

SEQ ID No: 9 (light chain of monoclonal anti-human GDF-15 antibody CTL-002 without the leader peptide sequence):
DIVLTQSPSFLSASVGDRVTITCKASQNVGTNVAWFQQKPGKSPK

ALIYSASYRYSGVPDRFTGSGSGTEFTLTISSLQPEDFAAYFCQQ

YNNFPYTFGGGTKLEIKRTVAAPSVFIFPPSDEQLKSGTASVVCL

LNNFYPREAKVQWKVDNALQSGNSQESVTEQDSKDSTYSLSSTLT

LSKADYEKHKVYACEVTHQGLSSPVTKSFNRGEC

SEQ ID NO: 10 (heavy chain variable domain of anti-human GDF-15 antibody H1L5):
QITLKESGPTLVKPTQTLTLTCTFSGFSLSTSGMGVSWIRQPPGK

GLEWLAHIYWDDDKRYNPTLKSRLTITKDPSKNQVVLTMTNMDPV

DTATYYCARSSYGAMDYWGQGTLVTVSSASTKGPSVFPLAPSSKS

TSGGTAALGCLVKDYFPEPVTVSWNSGALTSGVHTFPAVLQSSGL

YSLSSVVTVPSSSLGTQTYICNVNHKPSNTKVDKKVEPKSCDKTH

TCPPCPAPELLGGPSVFLFPPKPKDTLMISRTPEVTCVVVDVSHE

DPEVKFNWYVDGVEVHNAKTKPREEQYNSTYRVVSVLTVLHQDWL

NGKEYKCKVSNKALPAPIEKTISKAKGQPREPQVYTLPPSREEMT

KNQVSLTCLVKGFYPSDIAVEWESNGQPENNYKTTPPVLDSDGSF

FLYSKLTVDKSRWQQGNVFSCSVMHEALHNHYTQKSLSLSPG

SEQ ID NO: 11 (light chain variable domain of anti-human GDF-15 antibody H1L5):
DIVLTQSPSFLSASVGDRVTITCKASQNVGTNVAWFQQKPGKSPK

ALIYSASYRYSGVPDRFTGSGSGTEFTLTISSLQPEDFAAYFCQQ

YNNFPYTFGGGTKLEIKRTVAAPSVFIFPPSDEQLKSGTASVVCL

LNNFYPREAKVQWKVDNALQSGNSQESVTEQDSKDSTYSLSSTLT

LSKADYEKHKVYACEVTHQGLSSPVTKSFNRGEC

REFERENCES

Abulizi P, Loganathan N, Zhao D, et al. Growth Differentiation Factor-15 Deficiency Augments Inflammatory Response and Exacerbates Septic Heart and Renal Injury Induced by Lipopolysaccharide Sci Rep. 2017; 7(1):1-10.

Böttner, Martina, Martin Laaff, Birgit Schechinger, Gudrun Rappold, Klaus Unsicker, and Clemens Suter-Crazzolara. 1999. "Characterization of the Rat, Mouse, and Human Genes of Growth/Differentiation Factor-15/Macrophage Inhibiting Cytokine-1 (GDF-15/MIC-1)." Gene 237 (1): 105-11.

Chung H K, Kim J T, Kim H W, et al. GDF15 deficiency exacerbates chronic alcohol- and carbon tetrachloride-induced liver injury. Sci Rep. 2017; 7(1):1-13. doi: 10.1038/s41598-017-17574-w Eisenhauer E A, Therasse P, Bogaerts J, et al. New Response Evaluation Criteria in Solid Tumours: Revised RECIST Guideline (Version 1.1). Eur J Cancer. 2009 January; 45(2):228-47.

Emmerson, Paul J., Feng Wang, Yong Du, Qian Liu, Richard T. Pickard, Malgorzata D. Gonciarz, Tamer Coskun, et al. 2017. "The Metabolic Effects of GDF15 Are Mediated by the Orphan Receptor GFRAL." Nature Medicine 23 (10): 1215-19. https://doi.org/10.1038/nm.4393.

Hodi F S, Ballinger M, Lyons B, et al. Immune-Modified Response Evaluation Criteria In Solid Tumors (imRECIST): Refining Guidelines to Assess the Clinical Benefit of Cancer Immunotherapy. J Clin Oncol. 2018 Mar. 20; 36(9):850-858.

Johnen H, Lin S, KuffnerT, et al. Tumor-induced anorexia and weight loss are mediated by the TGF-β superfamily cytokine MIC-1. Nat Med. 2007; 13(11):1333-1340. doi: 10.1038/nm1677

Kempf, Tibor, Alexander Zarbock, Christian Widera, Stefan Butz, Anika Stadtmann, Jan Rossaint, Matteo Bolomini-Vittori, et al. 2011. "GDF-15 Is an Inhibitor of Leukocyte Integrin Activation Required for Survival after Myocardial Infarction in Mice." Nature Medicine 17 (5): 581-88. https://doi.org/10.1038/nm.2354.

Selby, Mark J., John J. Engelhardt, Robert J. Johnston, Li-Sheng Lu, Minhua Han, Kent Thudium, Dapeng Yao, et al. 2016. "Preclinical Development of Ipilimumab and Nivolumab Combination Immunotherapy: Mouse Tumor Models, In Vitro Functional Studies, and Cynomolgus Macaque Toxicology." Edited by Aamir Ahmad. PLOS ONE 11 (9): e0161779. https://doi.org/10.1371/journal.pone.0161779.

Tong S, Marjono B, Brown D A, et al. Serum concentrations of macrophage inhibitory cytokine 1 (MIC 1) as a predictor of miscarriage. Lancet. 2004; 363(9403):129-130. doi:10.1016/S0140-6736(03)15265-8

Tsai, Vicky W. W., Yasmin Husaini, Amanda Sainsbury, David A. Brown, and Samuel N. Breit. 2018. "The MIC-1/GDF15-GFRAL Pathway in Energy Homeostasis: Implications for Obesity, Cachexia, and Other Associated Diseases." Cell Metabolism 28 (3): 353-68. https://doi.org/10.1016/j.cmet.2018.07.018.

van den Boom, Jasper G., and Gunther Hartmann. 2013. "Turning Tumors into Vaccines: Co-Opting the Innate Immune System." Immunity 39 (1): 27-37. https://doi.org/10.1016/j.immuni.2013.07.011.

Vaupel, Peter. 2004. "Tumor Microenvironmental Physiology and Its Implications for Radiation Oncology." Seminars in Radiation Oncology 14 (3): 198-206. https://doi.org/10.1016/j.semradonc.2004.04.008.

Wang M, Yao L C, Cheng M, Cai D, Martinek J, Pan C X, et al. Humanized mice in studying efficacy and mechanisms of PD-1-targeted cancer immunotherapy. FASEB J. 2018; 32(3):1537-49.

Welsh, John B., Lisa M. Sapinoso, Suzanne G. Kern, David A. Brown, Tao Liu, Asne R. Bauskin, Robyn L. Ward, et al. 2003. "Large-Scale Delineation of Secreted Protein Biomarkers Overexpressed in CancerTissue and Serum." Proceedings of the National Academy of Sciences 100 (6): 3410-15. https://doi.org/10.1073/PNAS.0530278100.

Wischhusen J, Melero I, and Fridman W. GDF-15: From Biomarker to Novel Targetable Immune Checkpoint. Front. Immunol. Accepted 23 Apr. 2020. doi: 10.3389/fimmu.2020.00951.

Wollert K C, Kempf T, Giannitsis E, et al. An Automated Assay for Growth Differentiation Factor 15. J Appl Lab Med An AACC Publ. 2018; 1(5):510-521. doi:10.1373/jalm.2016.022376

INDUSTRIAL APPLICABILITY

The anti-GDF-15 antibody may be used in methods for the treatment of cancer in human patients can be industrially manufactured and sold as products for the itemed methods and uses, in accordance with known standards for the manufacture of pharmaceutical products. Accordingly, the present invention is industrially applicable.

The invention claimed is:

1. An anti-GDF-15 antibody, wherein the antibody comprises a heavy chain comprising the amino acid sequence of SEQ ID NO: 8 and a light chain comprising the amino acid sequence of SEQ ID NO:9.

2. The anti-GDF-15 antibody of claim 1, wherein the antibody is produced by expression in CHO cells.

3. A formulation comprising 10-50 mg/ml of the antibody of claim 1.

4. The formulation of claim 3, further comprising histidine/histidine HCl, sucrose, arginine-HCl, and polysorbate, at a pH between 5 and 6.

5. The formulation of claim 3, further comprising 10-50 mg/ml histidine/histidine HCl, 100-200 mM sucrose, 20-80 mM arginine-HCl, and 0.01 to 0.05% w/v polysorbate 20 or polysorbate 80, at a pH between 5.0 and 6.0.

6. The formulation of claim 5, wherein the pH is between 5.3 and 5.7.

7. The formulation of claim 3, comprising 25 mg/ml of the antibody, 20 mM histidine/histidine HCl, 150 mM sucrose, 50 mM arginine-HCl, and 0.02% w/v polysorbate 20, at pH 5.5.

8. The formulation of claim 3, consisting of 25 mg/ml of the antibody, 20 mM histidine/histidine HCl, 150 mM sucrose, 50 mM arginine-HCl, and 0.02% w/v polysorbate 20, at pH 5.5.

9. The formulation of claim 3, comprising 25 mg/ml of the antibody.

10. The formulation of claim 4, wherein the pH is between 5.3 and 5.7.

11. The formulation of claim 10, wherein the pH is 5.5.

12. The formulation of claim 3, comprising 25 mg/ml of the antibody, further comprising histidine/histidine HCl, sucrose, arginine-HCl, and polysorbate, at a pH between 5 and 6.

13. The formulation of claim 12, wherein the pH is between 5.3 and 5.7.

14. The formulation of claim 3, comprising 25 mg/ml of the antibody, 10-50 mg/ml histidine/histidine HCl, 100-200 mM sucrose, 20-80 mM arginine-HCl, and 0.01 to 0.05% w/v polysorbate 20 or polysorbate 80, at a pH between 5.0 and 6.0.

15. The formulation of claim 3, further comprising 20 mM histidine/histidine HCl, 150 mM sucrose, 50 mM arginine-HCl, and 0.02% w/v polysorbate 20, at a pH between 5.0 and 6.0.

16. The formulation of claim 15, wherein the pH is between 5.3 and 5.7.

17. The formulation of claim 16, wherein the pH is 5.5.

* * * * *